United States Patent
Green et al.

(10) Patent No.: US 9,731,966 B2
(45) Date of Patent: Aug. 15, 2017

(54) NON-PLEATED TUBULAR DEPTH FILTER HAVING FINE FIBER FILTRATION MEDIA

(75) Inventors: Thomas B. Green, Liberty Township, OH (US); Lei Li, West Chester, OH (US); John A. Krogue, Mineral Wells, TX (US)

(73) Assignee: CLARCOR Inc., Franklin, TN (US)

( * ) Notice: Subject to any disclaimer, the term of this patent is extended or adjusted under 35 U.S.C. 154(b) by 0 days.

(21) Appl. No.: 13/033,238

(22) Filed: Feb. 23, 2011

(65) Prior Publication Data

US 2011/0210059 A1    Sep. 1, 2011

Related U.S. Application Data

(60) Provisional application No. 61/383,569, filed on Sep. 16, 2010, provisional application No. 61/383,487, filed on Sep. 16, 2010, provisional application No. 61/330,462, filed on May 3, 2010, provisional application No. 61/308,488, filed on Feb. 26, 2010.

(51) Int. Cl.
*B82Y 30/00* (2011.01)
*B01D 39/16* (2006.01)

(52) U.S. Cl.
CPC .......... *B82Y 30/00* (2013.01); *B01D 39/1623* (2013.01); *B01D 2239/025* (2013.01); *B01D 2239/064* (2013.01); *B01D 2239/0631* (2013.01); *B01D 2239/0668* (2013.01); *B01D 2239/0695* (2013.01); *B01D 2239/1233* (2013.01)

(58) Field of Classification Search
None
See application file for complete search history.

(56) References Cited

U.S. PATENT DOCUMENTS

| | | |
|---|---|---|
| 1,975,504 A | 10/1934 | Formhals |
| 3,994,258 A | 11/1976 | Simm |
| 4,230,650 A | 10/1980 | Guignard |
| 4,650,506 A | 3/1987 | Barris et al. |
| 4,759,782 A | 7/1988 | Miller et al. |
| 5,672,399 A | 9/1997 | Kahlbaugh et al. |
| 5,782,944 A | 7/1998 | Justice |
| 5,800,586 A | 9/1998 | Cusick et al. |
| 5,827,430 A | 10/1998 | Perry, Jr. et al. |
| 6,171,684 B1 | 1/2001 | Kahlbaugh et al. |
| 6,521,321 B2 * | 2/2003 | Kahlbaugh et al. .......... 428/181 |
| 6,604,925 B1 | 8/2003 | Dubson |

(Continued)

FOREIGN PATENT DOCUMENTS

| | | |
|---|---|---|
| EP | 0 162 645 A1 | 11/1985 |
| EP | 1 048 335 A1 | 11/2000 |

(Continued)

OTHER PUBLICATIONS

U.S. Appl. No. 13/032,227, Green et al., filed Feb. 22, 2011.

(Continued)

*Primary Examiner* — Benjamin Kurtz
(74) *Attorney, Agent, or Firm* — Reinhart Boerner Van Deuren P.C.

(57) ABSTRACT

A non-pleated depth filter element in the form of a tubular ring of depth filter media is provided. Multiple wraps of sheets, some including fine fibers, are employed. The depth filter element has particular applications to liquid filtration applications.

46 Claims, 30 Drawing Sheets

(56) References Cited

U.S. PATENT DOCUMENTS

| | | | |
|---|---|---|---|
| 6,641,773 | B2 | 11/2003 | Kleinmeyer et al. |
| 6,673,136 | B2 | 1/2004 | Gillingham et al. |
| 6,709,480 | B2 | 3/2004 | Sundet et al. |
| 6,743,273 | B2 | 6/2004 | Chung et al. |
| 7,029,620 | B2 | 4/2006 | Gordon et al. |
| 7,086,846 | B2 | 8/2006 | Kleinmeyer et al. |
| 7,134,857 | B2 | 11/2006 | Andrady et al. |
| 7,318,852 | B2 | 1/2008 | Chung et al. |
| 7,754,123 | B2 | 7/2010 | Verdegan et al. |
| 7,815,427 | B2 | 10/2010 | Green et al. |
| 2003/0006186 | A1 | 1/2003 | Pulek et al. |
| 2004/0255783 | A1 | 12/2004 | Graham et al. |
| 2005/0163955 | A1 | 7/2005 | Schaefer et al. |
| 2005/0193696 | A1 | 9/2005 | Muller et al. |
| 2006/0290031 | A1 | 12/2006 | Jirsak et al. |
| 2007/0021021 | A1* | 1/2007 | Verdegan et al. ............ 442/334 |
| 2007/0062855 | A1 | 3/2007 | Chase et al. |
| 2007/0131235 | A1 | 6/2007 | Janikowski et al. |
| 2007/0163217 | A1 | 7/2007 | Frey et al. |
| 2007/0294988 | A1 | 12/2007 | Miller et al. |
| 2007/0295659 | A1 | 12/2007 | Rygalski et al. |
| 2008/0017038 | A1 | 1/2008 | Wu |
| 2008/0128364 | A1* | 6/2008 | Cloud et al. ................ 210/767 |
| 2008/0314011 | A1 | 12/2008 | Smithies et al. |
| 2009/0126333 | A1 | 5/2009 | Green et al. |
| 2009/0199717 | A1 | 8/2009 | Green et al. |
| 2009/0266759 | A1* | 10/2009 | Green ......................... 210/489 |
| 2009/0294348 | A1 | 12/2009 | Krogue et al. |
| 2009/0320424 | A1 | 12/2009 | Merritt et al. |
| 2010/0181249 | A1 | 7/2010 | Green et al. |
| 2010/0206803 | A1* | 8/2010 | Ward et al. .................. 210/491 |

FOREIGN PATENT DOCUMENTS

| | | |
|---|---|---|
| EP | 1 059 106 A2 | 12/2000 |
| GB | 1 346 231 | 2/1974 |
| WO | WO 03/016601 A1 | 2/2003 |
| WO | WO 2005/024101 A1 | 3/2005 |
| WO | WO 2005/090653 A1 | 9/2005 |
| WO | WO 2006/049664 A1 | 5/2006 |
| WO | WO 2006/108363 A2 | 10/2006 |
| WO | WO 2006/108363 A3 | 10/2006 |
| WO | WO 2006/108364 A1 | 10/2006 |
| WO | WO 2006/131081 A1 | 12/2006 |
| WO | WO 2007/001405 A2 | 1/2007 |
| WO | WO 2007/054039 A1 | 5/2007 |
| WO | WO 2007/054040 A2 | 5/2007 |
| WO | WO 2007/095335 A2 | 8/2007 |
| WO | WO 2008/028428 A1 | 3/2008 |
| WO | WO PCT/US2009/050392 | 7/2009 |
| WO | WO 2010/009043 A2 | 1/2010 |

OTHER PUBLICATIONS

U.S. Appl. No. 13/032,327, Li et al., filed Feb. 22, 2011.
U.S. Appl. No. 13/032,368, Green et al., filed Feb. 22, 2011.
Keskato, Nanofiber Electrospinning Unit, pages from website, date last visited May 30, 2007, 4 pages, http://www.keskato.co.jp/english/neu/index/html.
Yuris Dzenis, Spinning Continuous Fibers for Nanotechnology, pages downloaded from website, downloaded from www.sciencemag.org on Jun. 6, 2007, 3 pages, pp. 1917-1919, www.sciencemag.org Science vol. 304 Jun. 25, 2004.
A.L. Yarin et al., Upward needleless electrospinning of multiple nanofibers, Feb. 27, 2004, 4 pages, Polymer 45 (2004) 2977-2980, available online at www.sciencedirect.com.
Timothy H. Grafe et al., Nanofiber Webs from Eletrospinning, 5 pages, pp. 1-5, Presented at the Nonwovens in Filtration—Fifth International Conference, Stuttgart, Germany, Mar. 2003, 2003 Donaldson Company Inc., Minneapolis, MN, USA.
Lei Li et al.; Modification of Air Filter Media with Nylon-6 Nanofibers; Publication; 2006; pp. 1-22; Journal of Engineered Fibers and Fabrics, vol. 1 Issue 1.

* cited by examiner

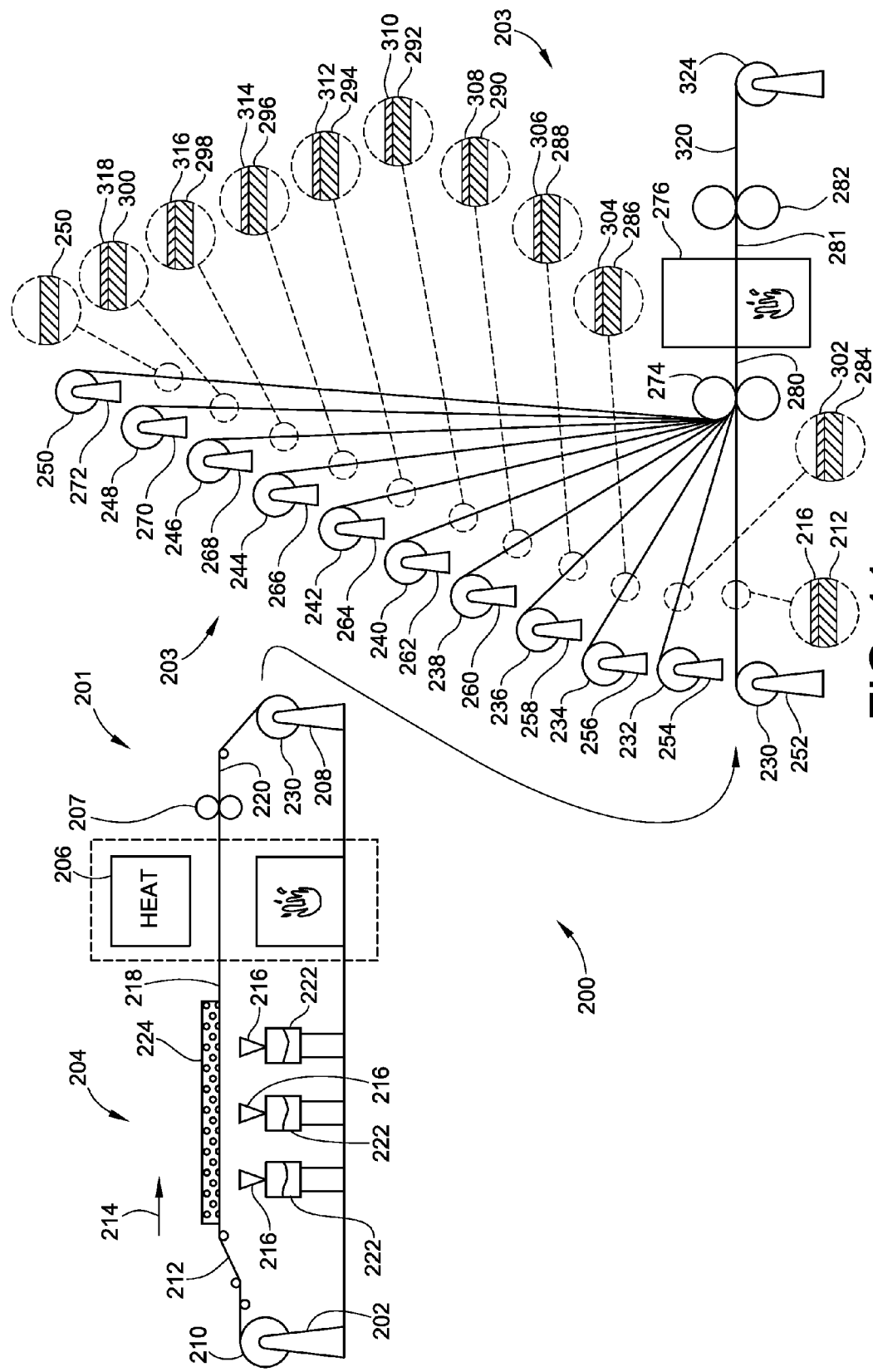

ISO 16889 - FILTER ELEMENT MULTIPASS REPORT SHEET

Test File Name: 100826-00-1-2

TEST RESULTS II

Particle counts (per mL) and filtration ratio

| Time interval | | d > 4 μm(c) | d > 5 μm(c) | d > 6 μm(c) | d > 7 μm(c) | d > 8 μm(c) | d > 10 μm(c) | d > 12 μm(c) | d > 14 μm(c) | d > 15 μm(c) | d > 17 μm(c) | d > 20 μm(c) | d > 25 μm(c) | d > 30 μm(c) | d > 35 μm(c) | d > 40 μm(c) | d > 50 μm(c) |
|---|---|---|---|---|---|---|---|---|---|---|---|---|---|---|---|---|---|
| Initial | | 96.8 | 64.5 | 37.3 | 31.3 | 27.2 | 16.1 | 11.1 | 8.1 | 8.1 | 4.0 | 1.0 | 1.0 | 1.0 | 1.0 | 1.0 | 1.0 |
| 10% | Up | 9020.0 | 5489.2 | 3473.9 | 2299.9 | 1567.7 | 802.8 | 455.6 | 275.3 | 220.6 | 144.0 | 80.9 | 32.9 | 15.1 | 7.7 | 5.0 | 2.2 |
|  | Down | 0.8 | 0.5 | 0.3 | 0.2 | 0.1 | 0.1 | 0.0 | 0.0 | 0.0 | 0.0 | 0.0 | 0.0 | 0.0 | 0.0 | 0.0 | 0.0 |
|  | β | 10646.2 | 10368.7 | 12755.5 | 15139.6 | 12880.5 | 8796.4 | 29851.4 | 100000.0 | 100000.0 | 100000.0 | 100000.0 | 100000.0 | 100000.0 | 100000.0 | 100000.0 | 100000.0 |
| 20% | Up | 9990.6 | 6074.2 | 3844.9 | 2547.7 | 1743.2 | 892.5 | 508.7 | 311.3 | 251.8 | 165.1 | 92.1 | 37.1 | 16.7 | 9.1 | 5.5 | 2.9 |
|  | Down | 0.1 | 0.1 | 0.0 | 0.0 | 0.0 | 0.0 | 0.0 | 0.0 | 0.0 | 0.0 | 0.0 | 0.0 | 0.0 | 0.0 | 0.0 | 0.0 |
|  | β | 67747.0 | 90199.3 | 93530.1 | 92404.9 | 124138.1 | 100000.0 | 100000.0 | 100000.0 | 100000.0 | 100000.0 | 100000.0 | 100000.0 | 100000.0 | 100000.0 | 100000.0 | 100000.0 |
| 30% | Up | 9913.7 | 6023.9 | 3811.2 | 2517.2 | 1714.7 | 879.2 | 496.6 | 302.7 | 242.4 | 158.4 | 87.5 | 35.0 | 15.9 | 8.6 | 5.1 | 2.4 |
|  | Down | 0.1 | 0.1 | 0.0 | 0.0 | 0.0 | 0.0 | 0.0 | 0.0 | 0.0 | 0.0 | 0.0 | 0.0 | 0.0 | 0.0 | 0.0 | 0.0 |
|  | β | 73466.9 | 64486.2 | 92062.4 | 60806.1 | 131136.1 | 67236.2 | 37982.6 | 23146.2 | 100000.0 | 100000.0 | 100000.0 | 100000.0 | 100000.0 | 100000.0 | 100000.0 | 100000.0 |
| 40% | Up | 9920.5 | 6014.1 | 3801.7 | 2508.1 | 1708.0 | 883.8 | 495.5 | 298.0 | 239.1 | 155.3 | 83.4 | 32.9 | 14.7 | 7.7 | 5.0 | 2.6 |
|  | Down | 0.1 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
|  | β | 102987.9 | 139865.7 | 246854.7 | 100000.0 | 100000.0 | 100000.0 | 100000.0 | 100000.0 | 100000.0 | 100000.0 | 100000.0 | 100000.0 | 100000.0 | 100000.0 | 100000.0 | 100000.0 |
| 50% | Up | 9934.0 | 6027.4 | 3809.1 | 2514.8 | 1717.6 | 879.6 | 499.3 | 302.7 | 245.4 | 161.2 | 88.8 | 35.6 | 15.9 | 8.5 | 5.3 | 2.4 |
|  | Down | 0.1 | 0.1 | 0.0 | 0.0 | 0.0 | 0.0 | 0.0 | 0.0 | 0.0 | 0.0 | 0.0 | 0.0 | 0.0 | 0.0 | 0.0 | 0.0 |
|  | β | 82198.2 | 115749.2 | 145174.9 | 95847.2 | 65460.6 | 100000.0 | 100000.0 | 100000.0 | 100000.0 | 100000.0 | 100000.0 | 100000.0 | 100000.0 | 100000.0 | 100000.0 | 100000.0 |
| 60% | Up | 9915.3 | 5995.7 | 3786.9 | 2494.6 | 1704.9 | 872.8 | 497.2 | 301.2 | 241.9 | 158.8 | 88.6 | 35.5 | 16.2 | 8.6 | 5.2 | 2.7 |
|  | Down | 0.3 | 0.1 | 0.1 | 0.1 | 0.1 | 0.1 | 0.0 | 0.0 | 0.0 | 0.0 | 0.0 | 0.0 | 0.0 | 0.0 | 0.0 | 0.0 |
|  | β | 38754.8 | 44901.1 | 35122.9 | 46653.4 | 31884.8 | 16323.7 | 12356.6 | 7484.6 | 6012.6 | 100000.0 | 100000.0 | 100000.0 | 100000.0 | 100000.0 | 100000.0 | 100000.0 |
| 70% | Up | 9908.2 | 5999.5 | 3794.0 | 2501.3 | 1708.2 | 872.6 | 486.3 | 293.6 | 236.5 | 156.1 | 86.4 | 33.5 | 16.5 | 8.6 | 5.3 | 2.5 |
|  | Down | 1.3 | 0.8 | 0.4 | 0.3 | 0.2 | 0.1 | 0.0 | 0.0 | 0.0 | 0.0 | 0.0 | 0.0 | 0.0 | 0.0 | 0.0 | 0.0 |
|  | β | 7514.5 | 7696.2 | 9435.2 | 7781.1 | 7994.3 | 12982.1 | 37148.2 | 22429.9 | 18061.5 | 11921.8 | 100000.0 | 100000.0 | 100000.0 | 100000.0 | 100000.0 | 100000.0 |
| 80% | Up | 9927.0 | 6016.8 | 3806.7 | 2515.7 | 1711.6 | 881.0 | 500.7 | 303.2 | 244.5 | 158.8 | 87.7 | 35.6 | 16.7 | 9.6 | 5.7 | 2.9 |
|  | Down | 6.3 | 3.6 | 2.2 | 1.4 | 1.0 | 0.5 | 0.3 | 0.1 | 0.1 | 0.1 | 0.1 | 0.0 | 0.0 | 0.0 | 0.0 | 0.0 |
|  | β | 1569.0 | 1677.0 | 1739.4 | 1812.9 | 1691.4 | 1616.6 | 1905.6 | 2313.6 | 3145.7 | 3095.7 | 3370.8 | 100000.0 | 100000.0 | 100000.0 | 100000.0 | 100000.0 |
| 90% | Up | 9943.0 | 6029.6 | 3814.4 | 2519.3 | 1723.6 | 885.7 | 497.5 | 299.7 | 241.9 | 156.1 | 83.7 | 33.5 | 15.7 | 8.4 | 5.1 | 2.9 |
|  | Down | 30.9 | 18.3 | 11.3 | 7.4 | 5.0 | 2.4 | 1.2 | 0.7 | 0.5 | 0.3 | 0.1 | 0.1 | 0.0 | 0.0 | 0.0 | 0.0 |
|  | β | 321.9 | 329.2 | 339.0 | 340.9 | 346.7 | 374.1 | 412.6 | 414.9 | 442.2 | 484.8 | 618.0 | 415.5 | 591.1 | 621.4 | 100000.0 | 100000.0 |
| 100% | Up | 9922.6 | 6010.1 | 3803.0 | 2501.7 | 1707.1 | 875.5 | 498.2 | 297.9 | 239.9 | 155.0 | 84.8 | 33.4 | 15.2 | 8.4 | 5.3 | 2.5 |
|  | Down | 52.7 | 31.4 | 19.7 | 12.6 | 8.4 | 4.0 | 2.2 | 1.2 | 0.8 | 0.4 | 0.2 | 0.1 | 0.0 | 0.0 | 0.0 | 0.0 |
|  | β | 188.3 | 191.2 | 192.9 | 198.0 | 203.5 | 218.1 | 230.5 | 253.0 | 293.8 | 362.6 | 362.5 | 605.9 | 1110.8 | 100000.0 | 100000.0 | 100000.0 |
| Average | Up | 9800.3 | 5946.3 | 3760.3 | 2483.4 | 1694.9 | 869.0 | 491.3 | 297.8 | 239.7 | 157.0 | 86.8 | 34.7 | 15.9 | 8.4 | 5.2 | 2.5 |
|  | Down | 0.4 | 0.2 | 0.1 | 0.1 | 0.1 | 0.0 | 0.0 | 0.0 | 0.0 | 0.0 | 0.0 | 0.0 | 0.0 | 0.0 | 0.0 | 0.0 |
|  | β | 23484.0 | 24509.3 | 29039.0 | 27945.8 | 26828.7 | 27034.3 | 42113.7 | 31394.4 | 31458.1 | 83938.2 | 100000.0 | 100000.0 | 100000.0 | 100000.0 | 100000.0 | 100000.0 |

ISO 16889 - FILTER ELEMENT MULTIPASS REPORT SHEET
Test File Name: 100826-00-1
TEST RESULTS II Particle counts (per mL) and filtration ratio

| Time interval | | d > 4 μm(c) | d > 5 μm(c) | d > 6 μm(c) | d > 7 μm(c) | d > 8 μm(c) | d > 10 μm(c) | d > 12 μm(c) | d > 14 μm(c) | d > 15 μm(c) | d > 17 μm(c) | d > 20 μm(c) | d > 25 μm(c) | d > 30 μm(c) | d > 35 μm(c) | d > 40 μm(c) | d > 50 μm(c) |
|---|---|---|---|---|---|---|---|---|---|---|---|---|---|---|---|---|---|
| Initial | | 83.2 | 53.1 | 38.1 | 19.0 | 11.0 | 3.0 | 1.0 | 1.0 | 1.0 | 1.0 | 1.0 | 0.0 | 0.0 | 0.0 | 0.0 | 0.0 |
| 10% | Up | 23112.1 | 14039.9 | 8851.1 | 5852.0 | 3978.5 | 2031.3 | 1136.2 | 687.8 | 546.0 | 355.7 | 190.2 | 71.3 | 32.3 | 15.9 | 9.9 | 5.7 |
|  | Down | 1.1 | 0.7 | 0.4 | 0.3 | 0.2 | 0.1 | 0.0 | 0.0 | 0.0 | 0.0 | 0.0 | 0.0 | 0.0 | 0.0 | 0.0 | 0.0 |
|  | β | 21124.1 | 20973.5 | 19909.1 | 23380.6 | 25206.7 | 32779.3 | 100000.0 | 100000.0 | 100000.0 | 100000.0 | 100000.0 | 100000.0 | 100000.0 | 100000.0 | 100000.0 | 100000.0 |
| 20% | Up | 28812.8 | 17519.0 | 11143.2 | 7363.7 | 5027.3 | 2574.0 | 1446.5 | 863.7 | 688.6 | 444.5 | 243.0 | 93.5 | 41.9 | 21.0 | 12.7 | 5.1 |
|  | Down | 0.4 | 0.3 | 0.2 | 0.1 | 0.0 | 0.0 | 0.0 | 0.0 | 0.0 | 0.0 | 0.0 | 0.0 | 0.0 | 0.0 | 0.0 | 0.0 |
|  | β | 67285.3 | 59589.3 | 59524.2 | 68265.7 | 100000.0 | 100000.0 | 100000.0 | 100000.0 | 100000.0 | 100000.0 | 100000.0 | 100000.0 | 100000.0 | 100000.0 | 100000.0 | 100000.0 |
| 30% | Up | 29202.7 | 17763.9 | 11228.9 | 7444.3 | 5082.8 | 2615.1 | 1472.5 | 893.0 | 718.9 | 465.0 | 252.6 | 99.9 | 45.2 | 24.5 | 14.8 | 7.3 |
|  | Down | 0.9 | 0.3 | 0.2 | 0.1 | 0.1 | 0.1 | 0.0 | 0.0 | 0.0 | 0.0 | 0.0 | 0.0 | 0.0 | 0.0 | 0.0 | 0.0 |
|  | β | 33836.0 | 58109.7 | 54663.1 | 72154.3 | 64443.5 | 49662.1 | 100000.0 | 100000.0 | 100000.0 | 100000.0 | 100000.0 | 100000.0 | 100000.0 | 100000.0 | 100000.0 | 100000.0 |
| 40% | Up | 29229.7 | 17738.1 | 11242.9 | 7424.1 | 5068.5 | 2585.3 | 1461.3 | 881.2 | 704.7 | 458.1 | 248.1 | 96.1 | 41.3 | 22.8 | 14.1 | 7.1 |
|  | Down | 7.9 | 4.7 | 3.0 | 1.9 | 1.3 | 0.8 | 0.3 | 0.3 | 0.3 | 0.2 | 0.1 | 0.0 | 0.0 | 0.0 | 0.0 | 0.0 |
|  | β | 3695.2 | 3773.7 | 3804.6 | 3898.8 | 3850.7 | 3420.5 | 4529.8 | 2985.3 | 2619.9 | 2861.4 | 2321.0 | 100000.0 | 100000.0 | 100000.0 | 100000.0 | 100000.0 |
| 50% | Up | 29300.0 | 17789.5 | 11247.3 | 7437.4 | 5085.0 | 2610.5 | 1478.3 | 888.9 | 712.8 | 464.3 | 254.7 | 101.5 | 46.0 | 24.6 | 14.9 | 7.3 |
|  | Down | 26.4 | 15.9 | 10.2 | 6.9 | 4.6 | 2.1 | 1.2 | 0.6 | 0.4 | 0.2 | 0.1 | 0.0 | 0.0 | 0.0 | 0.0 | 0.0 |
|  | β | 1107.8 | 1118.8 | 1100.7 | 1074.8 | 1115.1 | 1255.4 | 1201.9 | 1427.3 | 1690.1 | 2060.8 | 3421.3 | 4298.1 | 100000.0 | 100000.0 | 100000.0 | 100000.0 |
| 60% | Up | 29369.7 | 17826.6 | 11317.7 | 7473.7 | 5096.8 | 2601.1 | 1462.7 | 877.3 | 704.2 | 457.5 | 247.7 | 93.9 | 42.2 | 22.5 | 14.5 | 6.4 |
|  | Down | 56.7 | 34.6 | 21.6 | 14.4 | 10.0 | 5.1 | 2.8 | 1.5 | 1.1 | 0.5 | 0.1 | 0.0 | 0.0 | 0.0 | 0.0 | 0.0 |
|  | β | 518.4 | 515.8 | 524.4 | 519.6 | 509.8 | 509.4 | 526.7 | 597.5 | 644.2 | 854.9 | 1859.8 | 100000.0 | 100000.0 | 100000.0 | 100000.0 | 100000.0 |
| 70% | Up | 29345.9 | 17830.6 | 11308.9 | 7483.6 | 5111.5 | 2628.2 | 1472.8 | 892.4 | 713.7 | 465.3 | 254.4 | 96.0 | 41.2 | 21.7 | 12.9 | 6.6 |
|  | Down | 180.5 | 107.9 | 68.2 | 43.3 | 29.1 | 14.2 | 7.5 | 4.3 | 3.2 | 1.6 | 0.7 | 0.2 | 0.1 | 0.0 | 0.0 | 0.0 |
|  | β | 162.6 | 165.3 | 165.8 | 172.7 | 175.4 | 185.0 | 197.2 | 209.0 | 221.6 | 293.4 | 349.5 | 508.5 | 510.5 | 100000.0 | 100000.0 | 100000.0 |
| 80% | Up | 29636.5 | 17968.3 | 11375.4 | 7505.7 | 5132.3 | 2638.0 | 1484.6 | 893.9 | 713.6 | 465.9 | 255.5 | 97.8 | 42.5 | 22.7 | 14.7 | 7.6 |
|  | Down | 697.8 | 417.9 | 263.8 | 175.5 | 119.2 | 59.7 | 31.7 | 18.0 | 13.7 | 7.5 | 3.4 | 0.7 | 0.2 | 0.1 | 0.0 | 0.0 |
|  | β | 42.5 | 43.0 | 43.1 | 42.8 | 43.0 | 44.2 | 46.8 | 49.6 | 52.0 | 62.0 | 74.4 | 143.9 | 241.6 | 299.7 | 294.6 | 100000.0 |
| 90% | Up | 30397.6 | 18464.4 | 11697.7 | 7746.0 | 5280.7 | 2704.9 | 1529.6 | 921.1 | 737.8 | 477.8 | 256.5 | 99.1 | 41.7 | 22.1 | 13.1 | 5.7 |
|  | Down | 1924.9 | 1156.6 | 728.3 | 482.6 | 328.1 | 162.4 | 87.8 | 49.6 | 37.6 | 21.7 | 9.1 | 1.3 | 0.3 | 0.0 | 0.0 | 0.0 |
|  | β | 15.8 | 16.0 | 16.1 | 16.1 | 16.1 | 16.7 | 17.4 | 18.6 | 19.6 | 22.0 | 28.1 | 74.3 | 141.5 | 810.5 | 479.5 | 100000.0 |
| 100% | Up | 32091.6 | 19488.4 | 12360.9 | 8173.4 | 5580.9 | 2862.6 | 1606.8 | 957.6 | 763.9 | 491.3 | 265.0 | 102.2 | 45.8 | 24.8 | 15.9 | 7.5 |
|  | Down | 4234.7 | 2539.2 | 1606.8 | 1061.5 | 720.9 | 355.1 | 190.5 | 105.4 | 81.6 | 47.5 | 20.1 | 3.5 | 0.7 | 0.2 | 0.1 | 0.0 |
|  | β | 7.6 | 7.7 | 7.7 | 7.7 | 7.7 | 8.1 | 8.4 | 9.1 | 9.4 | 10.3 | 13.2 | 28.9 | 64.9 | 109.0 | 212.3 | 100000.0 |
| Average | Up | 28339.0 | 17215.4 | 10905.7 | 7211.2 | 4921.5 | 2520.8 | 1418.6 | 854.9 | 684.1 | 444.3 | 241.5 | 93.2 | 41.4 | 21.9 | 13.4 | 6.5 |
|  | Down | 39.1 | 23.5 | 14.8 | 9.6 | 6.5 | 3.2 | 1.7 | 1.0 | 0.7 | 0.4 | 0.1 | 0.1 | 0.0 | 0.0 | 0.0 | 0.0 |
|  | β | 724.3 | 733.5 | 735.5 | 753.3 | 761.4 | 792.6 | 841.6 | 899.1 | 956.9 | 1241.0 | 1621.8 | 3071.1 | 3592.8 | 100000.0 | 100000.0 | 100000.0 |

ISO 16889 - FILTER ELEMENT MULTIPASS REPORT SHEET

Test File Name: 100812-00-1

TEST RESULTS II

Particle counts (per mL) and filtration ratio

| Time interval | | d > 4 μm(c) | d > 5 μm(c) | d > 6 μm(c) | d > 7 μm(c) | d > 8 μm(c) | d > 10 μm(c) | d > 12 μm(c) | d > 14 μm(c) | d > 15 μm(c) | d > 17 μm(c) | d > 20 μm(c) | d > 25 μm(c) | d > 30 μm(c) | d > 35 μm(c) | d > 40 μm(c) | d > 50 μm(c) |
|---|---|---|---|---|---|---|---|---|---|---|---|---|---|---|---|---|---|
| Initial | | 334.9 | 185.7 | 128.8 | 91.2 | 62.3 | 39.7 | 31.1 | 21.5 | 19.3 | 17.2 | 11.8 | 8.6 | 5.4 | 4.3 | 2.1 | 2.1 |
| 10% | Up | 22695.2 | 13702.3 | 8568.1 | 5573.3 | 3766.1 | 1920.8 | 1096.9 | 665.9 | 532.8 | 352.9 | 197.7 | 84.6 | 41.0 | 21.4 | 14.1 | 7.3 |
| | Down | 18.2 | 8.6 | 4.4 | 2.9 | 1.8 | 0.4 | 0.2 | 0.1 | 0.1 | 0.1 | 0.0 | 0.0 | 0.0 | 0.0 | 0.0 | 0.0 |
| | β | 1248.9 | 1589.4 | 1941.2 | 1895.8 | 2104.6 | 4686.7 | 6759.7 | 8326.4 | 6661.6 | 4413.1 | 100000.0 | 100000.0 | 100000.0 | 100000.0 | 100000.0 | 100000.0 |
| 20% | Up | 27461.3 | 16712.1 | 10566.2 | 6942.5 | 4730.0 | 2419.0 | 1381.6 | 844.5 | 672.8 | 445.6 | 244.5 | 98.7 | 45.4 | 25.1 | 13.9 | 7.8 |
| | Down | 64.9 | 34.3 | 19.4 | 10.7 | 6.2 | 1.9 | 0.9 | 0.3 | 0.2 | 0.1 | 0.0 | 0.0 | 0.0 | 0.0 | 0.0 | 0.0 |
| | β | 423.4 | 487.0 | 543.6 | 650.6 | 763.6 | 1284.8 | 1512.8 | 2620.7 | 4167.0 | 8493.4 | 100000.0 | 100000.0 | 100000.0 | 100000.0 | 100000.0 | 100000.0 |
| 30% | Up | 28681.6 | 17437.1 | 11035.7 | 7274.7 | 4933.2 | 2519.1 | 1435.5 | 872.4 | 704.3 | 464.2 | 253.4 | 104.3 | 47.7 | 27.1 | 17.0 | 9.0 |
| | Down | 209.7 | 117.4 | 69.3 | 42.2 | 26.2 | 12.3 | 4.7 | 1.9 | 0.9 | 0.4 | 0.1 | 0.0 | 0.0 | 0.0 | 0.0 | 0.0 |
| | β | 136.7 | 148.6 | 159.2 | 172.5 | 188.4 | 205.5 | 303.1 | 469.3 | 779.6 | 1086.6 | 2708.5 | 2214.6 | 100000.0 | 100000.0 | 100000.0 | 100000.0 |
| 40% | Up | 29015.3 | 17660.0 | 11126.4 | 7316.3 | 4977.7 | 2523.7 | 1435.6 | 862.9 | 697.1 | 454.5 | 255.4 | 104.8 | 51.3 | 27.9 | 17.6 | 9.7 |
| | Down | 451.8 | 251.7 | 150.6 | 91.7 | 55.2 | 21.6 | 9.2 | 3.3 | 2.3 | 1.2 | 0.3 | 0.0 | 0.0 | 0.0 | 0.0 | 0.0 |
| | β | 64.2 | 70.2 | 73.9 | 79.8 | 90.2 | 116.9 | 155.9 | 261.2 | 303.4 | 385.9 | 944.8 | 100000.0 | 100000.0 | 100000.0 | 100000.0 | 100000.0 |
| 50% | Up | 29105.4 | 17674.2 | 11184.0 | 7353.2 | 5018.6 | 2550.1 | 1435.6 | 873.9 | 696.8 | 453.4 | 249.2 | 101.5 | 47.6 | 27.5 | 15.2 | 7.7 |
| | Down | 702.9 | 402.3 | 237.3 | 147.5 | 91.8 | 38.1 | 18.0 | 8.3 | 5.5 | 2.4 | 0.6 | 0.1 | 0.0 | 0.0 | 0.0 | 0.0 |
| | β | 41.4 | 43.9 | 47.1 | 49.9 | 54.7 | 66.9 | 79.7 | 104.9 | 125.8 | 190.3 | 427.5 | 1879.9 | 100000.0 | 100000.0 | 100000.0 | 100000.0 |
| 60% | Up | 29390.5 | 17916.7 | 11303.9 | 7432.6 | 5046.8 | 2580.3 | 1461.3 | 883.0 | 714.5 | 457.8 | 248.5 | 101.3 | 44.6 | 24.1 | 14.9 | 7.1 |
| | Down | 932.1 | 533.2 | 317.0 | 198.8 | 128.3 | 53.8 | 24.2 | 10.7 | 7.0 | 3.0 | 0.6 | 0.1 | 0.0 | 0.0 | 0.0 | 0.0 |
| | β | 31.5 | 33.6 | 35.7 | 37.4 | 39.3 | 47.9 | 60.3 | 82.5 | 102.0 | 151.8 | 397.6 | 1024.4 | 100000.0 | 100000.0 | 100000.0 | 100000.0 |
| 70% | Up | 29503.0 | 17905.8 | 11328.0 | 7436.1 | 5049.0 | 2570.3 | 1459.1 | 888.6 | 714.8 | 465.8 | 255.2 | 102.8 | 46.9 | 26.4 | 16.1 | 8.2 |
| | Down | 1098.2 | 631.1 | 382.6 | 240.5 | 151.0 | 62.0 | 26.9 | 12.8 | 8.8 | 3.7 | 1.2 | 0.1 | 0.0 | 0.0 | 0.0 | 0.0 |
| | β | 26.9 | 28.4 | 29.6 | 30.9 | 33.4 | 41.5 | 54.2 | 69.7 | 81.4 | 125.0 | 218.3 | 1920.0 | 100000.0 | 100000.0 | 100000.0 | 100000.0 |
| 80% | Up | 29669.6 | 18056.0 | 11420.0 | 7509.1 | 5104.7 | 2615.8 | 1485.4 | 895.3 | 722.5 | 472.6 | 258.4 | 108.5 | 48.1 | 25.8 | 14.7 | 8.0 |
| | Down | 1165.4 | 669.6 | 407.1 | 255.6 | 162.4 | 66.5 | 31.2 | 14.0 | 9.1 | 3.7 | 0.9 | 0.0 | 0.0 | 0.0 | 0.0 | 0.0 |
| | β | 25.5 | 27.0 | 28.0 | 29.4 | 31.4 | 39.3 | 47.5 | 63.8 | 79.7 | 126.4 | 279.2 | 100000.0 | 100000.0 | 100000.0 | 100000.0 | 100000.0 |
| 90% | Up | 29596.0 | 17959.9 | 11322.8 | 7445.3 | 5062.8 | 2582.3 | 1450.1 | 868.9 | 694.6 | 444.7 | 240.4 | 97.4 | 44.0 | 24.3 | 14.7 | 7.4 |
| | Down | 1181.8 | 683.1 | 408.4 | 255.3 | 158.0 | 66.9 | 30.7 | 14.8 | 10.1 | 5.1 | 1.1 | 0.1 | 0.0 | 0.0 | 0.0 | 0.0 |
| | β | 25.0 | 26.3 | 27.7 | 29.2 | 32.0 | 38.6 | 47.2 | 58.9 | 68.9 | 87.6 | 215.2 | 1898.5 | 100000.0 | 100000.0 | 100000.0 | 100000.0 |
| 100% | Up | 29801.4 | 18088.2 | 11455.8 | 7544.0 | 5127.5 | 2624.8 | 1486.8 | 896.7 | 720.0 | 472.4 | 263.2 | 108.4 | 48.7 | 27.2 | 17.5 | 8.9 |
| | Down | 1087.0 | 630.3 | 377.5 | 238.9 | 151.9 | 65.1 | 30.0 | 13.3 | 9.1 | 4.7 | 1.7 | 0.3 | 0.0 | 0.0 | 0.0 | 0.0 |
| | β | 27.4 | 28.7 | 30.3 | 31.6 | 33.7 | 40.3 | 49.6 | 67.5 | 79.5 | 100.7 | 154.5 | 405.3 | 100000.0 | 100000.0 | 100000.0 | 100000.0 |
| Average | Up | 27978.9 | 17001.2 | 10730.3 | 7047.0 | 4788.8 | 2440.5 | 1386.5 | 841.6 | 676.1 | 442.0 | 243.4 | 99.7 | 46.4 | 25.6 | 15.5 | 8.1 |
| | Down | 496.8 | 282.6 | 168.7 | 104.9 | 65.8 | 27.1 | 12.0 | 5.3 | 3.5 | 1.6 | 0.4 | 0.0 | 0.0 | 0.0 | 0.0 | 0.0 |
| | β | 56.3 | 60.2 | 63.6 | 67.2 | 72.8 | 89.9 | 115.2 | 157.7 | 191.1 | 284.9 | 621.8 | 2753.2 | 100000.0 | 100000.0 | 100000.0 | 100000.0 |

ISO 16889 - FILTER ELEMENT MULTIPASS REPORT SHEET
Test File Name: 100714-00-7
TEST RESULTS II

| Time interval | | d > 4 μm(c) | d > 5 μm(c) | d > 6 μm(c) | d > 7 μm(c) | d > 8 μm(c) | d > 10 μm(c) | d > 12 μm(c) | d > 14 μm(c) | d > 15 μm(c) | d > 17 μm(c) | d > 20 μm(c) | d > 25 μm(c) | d > 30 μm(c) | d > 35 μm(c) | d > 40 μm(c) | d > 50 μm(c) |
|---|---|---|---|---|---|---|---|---|---|---|---|---|---|---|---|---|---|
| Initial | | 164.0 | 111.7 | 70.7 | 52.3 | 42.0 | 21.5 | 17.4 | 13.3 | 9.2 | 6.2 | 2.1 | 1.0 | 1.0 | 0.0 | 0.0 | 0.0 |
| 10% | Up | 14808.5 | 8968.3 | 5670.8 | 3711.4 | 2517.7 | 1253.5 | 720.4 | 418.3 | 331.0 | 215.2 | 111.9 | 36.2 | 15.9 | 5.3 | 4.3 | 2.4 |
| | Down | 6.5 | 2.6 | 1.7 | 1.2 | 1.0 | 0.5 | 0.0 | 0.0 | 0.0 | 0.0 | 0.0 | 0.0 | 0.0 | 0.0 | 0.0 | 0.0 |
| | β | 2276.6 | 3385.2 | 3359.2 | 3084.0 | 2619.8 | 2616.1 | 100000.0 | 100000.0 | 100000.0 | 100000.0 | 100000.0 | 100000.0 | 100000.0 | 100000.0 | 100000.0 | 100000.0 |
| 20% | Up | 22208.2 | 13480.3 | 8477.8 | 5565.4 | 3768.3 | 1891.4 | 1046.0 | 636.3 | 503.5 | 325.8 | 171.4 | 66.8 | 27.3 | 13.3 | 8.3 | 3.5 |
| | Down | 12.8 | 7.7 | 4.1 | 2.3 | 0.9 | 0.4 | 0.1 | 0.0 | 0.0 | 0.0 | 0.0 | 0.0 | 0.0 | 0.0 | 0.0 | 0.0 |
| | β | 1729.4 | 1757.5 | 2056.5 | 2460.0 | 4241.2 | 4736.4 | 12940.1 | 100000.0 | 100000.0 | 100000.0 | 100000.0 | 100000.0 | 100000.0 | 100000.0 | 100000.0 | 100000.0 |
| 30% | Up | 26633.8 | 16186.1 | 10179.8 | 6660.2 | 4504.9 | 2289.9 | 1297.5 | 776.4 | 616.3 | 393.6 | 214.9 | 85.8 | 42.0 | 19.6 | 11.0 | 6.7 |
| | Down | 39.0 | 23.0 | 14.9 | 9.0 | 5.5 | 3.0 | 1.9 | 1.2 | 0.9 | 0.7 | 0.3 | 0.0 | 0.0 | 0.0 | 0.0 | 0.0 |
| | β | 683.1 | 702.8 | 683.8 | 736.6 | 815.4 | 763.5 | 693.6 | 642.7 | 696.7 | 546.5 | 669.2 | 100000.0 | 100000.0 | 100000.0 | 100000.0 | 100000.0 |
| 40% | Up | 28127.6 | 17100.8 | 10751.2 | 7048.3 | 4773.0 | 2423.2 | 1369.3 | 815.9 | 660.9 | 429.9 | 240.3 | 93.2 | 41.6 | 21.8 | 13.0 | 6.2 |
| | Down | 77.9 | 45.3 | 28.2 | 17.6 | 10.9 | 5.4 | 2.5 | 1.1 | 0.9 | 0.7 | 0.2 | 0.1 | 0.0 | 0.0 | 0.0 | 0.0 |
| | β | 361.2 | 377.8 | 380.8 | 401.1 | 437.2 | 450.3 | 550.0 | 776.3 | 739.2 | 585.0 | 978.8 | 1123.3 | 100000.0 | 100000.0 | 100000.0 | 100000.0 |
| 50% | Up | 28578.0 | 17324.1 | 10887.0 | 7155.4 | 4861.6 | 2501.3 | 1402.7 | 849.4 | 676.5 | 451.1 | 244.6 | 92.8 | 39.1 | 21.6 | 14.0 | 6.6 |
| | Down | 141.8 | 82.9 | 54.2 | 33.9 | 23.5 | 10.7 | 5.8 | 3.0 | 2.5 | 1.8 | 1.0 | 0.2 | 0.0 | 0.0 | 0.0 | 0.0 |
| | β | 201.5 | 208.9 | 200.8 | 210.8 | 206.5 | 233.5 | 239.9 | 279.6 | 265.4 | 246.7 | 237.5 | 396.1 | 100000.0 | 100000.0 | 100000.0 | 100000.0 |
| 60% | Up | 28730.1 | 17404.0 | 10950.2 | 7198.6 | 4891.4 | 2473.6 | 1397.1 | 847.5 | 683.5 | 439.8 | 239.0 | 92.7 | 40.6 | 24.5 | 15.1 | 6.6 |
| | Down | 193.2 | 114.3 | 71.9 | 44.4 | 30.6 | 15.0 | 8.3 | 4.6 | 3.1 | 1.8 | 0.5 | 0.2 | 0.0 | 0.0 | 0.0 | 0.0 |
| | β | 148.7 | 152.3 | 152.4 | 162.2 | 159.9 | 164.4 | 169.2 | 185.0 | 219.2 | 250.8 | 513.4 | 394.9 | 100000.0 | 100000.0 | 100000.0 | 100000.0 |
| 70% | Up | 28808.2 | 17512.1 | 11063.4 | 7232.9 | 4882.9 | 2502.5 | 1401.8 | 852.4 | 676.8 | 438.6 | 240.4 | 87.9 | 39.0 | 19.1 | 11.4 | 5.2 |
| | Down | 256.1 | 152.4 | 95.7 | 60.9 | 43.0 | 20.2 | 10.9 | 6.5 | 4.7 | 2.7 | 1.4 | 0.2 | 0.0 | 0.0 | 0.0 | 0.0 |
| | β | 112.5 | 114.9 | 115.6 | 118.7 | 113.5 | 123.8 | 128.6 | 131.5 | 143.3 | 161.3 | 175.4 | 360.5 | 100000.0 | 100000.0 | 100000.0 | 100000.0 |
| 80% | Up | 28799.3 | 17402.5 | 10971.8 | 7189.2 | 4885.4 | 2454.7 | 1377.7 | 829.7 | 667.6 | 432.6 | 232.5 | 88.6 | 38.7 | 19.7 | 13.1 | 5.1 |
| | Down | 306.7 | 185.3 | 117.3 | 77.0 | 51.6 | 25.2 | 15.0 | 8.1 | 6.3 | 3.8 | 1.4 | 0.5 | 0.2 | 0.0 | 0.0 | 0.0 |
| | β | 93.9 | 93.9 | 93.6 | 93.4 | 94.7 | 97.3 | 91.6 | 101.8 | 105.9 | 113.3 | 171.8 | 186.4 | 243.9 | 100000.0 | 100000.0 | 100000.0 |
| 90% | Up | 28665.7 | 17366.1 | 10956.8 | 7197.1 | 4908.4 | 2507.7 | 1429.1 | 860.6 | 693.8 | 451.8 | 250.4 | 94.7 | 42.7 | 20.8 | 13.7 | 7.8 |
| | Down | 374.3 | 225.9 | 141.0 | 91.9 | 61.5 | 30.5 | 15.3 | 8.4 | 6.7 | 3.9 | 1.2 | 0.3 | 0.1 | 0.0 | 0.0 | 0.0 |
| | β | 76.6 | 76.9 | 77.7 | 78.4 | 79.8 | 82.1 | 93.6 | 102.9 | 102.2 | 116.4 | 204.1 | 368.8 | 495.8 | 100000.0 | 100000.0 | 100000.0 |
| 100% | Up | 28887.4 | 17534.4 | 11073.7 | 7275.9 | 4956.3 | 2507.8 | 1422.0 | 854.5 | 689.8 | 445.4 | 244.9 | 96.9 | 43.0 | 24.4 | 14.3 | 8.3 |
| | Down | 415.4 | 244.7 | 153.5 | 100.9 | 66.2 | 34.1 | 18.4 | 10.3 | 8.0 | 4.6 | 1.7 | 0.0 | 0.0 | 0.0 | 0.0 | 0.0 |
| | β | 69.5 | 71.7 | 72.1 | 72.1 | 74.9 | 73.6 | 77.3 | 83.3 | 86.6 | 97.9 | 144.0 | 100000.0 | 100000.0 | 100000.0 | 100000.0 | 100000.0 |
| Average | Up | 25413.5 | 15425.1 | 9711.5 | 6367.4 | 4314.2 | 2190.8 | 1233.6 | 742.3 | 592.6 | 385.0 | 208.9 | 79.3 | 35.1 | 17.9 | 11.0 | 5.3 |
| | Down | 103.9 | 61.2 | 38.7 | 24.2 | 16.5 | 7.9 | 4.2 | 2.3 | 1.7 | 1.1 | 0.5 | 0.1 | 0.0 | 0.0 | 0.0 | 0.0 |
| | β | 244.6 | 252.1 | 251.1 | 263.2 | 261.6 | 277.7 | 293.3 | 317.6 | 340.9 | 347.3 | 426.0 | 697.7 | 100000.0 | 100000.0 | 100000.0 | 100000.0 |

ISO 16889 - FILTER ELEMENT MULTIPASS REPORT SHEET
Test File Name: 100624-00-1
TEST RESULTS II Particle counts (per mL) and filtration ratio

| Time interval | | d > 4 μm(c) | d > 5 μm(c) | d > 6 μm(c) | d > 7 μm(c) | d > 8 μm(c) | d > 10 μm(c) | d > 12 μm(c) | d > 14 μm(c) | d > 15 μm(c) | d > 17 μm(c) | d > 20 μm(c) | d > 25 μm(c) | d > 30 μm(c) | d > 35 μm(c) | d > 40 μm(c) | d > 50 μm(c) |
|---|---|---|---|---|---|---|---|---|---|---|---|---|---|---|---|---|---|
| Initial | | 6556.7 | 3694.8 | 2202.2 | 1387.2 | 927.0 | 456.4 | 240.0 | 117.6 | 84.7 | 53.6 | 26.4 | 6.6 | 0.9 | 0.9 | 0.9 | 0.9 |
| 10% | Up | 11288.2 | 6863.7 | 4365.5 | 2897.0 | 1983.9 | 1028.3 | 590.3 | 361.4 | 290.9 | 194.1 | 111.3 | 49.2 | 24.4 | 13.8 | 9.0 | 4.1 |
| | Down | 16.0 | 9.7 | 6.2 | 3.7 | 2.2 | 0.8 | 0.4 | 0.2 | 0.2 | 0.1 | 0.1 | 0.0 | 0.0 | 0.0 | 0.0 | 0.0 |
| | β | 704.8 | 704.4 | 707.4 | 779.9 | 895.9 | 1289.9 | 1471.9 | 1632.9 | 1405.8 | 1300.0 | 1276.2 | 1669.3 | 829.5 | 469.9 | 626.6 | 100000.0 |
| 20% | Up | 10660.5 | 6511.7 | 4144.6 | 2754.8 | 1894.3 | 985.2 | 570.2 | 351.3 | 286.9 | 189.8 | 108.7 | 46.5 | 22.5 | 12.8 | 8.5 | 4.3 |
| | Down | 2.0 | 1.0 | 0.6 | 0.4 | 0.3 | 0.1 | 0.0 | 0.0 | 0.0 | 0.0 | 0.0 | 0.0 | 0.0 | 0.0 | 0.0 | 0.0 |
| | β | 5396.0 | 6328.0 | 6504.5 | 7249.1 | 7378.9 | 10726.5 | 39230.4 | 100000.0 | 100000.0 | 100000.0 | 100000.0 | 100000.0 | 100000.0 | 100000.0 | 100000.0 | 100000.0 |
| 30% | Up | 10637.3 | 6486.4 | 4119.2 | 2736.1 | 1876.2 | 978.3 | 567.7 | 351.7 | 282.0 | 185.9 | 107.1 | 46.9 | 22.7 | 12.5 | 7.8 | 3.9 |
| | Down | 1.5 | 0.8 | 0.4 | 0.2 | 0.1 | 0.0 | 0.0 | 0.0 | 0.0 | 0.0 | 0.0 | 0.0 | 0.0 | 0.0 | 0.0 | 0.0 |
| | β | 7038.2 | 7766.2 | 9510.8 | 11277.3 | 17600.8 | 24875.3 | 43509.9 | 100000.0 | 100000.0 | 100000.0 | 100000.0 | 100000.0 | 100000.0 | 100000.0 | 100000.0 | 100000.0 |
| 40% | Up | 10662.6 | 6504.7 | 4138.9 | 2759.3 | 1902.0 | 994.6 | 571.2 | 353.0 | 284.7 | 190.4 | 109.2 | 47.2 | 23.8 | 14.0 | 9.0 | 4.7 |
| | Down | 1.2 | 0.5 | 0.3 | 0.2 | 0.1 | 0.0 | 0.0 | 0.0 | 0.0 | 0.0 | 0.0 | 0.0 | 0.0 | 0.0 | 0.0 | 0.0 |
| | β | 8840.9 | 13537.0 | 14079.8 | 15949.3 | 20415.0 | 38857.6 | 22315.3 | 27764.1 | 22394.5 | 100000.0 | 100000.0 | 100000.0 | 100000.0 | 100000.0 | 100000.0 | 100000.0 |
| 50% | Up | 10668.5 | 6497.6 | 4131.7 | 2748.3 | 1890.8 | 983.6 | 564.9 | 345.8 | 279.2 | 185.4 | 104.9 | 45.6 | 22.0 | 12.8 | 7.9 | 4.2 |
| | Down | 1.3 | 0.7 | 0.5 | 0.3 | 0.2 | 0.1 | 0.0 | 0.0 | 0.0 | 0.0 | 0.0 | 0.0 | 0.0 | 0.0 | 0.0 | 0.0 |
| | β | 8123.0 | 9427.1 | 8928.7 | 9812.4 | 8801.5 | 14375.9 | 20080.8 | 12294.2 | 9924.8 | 6591.9 | 7355.3 | 3198.3 | 1542.7 | 895.0 | 553.7 | 100000.0 |
| 60% | Up | 10686.3 | 6506.8 | 4134.1 | 2740.9 | 1879.6 | 980.9 | 568.6 | 349.8 | 283.4 | 185.6 | 107.4 | 45.9 | 22.6 | 12.9 | 8.1 | 4.6 |
| | Down | 1.3 | 0.6 | 0.3 | 0.2 | 0.2 | 0.1 | 0.1 | 0.0 | 0.0 | 0.0 | 0.0 | 0.0 | 0.0 | 0.0 | 0.0 | 0.0 |
| | β | 8362.5 | 11202.7 | 12378.5 | 13023.3 | 11763.5 | 18553.6 | 10755.3 | 13628.8 | 11041.6 | 14244.1 | 8243.4 | 3519.9 | 100000.0 | 100000.0 | 100000.0 | 100000.0 |
| 70% | Up | 10698.3 | 6508.0 | 4143.5 | 2753.3 | 1892.6 | 980.7 | 566.8 | 348.9 | 282.3 | 189.1 | 108.5 | 46.3 | 23.0 | 12.6 | 8.2 | 4.3 |
| | Down | 3.6 | 1.8 | 1.0 | 0.6 | 0.4 | 0.2 | 0.0 | 0.0 | 0.0 | 0.0 | 0.0 | 0.0 | 0.0 | 0.0 | 0.0 | 0.0 |
| | β | 2980.8 | 3535.2 | 4254.7 | 4554.7 | 4876.6 | 6157.5 | 14195.9 | 12862.0 | 10407.0 | 13549.8 | 100000.0 | 100000.0 | 100000.0 | 100000.0 | 100000.0 | 100000.0 |
| 80% | Up | 10660.0 | 6498.8 | 4135.9 | 2752.4 | 1896.6 | 992.9 | 572.8 | 352.2 | 284.9 | 190.2 | 109.6 | 47.5 | 24.0 | 13.8 | 9.0 | 4.9 |
| | Down | 19.3 | 10.3 | 6.0 | 4.0 | 2.9 | 1.8 | 1.3 | 1.0 | 1.0 | 0.8 | 0.6 | 0.4 | 0.2 | 0.1 | 0.1 | 0.0 |
| | β | 551.6 | 633.6 | 689.3 | 679.9 | 664.6 | 566.0 | 437.2 | 330.8 | 286.2 | 246.9 | 176.7 | 134.1 | 146.8 | 125.9 | 164.5 | 187.5 |
| 90% | Up | 10781.9 | 6577.8 | 4190.1 | 2791.3 | 1923.0 | 1011.9 | 580.5 | 359.8 | 290.7 | 194.8 | 110.2 | 48.9 | 24.8 | 13.6 | 8.8 | 4.8 |
| | Down | 23.4 | 12.4 | 6.8 | 3.7 | 2.4 | 1.1 | 0.7 | 0.6 | 0.5 | 0.4 | 0.2 | 0.1 | 0.0 | 0.0 | 0.0 | 0.0 |
| | β | 461.6 | 531.9 | 616.9 | 748.6 | 811.1 | 884.5 | 790.3 | 644.9 | 589.2 | 521.7 | 458.6 | 447.0 | 928.8 | 100000.0 | 100000.0 | 100000.0 |
| 100% | Up | 10919.4 | 6641.0 | 4235.1 | 2826.1 | 1944.5 | 1009.5 | 583.8 | 360.2 | 291.9 | 196.2 | 111.1 | 49.0 | 25.7 | 15.3 | 10.2 | 5.3 |
| | Down | 14.2 | 6.6 | 3.2 | 1.5 | 0.6 | 0.3 | 0.2 | 0.1 | 0.1 | 0.0 | 0.0 | 0.0 | 0.0 | 0.0 | 0.0 | 0.0 |
| | β | 771.4 | 1003.2 | 1311.0 | 1927.6 | 3131.2 | 3940.8 | 3336.8 | 3466.4 | 4537.3 | 7578.4 | 8412.8 | 100000.0 | 100000.0 | 100000.0 | 100000.0 | 100000.0 |
| Average | Up | 10757.4 | 6554.1 | 4168.2 | 2770.0 | 1902.8 | 990.2 | 571.4 | 351.7 | 284.2 | 188.6 | 108.2 | 46.8 | 23.0 | 13.1 | 8.3 | 4.3 |
| | Down | 3.8 | 2.2 | 1.3 | 0.8 | 0.5 | 0.2 | 0.1 | 0.0 | 0.0 | 0.0 | 0.0 | 0.0 | 0.0 | 0.0 | 0.0 | 0.0 |
| | β | 2800.3 | 3018.3 | 3135.3 | 3459.2 | 3879.3 | 5614.7 | 6954.7 | 7816.6 | 6618.2 | 6458.3 | 6612.1 | 5773.1 | 3683.8 | 2093.1 | 2040.1 | 100000.0 |

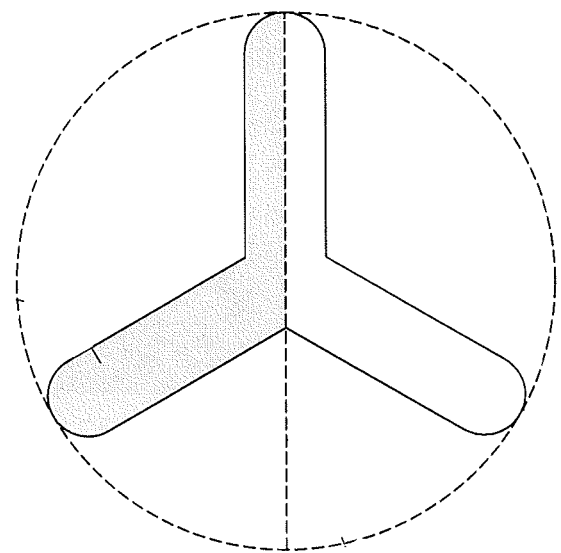
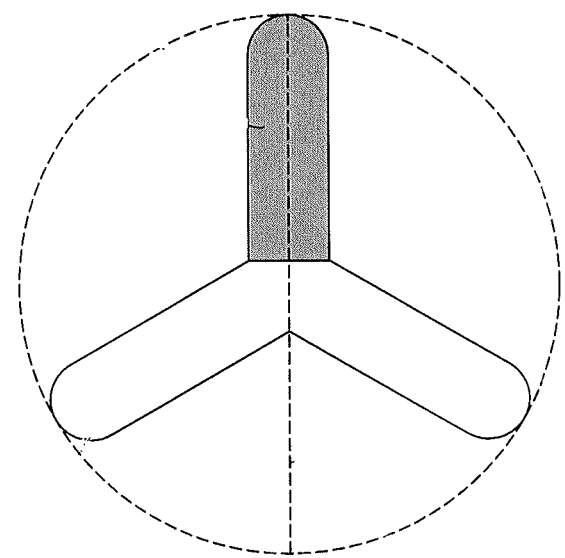
FIG. 23(G)

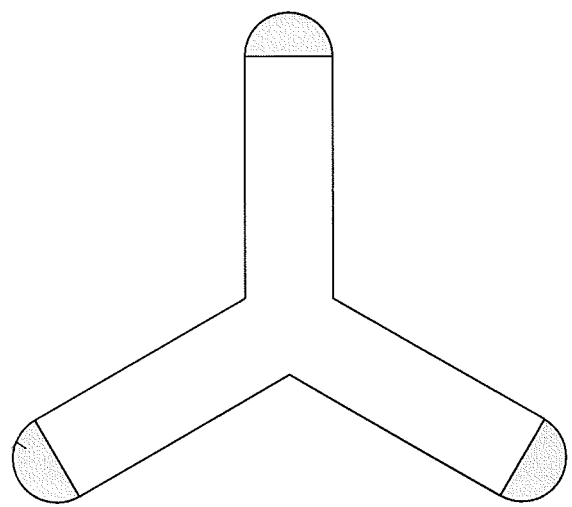
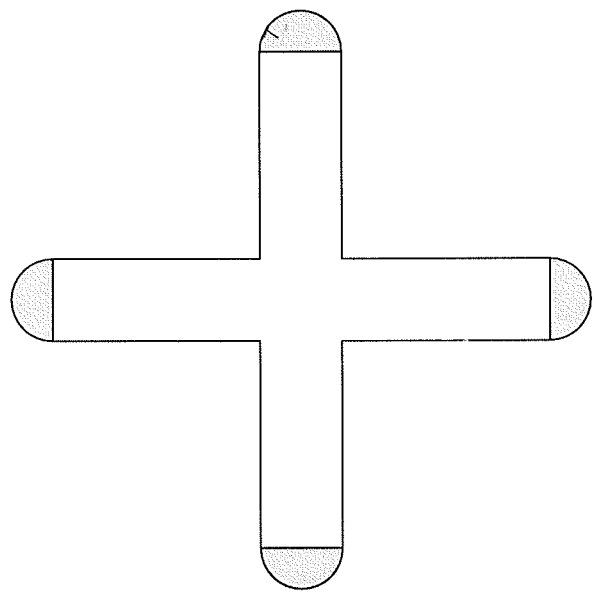
FIG. 23(H)

ISO 16889 - FILTER ELEMENT MULTIPASS REPORT SHEET
Test File Name: 100831-00-1

TEST RESULTS II

Particle counts (per mL) and filtration ratio

| Time interval | | d > 4 μm(c) | d > 5 μm(c) | d > 6 μm(c) | d > 7 μm(c) | d > 8 μm(c) | d > 10 μm(c) | d > 12 μm(c) | d > 14 μm(c) | d > 15 μm(c) | d > 17 μm(c) | d > 20 μm(c) | d > 25 μm(c) | d > 30 μm(c) | d > 35 μm(c) | d > 40 μm(c) | d > 50 μm(c) |
|---|---|---|---|---|---|---|---|---|---|---|---|---|---|---|---|---|---|
| Initial | | 188.6 | 80.3 | 45.1 | 16.1 | 10.0 | 5.0 | 4.0 | 3.0 | 2.0 | 2.0 | 2.0 | 1.0 | 0.0 | 0.0 | 0.0 | 0.0 |
| 10% | Up | 11459.1 | 6946.2 | 4395.0 | 2906.4 | 1987.2 | 1012.6 | 568.4 | 341.8 | 274.5 | 177.1 | 95.5 | 36.5 | 16.1 | 7.6 | 4.6 | 2.4 |
|  | Down | 270.5 | 146.7 | 83.2 | 48.4 | 30.4 | 12.4 | 5.8 | 3.2 | 2.5 | 1.6 | 0.7 | 0.2 | 0.1 | 0.1 | 0.0 | 0.0 |
|  | β | 42.4 | 47.4 | 52.8 | 60.1 | 65.3 | 81.7 | 98.0 | 108.3 | 109.9 | 112.8 | 144.8 | 157.2 | 180.2 | 140.5 | 262.1 | 100000.0 |
| 20% | Up | 11491.2 | 6959.3 | 4395.9 | 2906.2 | 1989.5 | 1015.1 | 571.2 | 349.0 | 280.0 | 183.6 | 98.9 | 40.1 | 18.1 | 9.6 | 5.6 | 2.6 |
|  | Down | 273.6 | 151.0 | 87.6 | 53.3 | 32.5 | 13.2 | 6.1 | 3.1 | 2.3 | 1.3 | 0.7 | 0.3 | 0.1 | 0.1 | 0.0 | 0.0 |
|  | β | 42.0 | 46.1 | 50.2 | 54.5 | 61.3 | 77.0 | 94.4 | 113.6 | 120.5 | 137.8 | 137.1 | 147.2 | 140.4 | 118.4 | 172.8 | 100000.0 |
| 30% | Up | 11515.1 | 6976.5 | 4409.8 | 2906.3 | 1980.6 | 1015.6 | 570.0 | 344.6 | 274.7 | 178.6 | 98.1 | 37.8 | 17.1 | 8.7 | 5.4 | 3.0 |
|  | Down | 300.6 | 164.7 | 94.9 | 57.0 | 35.3 | 14.0 | 6.4 | 3.1 | 2.2 | 1.3 | 0.7 | 0.3 | 0.1 | 0.1 | 0.1 | 0.0 |
|  | β | 38.3 | 42.4 | 46.5 | 51.0 | 56.2 | 72.8 | 88.9 | 112.1 | 127.1 | 137.6 | 149.6 | 130.5 | 151.8 | 107.6 | 82.2 | 90.0 |
| 40% | Up | 11601.6 | 7034.8 | 4432.6 | 2923.5 | 1998.8 | 1013.8 | 565.6 | 339.0 | 268.5 | 174.1 | 97.0 | 38.9 | 17.5 | 9.3 | 5.5 | 3.0 |
|  | Down | 387.1 | 212.1 | 122.7 | 72.1 | 43.3 | 16.5 | 7.2 | 3.6 | 2.6 | 1.5 | 0.8 | 0.3 | 0.2 | 0.1 | 0.1 | 0.0 |
|  | β | 30.0 | 33.2 | 36.1 | 40.5 | 46.1 | 61.6 | 78.1 | 94.1 | 103.5 | 113.3 | 129.0 | 128.3 | 99.1 | 97.0 | 57.1 | 61.7 |
| 50% | Up | 11785.4 | 7127.4 | 4484.5 | 2950.2 | 2004.4 | 1019.8 | 571.9 | 341.3 | 274.2 | 176.2 | 99.1 | 38.6 | 17.3 | 8.9 | 5.5 | 2.8 |
|  | Down | 564.7 | 308.3 | 176.7 | 102.4 | 60.7 | 22.9 | 9.7 | 4.6 | 3.2 | 1.8 | 0.8 | 0.4 | 0.1 | 0.1 | 0.1 | 0.0 |
|  | β | 20.9 | 23.1 | 25.4 | 28.8 | 33.0 | 44.5 | 58.7 | 74.1 | 86.3 | 95.6 | 121.1 | 105.0 | 136.2 | 139.4 | 114.8 | 170.1 |
| 60% | Up | 12015.9 | 7258.1 | 4572.1 | 3010.5 | 2045.8 | 1032.0 | 576.4 | 341.3 | 273.1 | 178.4 | 97.5 | 37.1 | 17.6 | 9.3 | 5.6 | 2.7 |
|  | Down | 803.8 | 440.2 | 251.1 | 146.7 | 86.8 | 31.7 | 12.7 | 6.1 | 4.3 | 2.2 | 1.1 | 0.3 | 0.1 | 0.1 | 0.0 | 0.0 |
|  | β | 14.9 | 16.5 | 18.2 | 20.5 | 23.6 | 32.5 | 45.5 | 56.4 | 63.2 | 79.4 | 92.1 | 128.2 | 136.5 | 146.1 | 116.3 | 100000.0 |
| 70% | Up | 12222.6 | 7361.7 | 4626.8 | 3035.8 | 2061.4 | 1039.5 | 579.3 | 344.2 | 275.7 | 176.5 | 96.3 | 37.3 | 16.7 | 8.6 | 5.5 | 2.5 |
|  | Down | 1025.5 | 555.3 | 311.9 | 181.1 | 106.7 | 39.0 | 14.8 | 6.6 | 4.7 | 2.6 | 1.2 | 0.5 | 0.2 | 0.0 | 0.0 | 0.0 |
|  | β | 11.9 | 13.3 | 14.8 | 16.8 | 19.3 | 26.6 | 39.0 | 52.3 | 59.2 | 69.1 | 81.1 | 70.3 | 94.7 | 180.4 | 173.0 | 155.5 |
| 80% | Up | 12557.9 | 7570.1 | 4746.6 | 3104.6 | 2098.7 | 1058.4 | 590.6 | 355.0 | 286.2 | 185.7 | 103.9 | 41.2 | 18.1 | 9.6 | 5.9 | 2.9 |
|  | Down | 1241.7 | 672.9 | 381.4 | 221.4 | 131.2 | 47.4 | 18.0 | 7.3 | 4.7 | 2.3 | 1.1 | 0.4 | 0.2 | 0.1 | 0.0 | 0.0 |
|  | β | 10.1 | 11.2 | 12.4 | 14.0 | 16.0 | 22.3 | 32.7 | 48.9 | 60.6 | 79.4 | 95.6 | 99.2 | 75.8 | 100.0 | 123.0 | 184.7 |
| 90% | Up | 12797.6 | 7698.9 | 4830.4 | 3157.2 | 2136.0 | 1078.5 | 601.9 | 356.1 | 285.7 | 186.2 | 101.3 | 41.2 | 19.0 | 10.8 | 6.9 | 3.3 |
|  | Down | 1464.2 | 794.0 | 449.9 | 262.1 | 152.8 | 56.1 | 20.8 | 7.8 | 5.0 | 2.6 | 1.0 | 0.3 | 0.1 | 0.1 | 0.0 | 0.0 |
|  | β | 8.7 | 9.7 | 10.7 | 12.0 | 14.0 | 19.2 | 28.9 | 45.7 | 56.9 | 72.7 | 105.3 | 128.3 | 232.0 | 326.6 | 415.3 | 100000.0 |
| 100% | Up | -4725.3 | -2485.6 | -1267.1 | -648.9 | -266.2 | 42.4 | 24.2 | -10.0 | 13.7 | -42.1 | -28.2 | -2.8 | -4.6 | -3.2 | -2.2 | -1.4 |
|  | Down | 451.4 | 248.0 | 141.1 | 81.1 | 48.4 | 17.2 | 6.5 | 2.8 | 2.0 | 1.0 | 0.4 | 0.2 | 0.1 | 0.0 | 0.0 | 0.0 |
|  | β | -10.5 | -10.0 | -9.0 | -8.0 | -5.5 | 2.5 | 3.7 | -3.5 | 6.8 | -41.0 | -71.2 | -15.5 | -40.9 | -66.2 | -46.5 | -85.6 |
| Average | Up | 11727.3 | 7094.9 | 4473.8 | 2948.4 | 2009.7 | 1021.2 | 571.8 | 343.0 | 274.4 | 177.8 | 97.5 | 38.1 | 17.2 | 8.9 | 5.4 | 2.7 |
|  | Down | 518.0 | 282.6 | 161.2 | 94.4 | 56.5 | 21.4 | 9.0 | 4.3 | 3.1 | 1.8 | 0.8 | 0.3 | 0.1 | 0.1 | 0.0 | 0.0 |
|  | β | 22.6 | 25.1 | 27.8 | 31.2 | 35.6 | 47.8 | 63.8 | 79.7 | 88.4 | 100.5 | 116.6 | 116.5 | 128.2 | 127.3 | 111.0 | 166.6 |

Bonavista Test Labs

FIG. 24

Printed: 03/Sep/2010

ISO 16889 - FILTER ELEMENT MULTIPASS REPORT SHEET
Test File Name: 100830-00-10
TEST RESULTS II Particle counts (per mL) and filtration ratio

| Time interval | | d > 4 μm(c) | d > 5 μm(c) | d > 6 μm(c) | d > 7 μm(c) | d > 8 μm(c) | d > 10 μm(c) | d > 12 μm(c) | d > 14 μm(c) | d > 15 μm(c) | d > 17 μm(c) | d > 20 μm(c) | d > 25 μm(c) | d > 30 μm(c) | d > 35 μm(c) | d > 40 μm(c) | d > 50 μm(c) |
|---|---|---|---|---|---|---|---|---|---|---|---|---|---|---|---|---|---|
| Initial | | 152.2 | 102.5 | 79.2 | 63.9 | 49.7 | 35.5 | 27.4 | 22.3 | 21.3 | 20.3 | 18.3 | 12.2 | 6.1 | 3.0 | 2.0 | 1.0 |
| 10% | Up | 11166.6 | 6768.8 | 4282.3 | 2840.4 | 1941.4 | 1003.3 | 568.7 | 342.3 | 275.2 | 182.0 | 98.3 | 38.6 | 16.2 | 9.2 | 5.4 | 2.5 |
| | Down | 7.1 | 3.3 | 1.3 | 0.7 | 0.3 | 0.1 | 0.0 | 0.0 | 0.0 | 0.0 | 0.0 | 0.0 | 0.0 | 0.0 | 0.0 | 0.0 |
| | β | 1567.7 | 2037.8 | 3278.5 | 3871.0 | 6033.7 | 14618.0 | 12345.7 | 100000.0 | 100000.0 | 100000.0 | 100000.0 | 100000.0 | 100000.0 | 100000.0 | 100000.0 | 100000.0 |
| 20% | Up | 11248.6 | 6812.3 | 4302.3 | 2841.0 | 1943.5 | 995.7 | 564.0 | 342.4 | 274.0 | 177.8 | 96.8 | 36.6 | 16.5 | 9.1 | 5.3 | 3.1 |
| | Down | 17.3 | 8.7 | 4.7 | 2.4 | 1.1 | 0.3 | 0.0 | 0.0 | 0.0 | 0.0 | 0.0 | 0.0 | 0.0 | 0.0 | 0.0 | 0.0 |
| | β | 650.6 | 779.6 | 910.5 | 1201.9 | 1716.3 | 3042.4 | 14697.1 | 100000.0 | 100000.0 | 100000.0 | 100000.0 | 100000.0 | 100000.0 | 100000.0 | 100000.0 | 100000.0 |
| 30% | Up | 11252.5 | 6795.3 | 4297.3 | 2845.5 | 1943.3 | 998.4 | 567.0 | 341.4 | 274.2 | 175.5 | 97.7 | 37.6 | 16.1 | 8.9 | 5.4 | 2.6 |
| | Down | 33.0 | 17.8 | 9.7 | 5.2 | 2.8 | 0.6 | 0.2 | 0.0 | 0.0 | 0.0 | 0.0 | 0.0 | 0.0 | 0.0 | 0.0 | 0.0 |
| | β | 340.7 | 381.1 | 441.7 | 542.7 | 693.6 | 1558.9 | 3554.2 | 8587.4 | 13911.7 | 100000.0 | 100000.0 | 100000.0 | 100000.0 | 100000.0 | 100000.0 | 100000.0 |
| 40% | Up | 11262.4 | 6832.1 | 4314.6 | 2850.1 | 1940.5 | 1001.0 | 564.6 | 344.0 | 273.0 | 176.1 | 99.0 | 38.9 | 16.4 | 9.1 | 5.8 | 3.0 |
| | Down | 58.7 | 31.5 | 16.8 | 9.0 | 4.5 | 1.1 | 0.2 | 0.0 | 0.0 | 0.0 | 0.0 | 0.0 | 0.0 | 0.0 | 0.0 | 0.0 |
| | β | 191.8 | 216.9 | 256.4 | 315.2 | 435.9 | 898.6 | 2949.9 | 18411.9 | 100000.0 | 100000.0 | 100000.0 | 100000.0 | 100000.0 | 100000.0 | 100000.0 | 100000.0 |
| 50% | Up | 11292.9 | 6846.9 | 4339.9 | 2863.6 | 1954.9 | 1009.4 | 572.0 | 342.6 | 273.6 | 173.6 | 93.4 | 37.6 | 16.2 | 8.7 | 5.4 | 2.8 |
| | Down | 95.3 | 53.9 | 30.3 | 16.7 | 8.8 | 1.9 | 0.4 | 0.0 | 0.0 | 0.0 | 0.0 | 0.0 | 0.0 | 0.0 | 0.0 | 0.0 |
| | β | 118.5 | 127.1 | 143.0 | 171.2 | 223.4 | 541.9 | 1573.3 | 8371.5 | 13405.9 | 8507.7 | 100000.0 | 100000.0 | 100000.0 | 100000.0 | 100000.0 | 100000.0 |
| 60% | Up | 11334.0 | 6860.7 | 4334.8 | 2851.3 | 1950.2 | 999.5 | 561.8 | 341.1 | 271.6 | 174.9 | 97.3 | 38.5 | 17.6 | 8.7 | 4.9 | 2.4 |
| | Down | 145.0 | 81.9 | 45.7 | 25.1 | 13.7 | 3.7 | 0.8 | 0.2 | 0.2 | 0.0 | 0.0 | 0.0 | 0.0 | 0.0 | 0.0 | 0.0 |
| | β | 78.2 | 83.7 | 94.8 | 113.4 | 142.5 | 267.8 | 748.4 | 1977.7 | 4751.7 | 9231.0 | 100000.0 | 100000.0 | 100000.0 | 100000.0 | 100000.0 | 100000.0 |
| 70% | Up | 11367.5 | 6881.5 | 4349.3 | 2875.8 | 1965.0 | 1002.8 | 557.7 | 335.0 | 268.5 | 174.0 | 94.9 | 35.6 | 16.8 | 9.2 | 5.8 | 2.6 |
| | Down | 210.8 | 118.9 | 68.2 | 37.7 | 19.9 | 5.4 | 1.0 | 0.2 | 0.1 | 0.0 | 0.0 | 0.0 | 0.0 | 0.0 | 0.0 | 0.0 |
| | β | 53.9 | 57.9 | 63.8 | 76.2 | 98.7 | 184.1 | 532.3 | 1526.7 | 2227.6 | 4541.7 | 100000.0 | 100000.0 | 100000.0 | 100000.0 | 100000.0 | 100000.0 |
| 80% | Up | 11472.0 | 6952.2 | 4395.4 | 2897.9 | 1965.8 | 1003.1 | 560.7 | 337.0 | 270.3 | 174.9 | 97.5 | 37.0 | 17.6 | 9.4 | 5.6 | 2.6 |
| | Down | 300.9 | 172.3 | 98.9 | 55.7 | 31.1 | 8.0 | 2.1 | 0.4 | 0.2 | 0.2 | 0.0 | 0.0 | 0.0 | 0.0 | 0.0 | 0.0 |
| | β | 38.1 | 40.4 | 44.4 | 52.0 | 63.2 | 125.1 | 270.5 | 761.3 | 1753.7 | 4541.7 | 100000.0 | 100000.0 | 100000.0 | 100000.0 | 100000.0 | 100000.0 |
| 90% | Up | 11545.6 | 6996.2 | 4411.5 | 2916.2 | 1992.7 | 1011.8 | 561.5 | 335.0 | 268.3 | 174.8 | 96.4 | 36.5 | 16.7 | 8.5 | 5.1 | 2.8 |
| | Down | 414.4 | 236.4 | 134.3 | 75.2 | 41.9 | 11.5 | 2.5 | 0.6 | 0.3 | 0.3 | 0.0 | 0.0 | 0.0 | 0.0 | 0.0 | 0.0 |
| | β | 27.9 | 29.6 | 32.8 | 38.8 | 47.5 | 88.1 | 224.1 | 537.6 | 953.9 | 8667.2 | 100000.0 | 100000.0 | 100000.0 | 100000.0 | 100000.0 | 100000.0 |
| 100% | Up | 11737.7 | 7131.1 | 4482.0 | 2948.9 | 2003.2 | 1010.7 | 564.1 | 336.1 | 272.7 | 179.9 | 100.1 | 40.0 | 16.5 | 9.4 | 5.5 | 3.1 |
| | Down | 565.6 | 324.3 | 191.3 | 109.4 | 62.3 | 17.7 | 4.3 | 0.9 | 0.3 | 0.3 | 0.0 | 0.0 | 0.0 | 0.0 | 0.0 | 0.0 |
| | β | 20.8 | 22.0 | 23.4 | 27.0 | 32.1 | 57.1 | 131.1 | 364.6 | 837.1 | 4596.0 | 100000.0 | 100000.0 | 100000.0 | 100000.0 | 100000.0 | 100000.0 |
| Average | Up | 11274.9 | 6828.2 | 4317.2 | 2852.5 | 1948.4 | 1001.4 | 565.1 | 341.3 | 272.9 | 176.3 | 96.8 | 37.6 | 16.6 | 9.0 | 5.4 | 2.7 |
| | Down | 81.0 | 45.2 | 25.3 | 13.9 | 7.3 | 1.9 | 0.4 | 0.1 | 0.1 | 0.0 | 0.0 | 0.0 | 0.0 | 0.0 | 0.0 | 0.0 |
| | β | 139.1 | 151.2 | 170.9 | 205.9 | 267.2 | 531.4 | 1523.1 | 4862.7 | 8769.0 | 31355.2 | 100000.0 | 100000.0 | 100000.0 | 100000.0 | 100000.0 | 100000.0 |

Bonavista Test Labs

Printed: 02/Sep/2010

ISO 16889 - FILTER ELEMENT MULTIPASS REPORT SHEET
Test File Name: 100830-00-8
TEST RESULTS II
Particle counts (per mL) and filtration ratio

| Time interval | | d > 4 μm(c) | d > 5 μm(c) | d > 6 μm(c) | d > 7 μm(c) | d > 8 μm(c) | d > 10 μm(c) | d > 12 μm(c) | d > 14 μm(c) | d > 15 μm(c) | d > 17 μm(c) | d > 20 μm(c) | d > 25 μm(c) | d > 30 μm(c) | d > 35 μm(c) | d > 40 μm(c) | d > 50 μm(c) |
|---|---|---|---|---|---|---|---|---|---|---|---|---|---|---|---|---|---|
| Initial | | 32.1 | 21.0 | 17.0 | 7.0 | 2.0 | 1.0 | 1.0 | 1.0 | 0.0 | 0.0 | 0.0 | 0.0 | 0.0 | 0.0 | 0.0 | 0.0 |
| 10% | Up | 11938.0 | 7049.6 | 4352.2 | 2825.9 | 1888.4 | 940.8 | 517.4 | 305.5 | 244.3 | 155.0 | 82.7 | 31.4 | 13.5 | 6.3 | 4.0 | 1.7 |
| | Down | 2.3 | 1.2 | 0.5 | 0.3 | 0.1 | 0.0 | 0.0 | 0.0 | 0.0 | 0.0 | 0.0 | 0.0 | 0.0 | 0.0 | 0.0 | 0.0 |
| | β | 5207.4 | 5883.2 | 8080.7 | 10490.5 | 15826.4 | 304333.2 | 100000.0 | 100000.0 | 100000.0 | 100000.0 | 100000.0 | 100000.0 | 100000.0 | 100000.0 | 100000.0 | 100000.0 |
| 20% | Up | 12063.2 | 7138.9 | 4401.4 | 2848.7 | 1900.2 | 942.2 | 518.2 | 305.0 | 243.2 | 154.7 | 82.3 | 31.9 | 13.5 | 6.7 | 3.8 | 2.1 |
| | Down | 4.4 | 1.8 | 0.9 | 0.4 | 0.1 | 0.0 | 0.0 | 0.0 | 0.0 | 0.0 | 0.0 | 0.0 | 0.0 | 0.0 | 0.0 | 0.0 |
| | β | 2754.9 | 3925.6 | 4757.1 | 7557.6 | 13032.8 | 24177.7 | 100000.0 | 100000.0 | 100000.0 | 100000.0 | 100000.0 | 100000.0 | 100000.0 | 100000.0 | 100000.0 | 100000.0 |
| 30% | Up | 12079.1 | 7157.8 | 4411.5 | 2848.7 | 1908.6 | 952.4 | 528.1 | 311.0 | 247.5 | 158.6 | 83.3 | 31.8 | 14.0 | 7.3 | 4.5 | 2.1 |
| | Down | 10.7 | 5.4 | 2.7 | 1.4 | 0.6 | 0.1 | 0.0 | 0.0 | 0.0 | 0.0 | 0.0 | 0.0 | 0.0 | 0.0 | 0.0 | 0.0 |
| | β | 1130.9 | 1329.3 | 1615.9 | 1988.5 | 3396.4 | 6540.1 | 13055.8 | 23571.0 | 100000.0 | 100000.0 | 100000.0 | 100000.0 | 100000.0 | 100000.0 | 100000.0 | 100000.0 |
| 40% | Up | 12089.2 | 7154.5 | 4407.5 | 2847.9 | 1900.5 | 939.7 | 518.3 | 310.1 | 247.1 | 158.6 | 83.0 | 31.0 | 13.3 | 7.0 | 4.1 | 2.1 |
| | Down | 24.0 | 12.0 | 6.3 | 2.9 | 1.2 | 0.2 | 0.1 | 0.0 | 0.0 | 0.0 | 0.0 | 0.0 | 0.0 | 0.0 | 0.0 | 0.0 |
| | β | 503.1 | 596.3 | 701.2 | 971.6 | 1620.5 | 5380.1 | 19012.7 | 100000.0 | 100000.0 | 100000.0 | 100000.0 | 100000.0 | 100000.0 | 100000.0 | 100000.0 | 100000.0 |
| 50% | Up | 12164.0 | 7182.5 | 4425.7 | 2854.4 | 1904.7 | 945.1 | 516.6 | 304.9 | 241.7 | 155.6 | 84.9 | 32.2 | 13.8 | 7.2 | 3.9 | 1.7 |
| | Down | 45.6 | 24.2 | 12.0 | 6.2 | 2.8 | 0.5 | 0.1 | 0.0 | 0.0 | 0.0 | 0.0 | 0.0 | 0.0 | 0.0 | 0.0 | 0.0 |
| | β | 266.9 | 297.1 | 368.6 | 463.6 | 675.2 | 1773.5 | 6474.0 | 22863.8 | 18124.3 | 100000.0 | 100000.0 | 100000.0 | 100000.0 | 100000.0 | 100000.0 | 100000.0 |
| 60% | Up | 12149.8 | 7166.9 | 4416.1 | 2852.6 | 1901.0 | 933.6 | 512.2 | 302.1 | 240.3 | 154.4 | 83.7 | 31.0 | 14.0 | 6.9 | 4.3 | 2.3 |
| | Down | 81.6 | 42.8 | 21.9 | 11.6 | 5.3 | 0.9 | 0.2 | 0.0 | 0.0 | 0.0 | 0.0 | 0.0 | 0.0 | 0.0 | 0.0 | 0.0 |
| | β | 148.8 | 167.3 | 201.4 | 245.9 | 355.9 | 993.2 | 2920.4 | 21429.9 | 100000.0 | 100000.0 | 100000.0 | 100000.0 | 100000.0 | 100000.0 | 100000.0 | 100000.0 |
| 70% | Up | 12184.9 | 7211.1 | 4451.4 | 2867.8 | 1910.0 | 942.1 | 517.5 | 310.7 | 248.0 | 159.9 | 86.7 | 33.0 | 14.2 | 7.7 | 4.3 | 1.9 |
| | Down | 129.1 | 69.4 | 37.1 | 18.8 | 9.4 | 2.1 | 0.2 | 0.1 | 0.0 | 0.0 | 0.0 | 0.0 | 0.0 | 0.0 | 0.0 | 0.0 |
| | β | 94.4 | 103.9 | 119.9 | 152.3 | 202.4 | 453.4 | 2137.6 | 5989.7 | 6465.1 | 100000.0 | 100000.0 | 100000.0 | 100000.0 | 100000.0 | 100000.0 | 100000.0 |
| 80% | Up | 12353.0 | 7298.6 | 4483.1 | 2884.8 | 1922.3 | 941.5 | 518.5 | 306.0 | 243.4 | 157.0 | 84.0 | 30.9 | 14.0 | 7.2 | 4.2 | 2.2 |
| | Down | 207.6 | 111.2 | 58.5 | 29.5 | 14.8 | 3.3 | 0.7 | 0.1 | 0.0 | 0.0 | 0.0 | 0.0 | 0.0 | 0.0 | 0.0 | 0.0 |
| | β | 59.5 | 65.6 | 76.6 | 97.6 | 129.9 | 289.7 | 745.2 | 3282.3 | 6028.8 | 100000.0 | 100000.0 | 100000.0 | 100000.0 | 100000.0 | 100000.0 | 100000.0 |
| 90% | Up | 12534.3 | 7389.2 | 4534.0 | 2919.0 | 1943.6 | 953.9 | 523.7 | 309.4 | 246.1 | 158.2 | 82.4 | 32.0 | 13.5 | 6.8 | 4.0 | 2.1 |
| | Down | 301.4 | 161.9 | 86.7 | 46.7 | 23.1 | 5.2 | 0.8 | 0.1 | 0.0 | 0.0 | 0.0 | 0.0 | 0.0 | 0.0 | 0.0 | 0.0 |
| | β | 41.6 | 45.6 | 52.3 | 62.6 | 84.2 | 184.9 | 648.8 | 2123.8 | 8957.2 | 100000.0 | 100000.0 | 100000.0 | 100000.0 | 100000.0 | 100000.0 | 100000.0 |
| 100% | Up | 12722.5 | 7485.0 | 4600.1 | 2960.1 | 1971.9 | 970.2 | 531.3 | 310.7 | 246.1 | 156.1 | 83.2 | 31.5 | 14.0 | 6.9 | 4.1 | 2.0 |
| | Down | 417.2 | 222.8 | 120.2 | 64.3 | 32.6 | 7.6 | 1.2 | 0.2 | 0.1 | 0.0 | 0.0 | 0.0 | 0.0 | 0.0 | 0.0 | 0.0 |
| | β | 30.5 | 33.6 | 38.3 | 46.0 | 60.5 | 128.1 | 426.8 | 1790.9 | 4617.8 | 11554.9 | 100000.0 | 100000.0 | 100000.0 | 100000.0 | 100000.0 | 100000.0 |
| Average | Up | 12095.5 | 7151.6 | 4409.4 | 2849.4 | 1901.9 | 942.3 | 518.3 | 307.0 | 244.6 | 156.7 | 83.8 | 31.8 | 13.7 | 7.0 | 4.1 | 2.0 |
| | Down | 42.5 | 22.4 | 11.6 | 5.9 | 2.8 | 0.6 | 0.1 | 0.0 | 0.0 | 0.0 | 0.0 | 0.0 | 0.0 | 0.0 | 0.0 | 0.0 |
| | β | 284.4 | 319.3 | 378.5 | 479.5 | 679.2 | 1673.7 | 6421.9 | 23236.9 | 33119.7 | 100000.0 | 100000.0 | 100000.0 | 100000.0 | 100000.0 | 100000.0 | 100000.0 |

Bonavista Test Labs

Printed: 02/Sep/2010

NON-PLEATED TUBULAR DEPTH FILTER HAVING FINE FIBER FILTRATION MEDIA

CROSS-REFERENCE TO RELATED PATENT APPLICATIONS

This patent application claims the benefit of U.S. Provisional Patent Application No. 61/383,569 filed Sep. 16, 2010; and U.S. Provisional Patent Application No. 61/308,488 filed Feb. 26, 2010; and U.S. Provisional Patent Application No. 61/330,462 filed May 3, 2010; and U.S. Provisional Patent Application No. 61/383,487 filed Sep. 16, 2010, the entire teachings and disclosure of which are incorporated herein by reference thereto.

FIELD OF THE INVENTION

The present invention generally relates to depth filters, and more particularly relates to non-pleated tubular rings of depth media and the filtration medias employed in such depth filters.

BACKGROUND OF THE INVENTION

Fluid streams such as liquid flows and gaseous flows (e.g. air flows) often carry solid particulates and undesirable liquid droplets that are often undesirable contaminants entrained in the fluid stream. Filters are commonly employed to remove some or all of the particulates from the fluid stream. Often filters are characterized as depth filters wherein particulates filter throughout the depth of the filter media, or as surface filters, whereby particulates are trapped along the surface of the filter media.

Filter media including fine fibers formed using an electrostatic spinning process is also known. Such prior art includes Filter Material Construction and Method, U.S. Pat. No. 5,672,399; Cellulosic/Polyamide Composite, U.S. Patent Publication No. 2007/0163217; Filtration Medias, Fine Fibers Under 100 Nanometers, And Methods, U.S. Patent Publication No. 2009/0199717; Integrated Nanofiber Filter Media, U.S. Patent Publication No. 2009/0266759; Filter Media Having Bi-Component Nanofiber Layer, U.S. Provisional Patent Application No. 61/047,455; Expanded Composite Filter Media Including Nanofiber Matrix and Method, U.S. Provisional Patent Application No. 61/308,488; and Compressed Nanofiber Composite Media, U.S. Provisional Patent Application No. 61/330,462, the entire disclosures of which are incorporated herein by reference thereto.

Often, such fine fibers have been employed in surface loading applications. There is publication proposing use of gradient depth media in the form of a single pleated sheet of filter media comprising alternative layers of scrim and nanofibers, such as in U.S. Pat. No. 6,521,321 to Kahlbaugh et al. While the '321 patent to Kahlbaugh suggests that the possibility of an application to liquid filtration, it acknowledges through examples and in description that it is primarily focused upon air or gas filtration (e.g. cabin air, engine air, tobacco smoke). Further, the depth filtration appears limited to the depth of the sheet itself as it is often discussed in association with a pleated configuration. Further, it is believed that previously fine fibers (and particularly electrospun fibers) have generally not been applied to liquid applications due to the momentum of liquids and viscosity to tend to pull particulates through such a fine fiber layer. Instead it is believed that such fine fibers have typically been employed in air filtration applications.

BRIEF SUMMARY OF THE INVENTION

The invention provides improvements related to non-pleated depth filters, in which fine fibers may be configured in a tubular ring of depth media. With techniques discussed herein relative to arrangement and coverage of fine fibers, certain embodiments although not exclusively limited thereto, have particular application to liquid filtration.

According to one inventive aspect, a filter element, comprises a non-pleated tubular ring of a depth media having a media thickness of at least about ¼ centimeter. The depth media comprises carrier fibers and fine fibers. The carrier fibers having an average size of greater than about 600 nanometer; and the fine fibers having an average size of less than 800 nanometers carried by the carrier fibers. A certain ratio between carrier and fine fibers is provided wherein the fine fibers have a size that is at least 4 times as small as the carrier fibers.

For example, electro-blown or electro-spun fibers may provide the fine fibers. However, the smaller the fine fibers are the more preferred and have benefits, and it is an inventive aspect with use of electro-spun fine fibers having that can have diameters less than 500 nanometers and more preferably less than 250 nanometers (and most preferably less than 100 nanometer).

In many embodiments and according to another inventive aspect, multiple at least partially overlapping wraps of a sheet employing fine fibers is used. For example, the filter element may comprise a first filter media sheet, wherein the first filter media sheet comprises at least one substrate and at least one layer of the fine fibers deposited thereon. The sheet is wound at least partially about itself to create multiple layers of the first filter media sheet throughout the depth of the depth media.

One particular sheet useful in winding embodiments is a multilayer composite. The first filter media sheet can comprise a composite media of a plurality of scrim layers and a plurality of fine fiber layers of fine fibers laminated together in the first filter media sheet. Selected fine fiber layers are spaced apart and separated within the first filter media sheet by the scrim. The filter media sheet itself can have a high coverage level of electrospun fine fibers having an average size of less than 500 nanometers of at least about 5,000 km/m$^2$, and preferably higher according to various embodiments.

Based on testing, the first filter media has a filtration efficiency substantially comparable to or better than microglass filtration media for a preselected filtration application. Thus, it may serve as a substitute for micro-glass filter medias and eliminating micro-glass entirely from a filtration structure while at the same time providing a high efficiency with suitable application flow/lifespan requirements.

Another preferred feature is the provision of a high lineal coverage of nanofibers in terms of kilometers per square meter can be accomplished both in an individual wrap or sheet or collectively throughout the depth of the element (with square meters being measure at average diameter). For example, the depth media may have a coverage of fine fibers carried throughout the depth of at least 0.1 gram/m$^2$, and at least about 10,000 km/m$^2$; more preferably a coverage of fine fibers carried throughout the depth of at least 0.5 grams/m$^2$, and at least about 50,000 km/m$^2$; and most preferably a coverage of fine fibers carried throughout the depth of at least 1.0 grams/m$^2$, and at least about 100,000 km/m$^2$.

According to another inventive aspect that may incorporate the above features, a filter element, comprises a non-pleated tubular ring of a depth media having a media thickness of at least about ¼ centimeter. The depth media comprises carrier fibers and fine fibers, the carrier fibers having an average size of at least about 3 micron; and the fine fibers having an average size of less than 800 nanometers carried by the carrier fibers.

Other inventive aspects are directed toward methods. For example, a method of making a filter element may comprise electro-spinning fine fibers having an average size of less than 800 nanometer from a solution comprising a polymer and a solvent under the effect of a voltage differential; depositing the fine fibers on a substrate of carrier fibers, the carrier fibers having an average size of at least 3 micron; and winding the substrate of carrier fibers and the fine fibers into a depth media having a thickness of at least ½ centimeter. The method may alternatively employ smaller carrier fibers as discussed above with a 4:1 or higher size ratio between fine and carrier fibers.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 8A is a cross section in partially schematic form of the depth filter element made by the manufacturing system/process of FIG. 8;

FIG. 11 is a schematic illustration of a system for making a filter media according to an embodiment of the present invention;

FIGS. 23(A)-(H) are schematic illustrations of bi-component fibers of a substrate according to various embodiments of the present invention;

FIG. 24 is efficiency test results of a standard tubular depth filter test samples; and FIGS. 25-26 are efficiency test results of a tubular depth filter including fine fiber multilayer interleafs test samples.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

In the sections below, different embodiments of depth medias will be first described. Thereafter, fine fiber containing sheets that are useful in many of the embodiments will be described, with examples provided. Thereafter, some particular non-pleated tubular depth media examples will be discussed.

Non-Pleated Tubular Depth Filter

Figure 1:
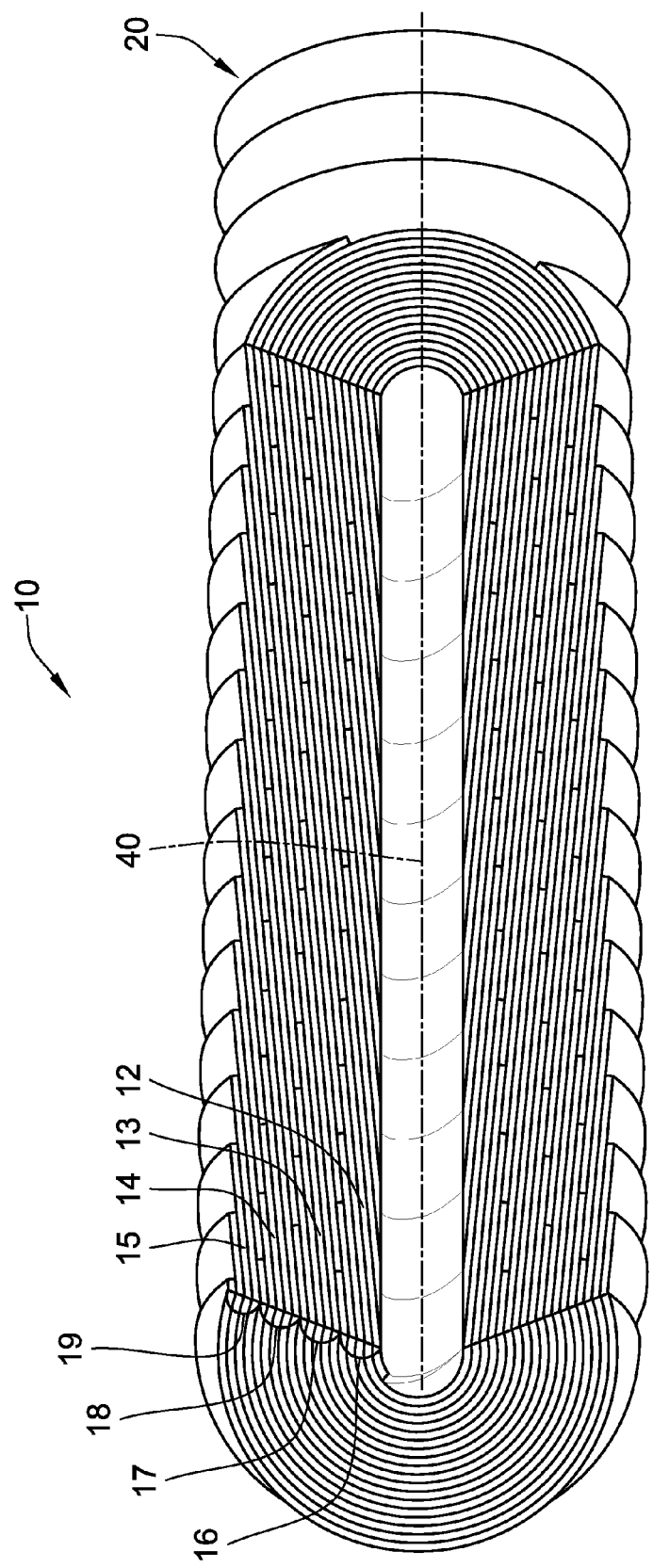
FIG. 1 is a perspective view in partial section of the preferred embodiment of the invention that illustrates a multi-overlapped filter element made in a four station wrapping machine using four rolls of selected nonwoven fabric, and in which at least one of the rolls employs a filter media having fine fibers.

Referring to FIG. 1 of the drawings, a multi-overlapped coreless filter element 10 is illustrated and constructed according to an embodiment of the invention. As will be described herein, the filter element 10 has integrated therein a combination of fibers including carrier fibers having an average size greater than about 3 micron; and on the other hand fine fibers having a size of less than about 800 nanometer (more preferably less than 500 nanometer, even more preferably less than 250 nanometer and most preferably less than 100 nanometer).

The filter element 10 includes a first multi-overlapped nonwoven fabric strip 12, a second multi-overlapped nonwoven fabric strip 13, a third multi-overlapped nonwoven fabric strip 14, and a fourth multi-overlapped nonwoven fabric strip 15. As used herein, a strip will sometimes be referred to as a sheet and vice versa. In this instance, a partial width strip is provided (partial width relative to the axial length of the filter element), so that each strip can be helically wound in this embodiment. Each fabric strip 12-15 is spirally or helically wound in overlapping layers to form overlapping bands 16, 17, 18, 19, respectively. Collectively, these bands form a non-pleated tubular ring 20 of a depth media having a total media thickness T of at least about ¼ centimeter.

The radially interior surface of the innermost band 16 forms the periphery of an axially extending annular space (that may be used to collect clean fluid and facilitate axial flow of cleaned fluid). This hollow interior space extends from one end of the filter element to the oppositely facing end of the filter element 10. In the drawings the thickness of the fabric (as well as fine fiber layers where illustrated) is exaggerated for purposes of demonstration. However, the tubular ring of depth media typically has at least ¼ cm in thickness (radial thickness) and more typically between ½ cm and 5 cm (more typically between 1 cm and 3 cm) of thickness as a consequence of the wraps. It can be seen that each strip 12-15 at least partially overlaps itself once to make the given band thick at a range of generally between 2-8 wraps thick for one of the given fabric strips. Additionally similar embodiments of the filter element 10 employ at least 1 fabric strip thick and more typically between 2-6 fabric strips. As such, filter elements can be made employing the helical wrapping technique of between 2 and 48 strips thick (most typically between 6 and 32 layers thick).

Figure 4:
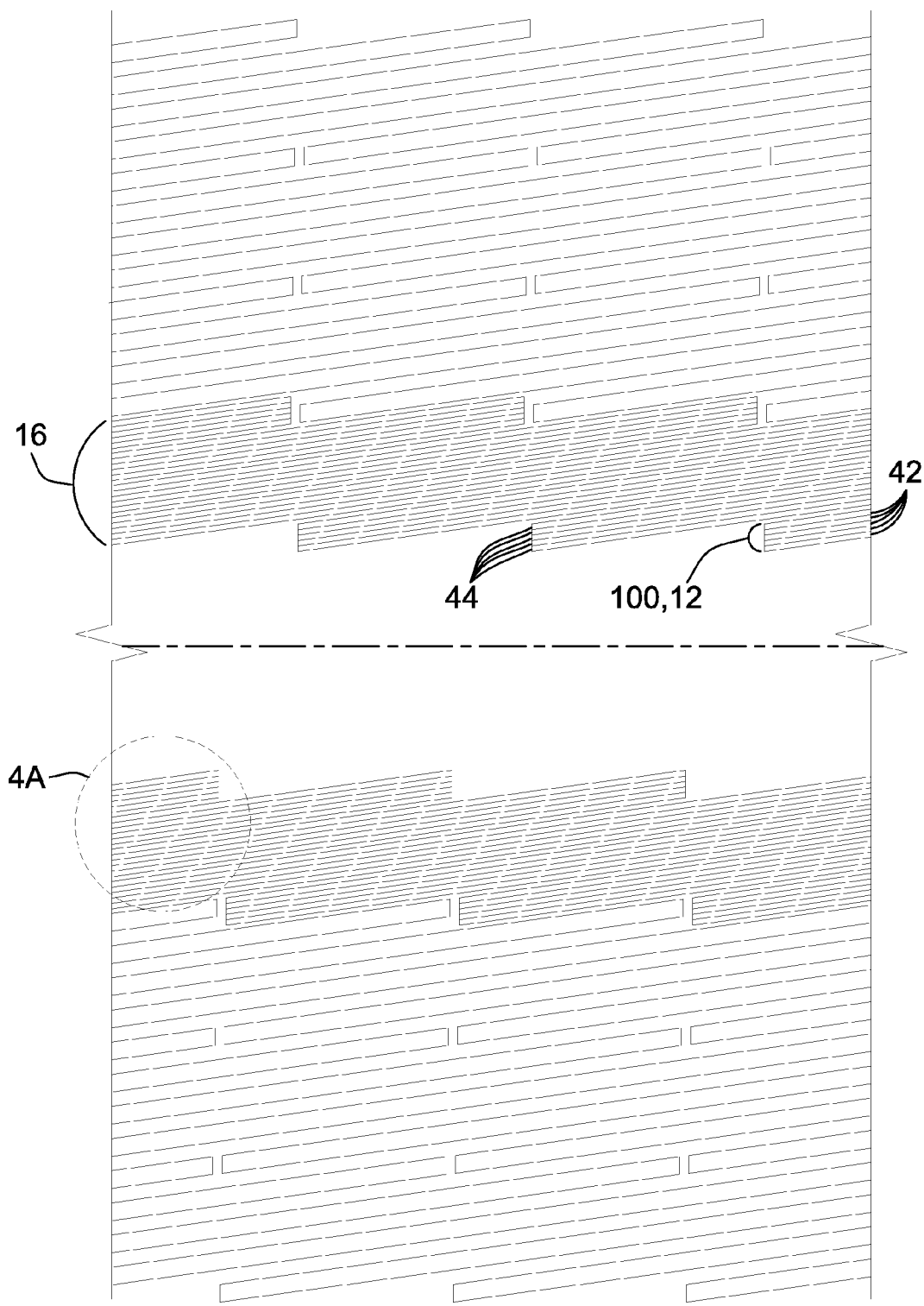
FIG. 4 is a partially schematic cross section of the multi-overlapped filter element schematically showing that the inner wrap employs a sheet having within the sheet multiple successive substrate and fine fiber layers.
Figure 4A:
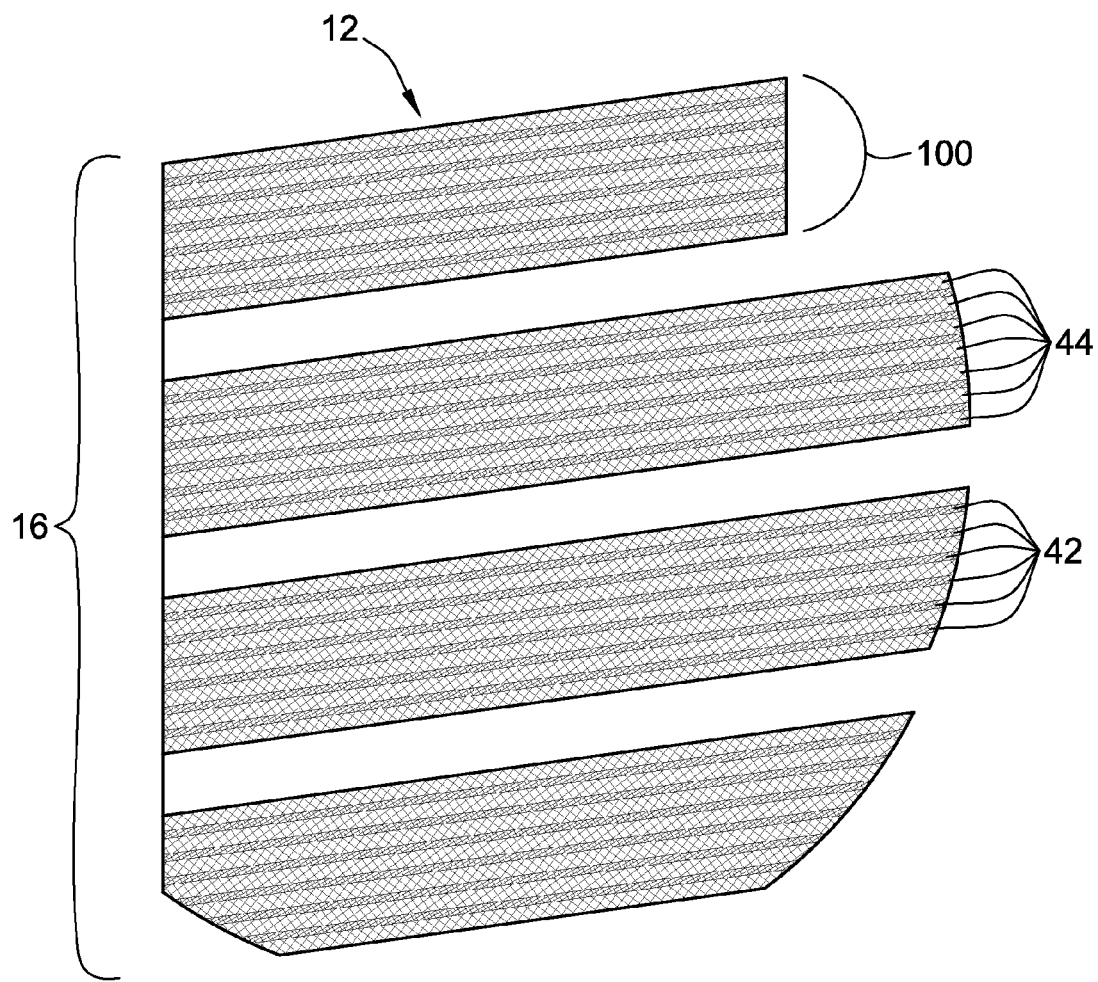
FIG. 4A is an enlarged view of a section of FIG. 4 taken about the dashed circle in FIG. 4 better illustrating the sheet having within the sheet multiple successive substrate and fine fiber layers, the relative thicknesses and arrangement being schematic only for purposes demonstration as opposed to being to scale and with the proximity of strips being exaggerated to show gaps between strips (even though in practice the adjacent strips and wraps touch each other)
Figure 9:
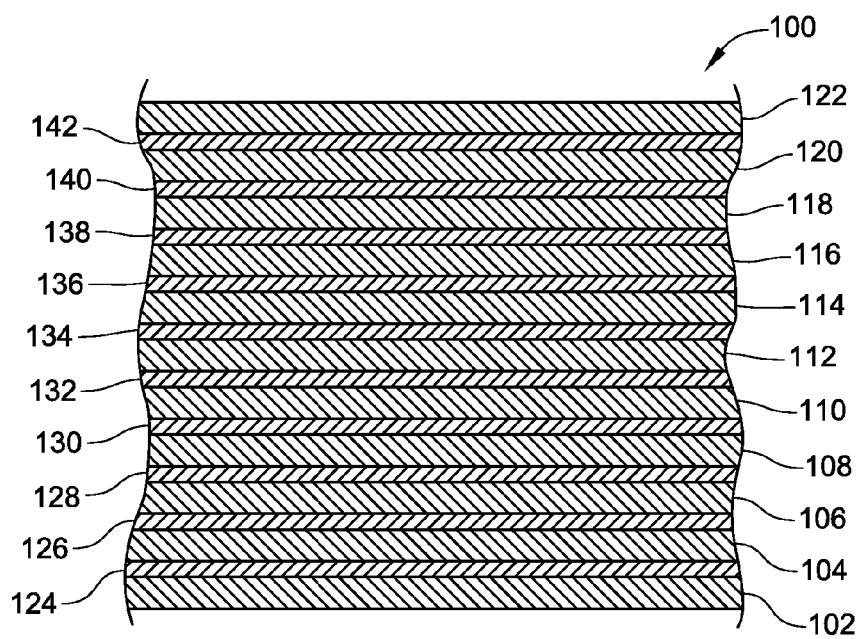
FIG. 9 is a schematic cross-sectional view (e.g. relative illustrated thickness not to scale) of a filter media including tightly compacted multiple scrim layers carrying fine fibers according to an embodiment of the present invention.

In this first embodiment of FIG. 1, and with additional reference to FIGS. 4, 4A and 9, a preformed multiple laminated layer filter media sheet 100 is selected and employed for use as the innermost fabric strip 13. In another embodiment, the multiple layer filter media sheet 100 is selected and employed for use as the second innermost fabric strip 14 as well as the innermost fabric strip 13. In contrast, the upstream fabric strips 15, 16 may employ no fine fibers but a more open structure to create a gradient media throughout the entire thickness T.

For example, the upstream non-woven fabric strips 15, 16 may be composed of selected polymeric fibers such as polyester and polypropylene which serve as both base fibers and binder fibers. Base fibers have higher melting points than binder fibers, which is also referred to herein as bi-component media or multi-component media. The role of base fibers is to produce small pore structures in the coreless filter element 11. The role of the binder fiber or binder material is to bond the base fibers into a rigid filter element that does not require a separate core. The binder fibers may consist of a pure fiber or of one having a lower melting point outer shell and a higher melting point inner core. If the binder fiber is of the pure type, then it will liquefy throughout in the presence of sufficient heat. If the binder fiber has an outer shell and an inner core, then it is subjected to temperatures that liquefy only the outer shell in the presence of heat, leaving the inner core to assist the base fiber in producing small pore structures. The role therefore of the binder fiber is to liquefy either in whole or in part in the presence of heat, the liquid fraction thereof to wick onto the base fibers to form a bond point between the base fibers, thereby bonding the base fibers together upon cooling. The binder material may be in a form other than fibrous.

While a gradient depth media is embodied in FIG. 1 with the multiple layer filter media sheet 100, it is envisioned that the multiple layer filter media sheet 100 may be employed at different locations upstream or downstream locations and may be selected for use for any one or more of the strips 12-15.

Figure 2:
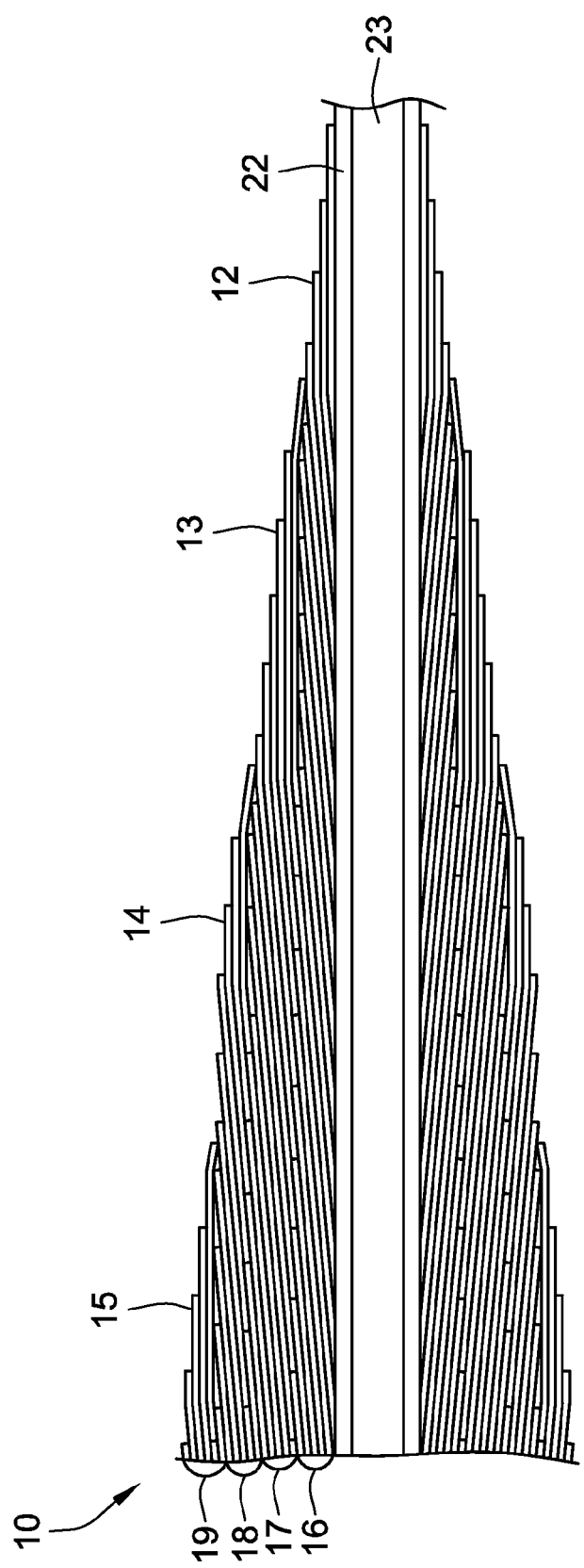
FIG. 2 is a cross-sectional view that illustrates the multi-overlapped coreless filter element of FIG. 1 being formed on a hollow mandrel.
Figure 3:
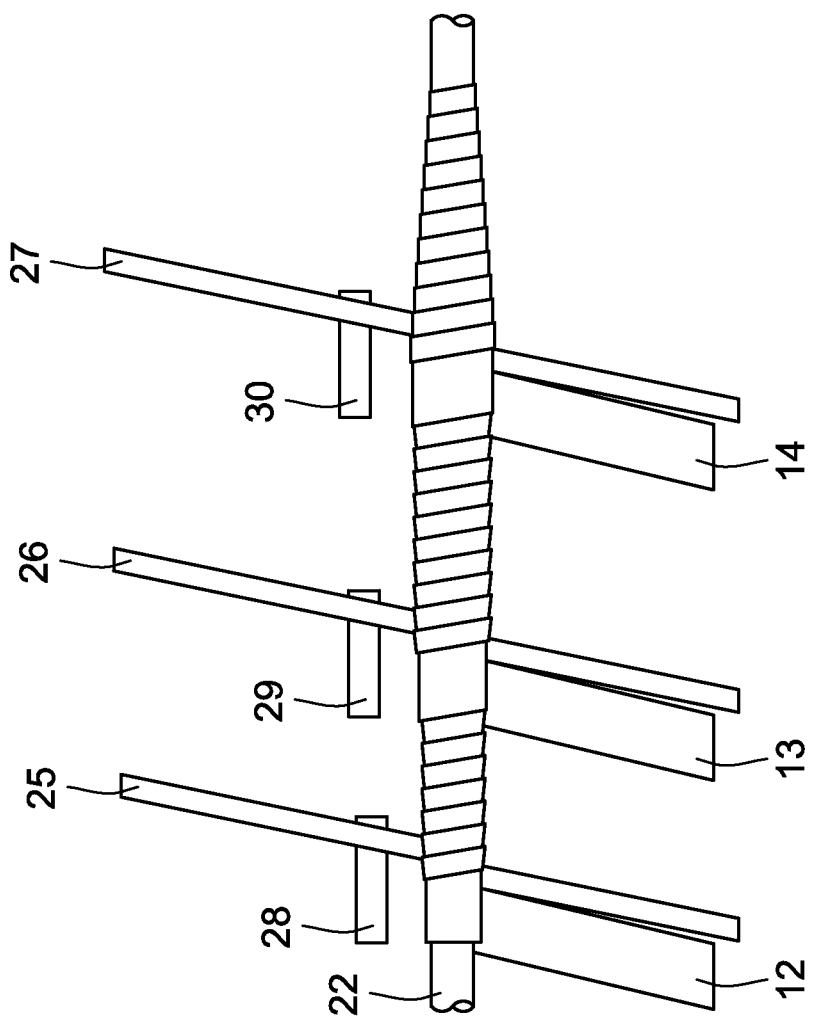
FIG. 3 is a schematic top view of three stations of the machine used to manufacture the filter element of FIG. 1.

An embodiment of a method and apparatus for making such a filter element 10 can be seen in reference to FIGS. 2-3 of the patent application and can be in accordance with the disclosures of U.S. Pat. No. 5,827,430 to Perry, Jr. et al.; and/or U.S. 2008/0128364 to Cloud et al, the entire disclosures of each of which are hereby incorporated by reference in their entireties. In FIG. 2 of the drawings, the numeral 22 designates a hollow cylindrical mandrel with an annular exterior surface and an annular interior surface, said annular interior surface forming the periphery of a cylindrical channel 23, through which flows a liquid or gas heat exchange medium (not shown). Band 16 of multi-overlapped nonwoven fabric strip 12, is shown overlapped by band 17 of multi-overlapped non-woven fabric strip 13, which in turn is overlapped by band 18 of multi-overlapped nonwoven fabric strip 14, which is then overlapped by band 19 of multi-overlapped nonwoven fabric strip 15.

As shown in FIG. 3 of the drawings, only three stages are shown of the multi-stage winding machine shown in greater detail in the aforementioned referenced patents. In FIG. 3, a first compression belt 25 is shown wrapping, in a multi-overlapped fashion, the first nonwoven fabric strip 12 about the hollow mandrel 22. A second compression belt 26 is shown wrapping, in a multi-overlapped fashion, the second nonwoven fabric strip 13 about multi-overlapped nonwoven fabric strip 12. A third compression belt 27 is shown wrapping, in a multi-overlapped fashion, the third nonwoven fabric strip 14 about multi-overlapped nonwoven fabric strip 13. A first heater array of preferably infrared heaters 28 is shown in a position to apply heat, simultaneously with the compression of compression belt 25, to multi-overlapped nonwoven fabric strip 12. A second heater array of infrared heaters 29 is shown in a position to apply heat, simultaneously with the compression of compression belt 26, to multi-overlapped nonwoven fabric strip 13. A third heater array of infrared heaters 30 is shown in a position to apply heat, simultaneously with the compression of compression belt 27, to multi-overlapped nonwoven fabric strip 14.

Figure 1A:
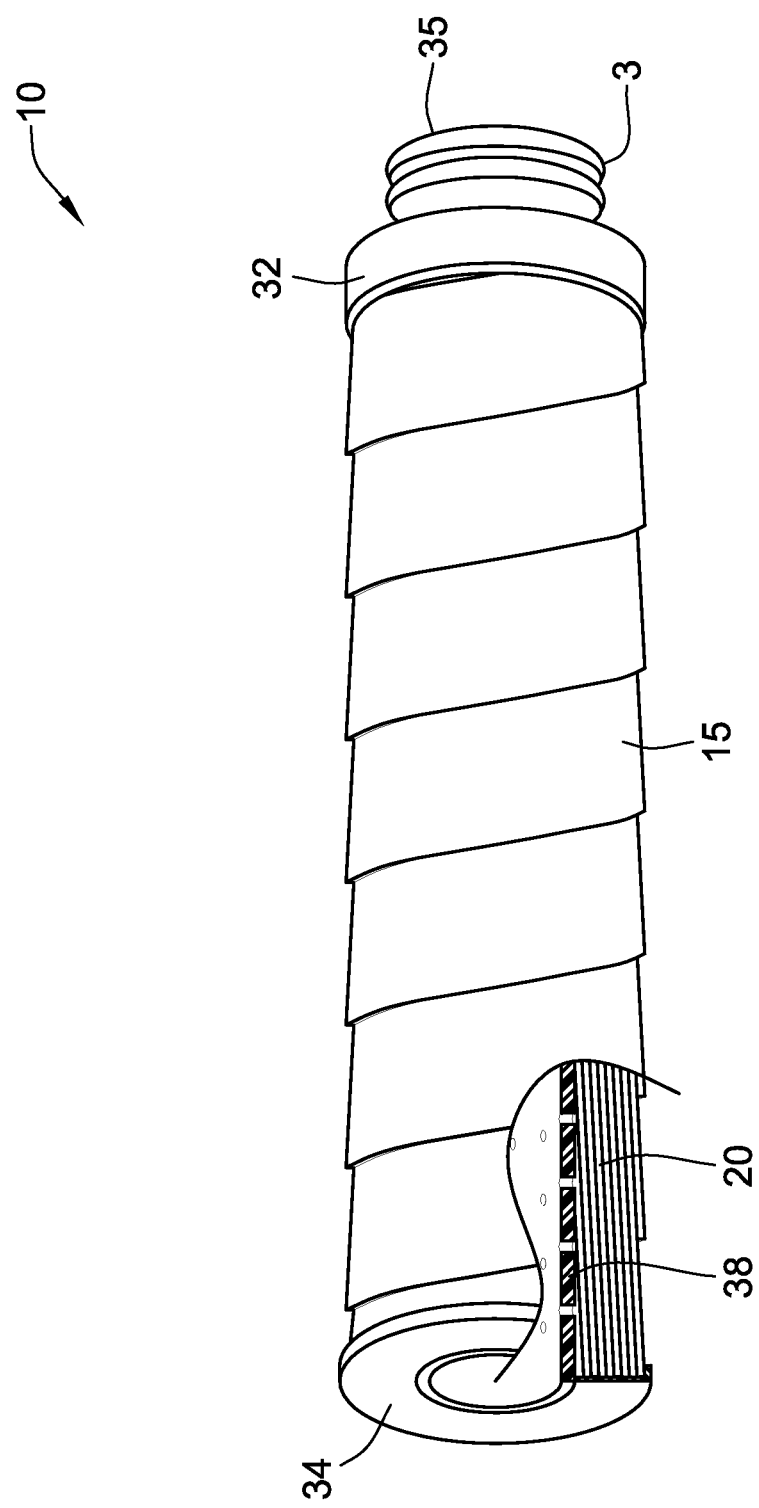
FIG. 1A is a perspective view of a filter element employing the filter media of FIG. 1 with an optional support core and end caps employed for a filtration application.

Once the filter element 10 is formed into a tubular ring of depth media 20, from there it may be cut into axial length segments and then configured with opposed open and closed end caps 32, 34 sealingly bonded to opposed ends of the tubular ring as shown in FIG. 1A. The open end cap 32 has an opening 35 to serve as an outlet port for cleaned fluid. One or more seals such as O-ring gaskets 36 may be disposed on the end cap 32 for sealing with a mounting head of a fluid system. Additionally, a perforated core 38 may be employed along the inside of the media.

Turning now to FIGS. 4 and 4A, it can be seen that the resulting arrangement of the helical wrap presents a unique structure and arrangement by virtue of the multiple layer lamination of the multi-layer filter sheet 100. While further details of such a sheet 100 will be discussed later on, it will be appreciated that multi-layer filter sheet 100 provides flow structure within the individual strip 12 that employs the filter sheet 100. In particularly, with the helical wrap arrangement, the strips are canted relative to the longitudinal axis 40 of the filter element 10. As a consequence, the individual fine fiber layers 42 (e.g. corresponding to 124, 126, 128, 130, 132, 134, 136, 138, 140, 142 in FIG. 9) are arranged at a canted alignment and non-parallel to the axis 40 such that fluid can flow through the sheet 12 along individual fine fiber layers. In particular, the more open and porous substrate 44 (e.g. corresponding to 102, 104, 106, 108, 110, 112, 114, 116, 118, 120 in FIG. 9) are also arranged at a canted alignment and non-parallel to the axis 40; and thereby may act as a drainage layer or fluid flow layer within the strip 12.

Accordingly, there may be canted microflow paths through the strip 12 through the more open and porous substrate layers 44. Particulates can be trapped during this process by the more efficient fine fiber layers 42. Additionally, between adjacent wraps of the strip 12, there may also be flow across and between the strips, which may be referred to as macroflow paths between strips, even though in practice adjacent wraps of a strip are in contact and touching. In addition to the potential for flow along canted microflow or macroflow paths, a significant amount of flow is also radially through the material of the strip itself passing through successive fine fiber and substrate layers 44, 42 wherein particulates can be trapped. However, it should be appreciated that should the fine fiber layer 42 clog with particulate there is an open canted flow path through the strip along the porous substrate layers 44. As a consequence and while many filters will tend to improve efficiency over time, it may be that the present arrangement may eventually decrease in efficiency over time as particulate loading causes more flow along the canted flow paths through the substrate layers 44 as opposed to radially through the media (and fine fiber layers 42).

Figure 5:
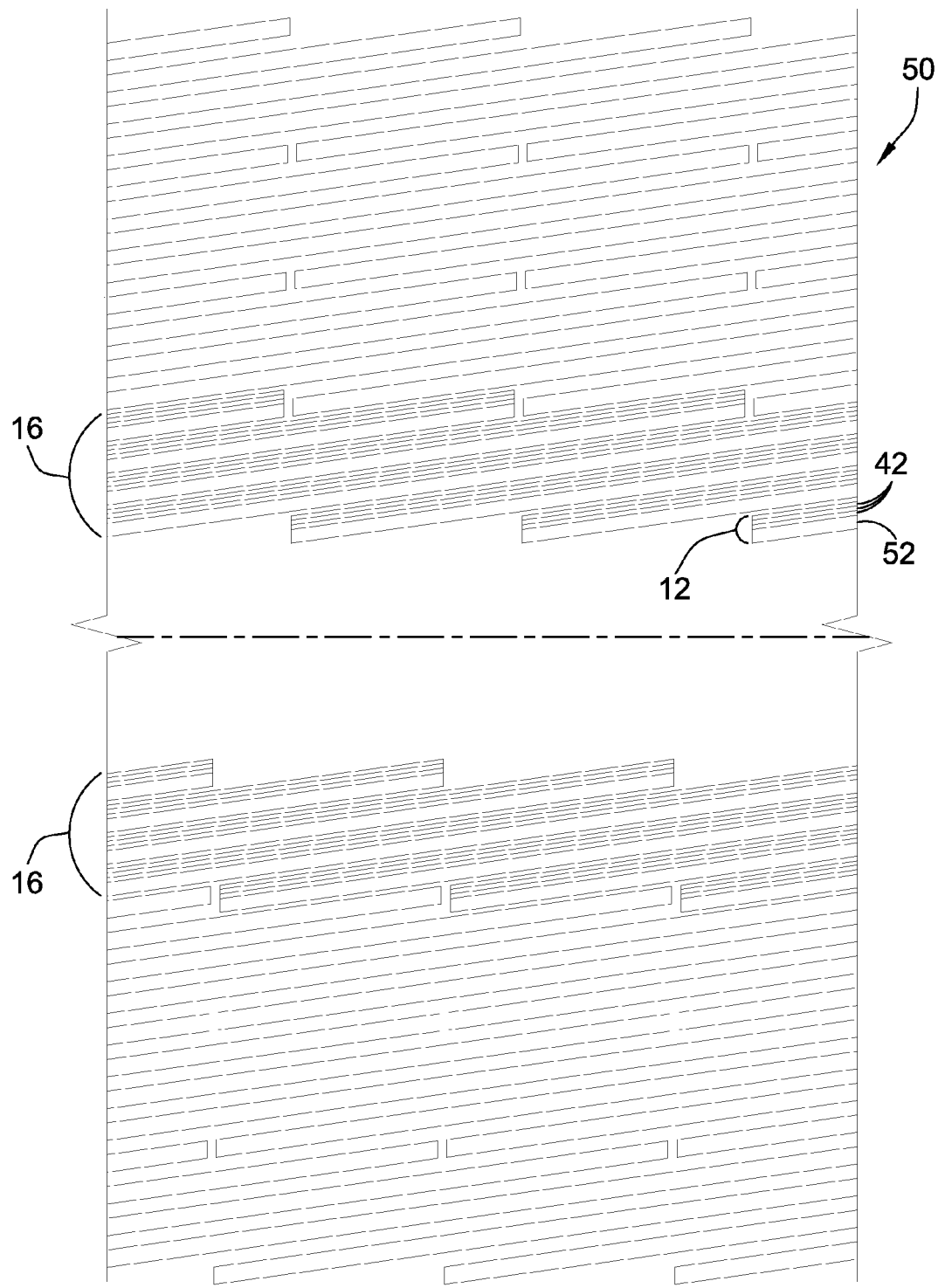
FIG. 5 illustrating an embodiment of a multi-overlapped filter element similar to FIG. 1 also not to scale, but additionally employing an interlayer along the innermost wrap.
Figure 6:
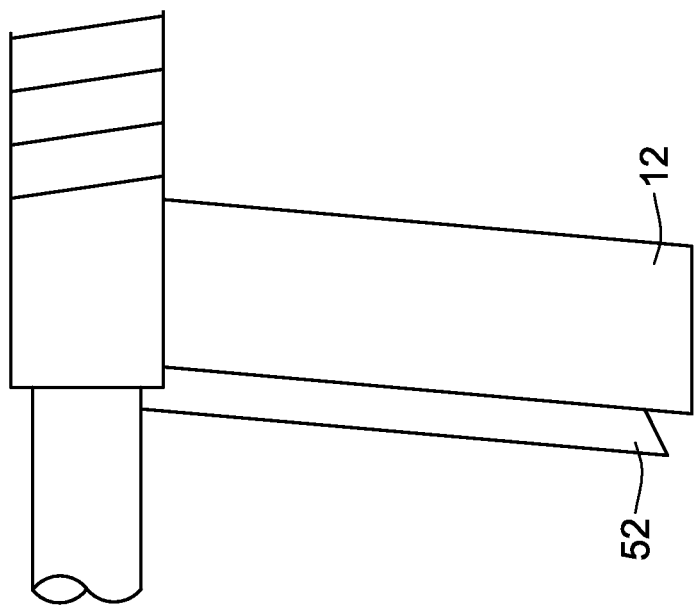
FIG. 6 is a schematic illustration showing how the interlay layers of FIG. 5 may be wrapped.

Turning now to FIG. 5-6, a filter element 50 yet another embodiment is schematically illustrated in cross section. The filter element 50 is a similarly helically wrapped filter element to the first embodiment and as such similar reference numbers are used, but additionally employs an interlay strip 52 that overlays the strip 12 employing the multi-layer filter sheet 100 (see FIG. 9) with fine fiber layers 42. The arrangement and variations of an interlay may also be in accordance with any of the examples of U.S. Patent Publication No. 2008/0128364 to Cloud et al., which has been previously incorporated by reference. While a single band in this embodiment is shown to have an interlay, multiple bands 16-19 (such as in first embodiment shown in FIG. 1) may employ an interlay. One or more of these bands may include at least one of the strips as having fine fibers (the interlay may also optionally include fine fibers).

In this embodiment, a lower efficiency interlay strip 52 is wrapped along with the strip 12 employing the multi-layer filter sheet 100. Typically in this arrangement, one of the strips will have a greater flow porosity and the other strip a greater efficiency and less porous structure resulting in greater flow horizontally/diagonally. As a consequence, more flow in this embodiment may be along the canted path through the interlay strip 52 as compared with the efficiency strip 12 employing the multi-layer filter sheet 100.

Figure 7:
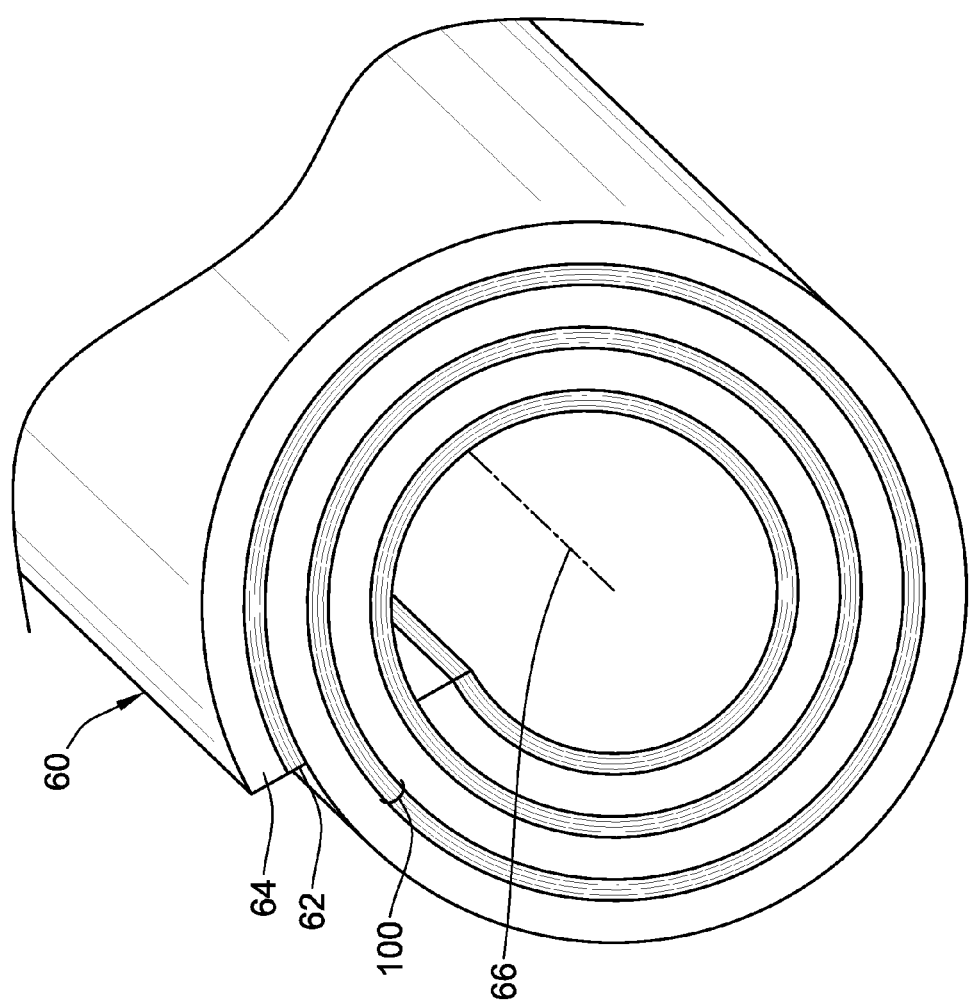
FIG. 7 is an alternative embodiment of a depth filter element employing fine fibers shown in perspective view and cross section employing a spiral (and non-helical) wrap with a filter media sheet a full length filter media sheet (same width as axial length of filter element)

Turning to FIG. 7, another embodiment of a filter element 60 is illustrated employing a spiral wrap employing at least one full length sheet that is spirally wrapped about the axis and in this embodiment two sheets 62, 64 (more sheets may also be co-wrapped). At least one of the sheets and in this case sheet 62 has fine fibers integrated therein (e.g. sheet 62 may be formed from sheet 100 of FIG. 9). Also illustrated, is that the other sheet 64 may not have any fine fibers, but may serve as a spacer layer. Each of the sheets extends parallel to the filter axis 66, unlike the previous embodiments. Generally in this embodiment, fluid may be able to flow along a spiral path, but more typically (especially if many wraps are employed) fluid is forced to travel radially inward through the filter medias of the strips 62, 64. In either event, this forms a depth media as multiple layers are employed. Further, a lower efficiency strip may have more wraps and be longer such as to continue to spirally wrap around the element even after the higher efficiency sheet 62 terminates.

Figure 8:
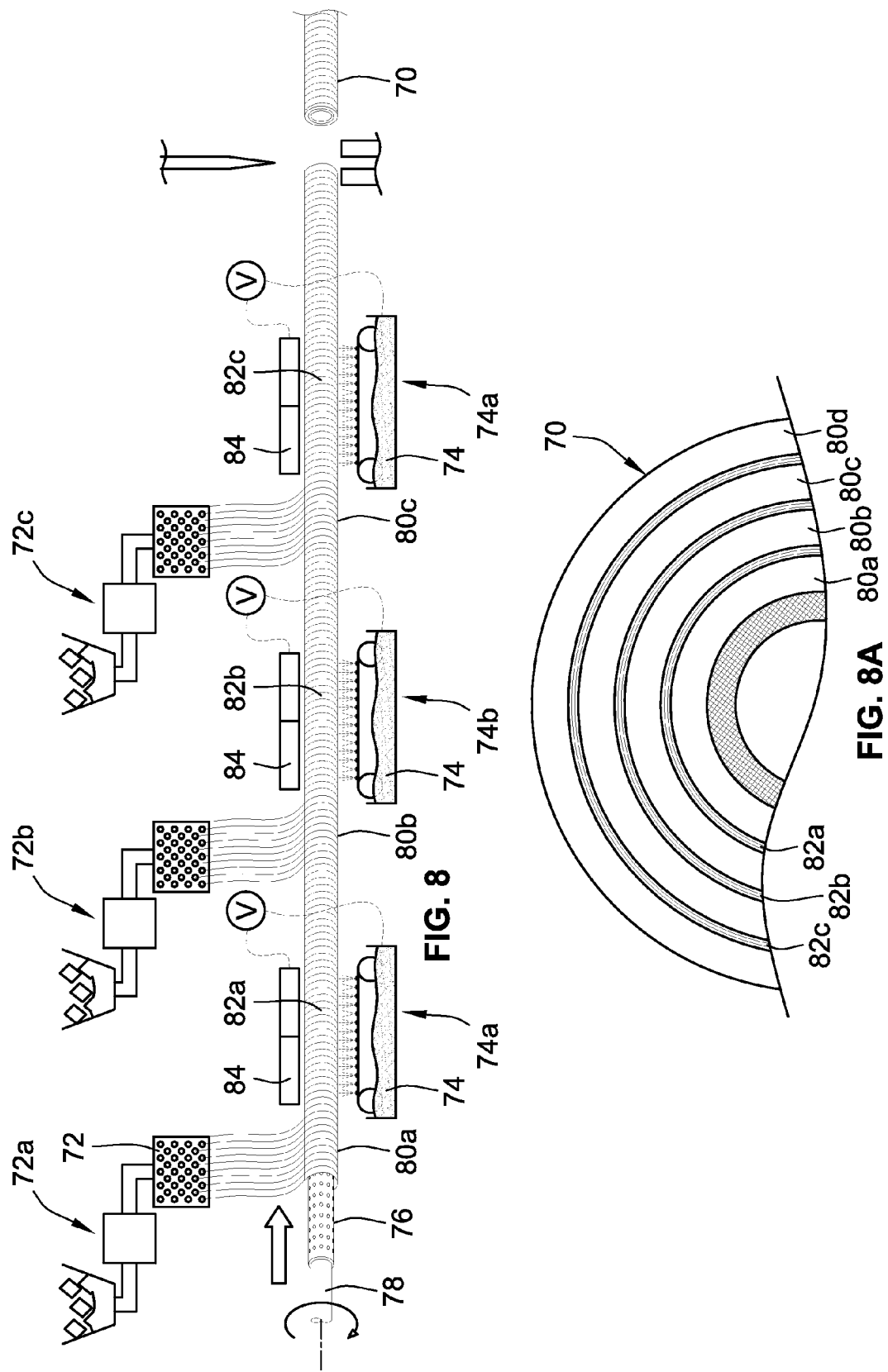
FIG. 8 is yet a further alternative embodiment of a manufacturing system/process shown in schematic form for forming a depth filter element employing fine fibers.

Turning to FIGS. 8-8A, yet another embodiment is schematically illustrated showing the creation of a depth media element 70 employing fine fibers. In this embodiment, multiple stations of melt blown heads 72 and electrospinning modules are arranged. The melt blown heads 72 pump melted polymer through a die having orifices and are blown at a given speed and distance to create fibers having a selected diameter. Melt blown heads often will produce fibers of greater than 1 micron, but may also create fine fibers under 1 micron and down to about 600-700 nanometer if subject to electrical fields. As such, fine fibers as well as coarse may be created by melt blowing, which may be used in any of the embodiments herein. Typically, fine fibers in an embodiment are characterized as being at least 4 times as small as the melt blown fibers. Each of the melt blow and electrospinning module stations 72a-c and 74A-c may produce different sizes of fibers as may be desired. For purposes of differentiation, melt blown fibers and electrospun fibers are thus meant to be more specific terms than fine fibers, which is intended to be generic.

In this embodiment a perforated core 76 is moved along a shaft 78 rotationally and axially to deposit layers of melt blown fibers 80a-c and electro-spun fibers 82a-c on the core 76. To facilitate an electrical voltage potential, electrostatic pinning bars 84 are employed to maintain a charge and differential. Electrospinning equipment such the endless chains as disclosed U.S. Provisional Application No. 60/989,218 entitled "Filtration Medias, Fine Fibers Under 100 Nanometers, and Methods" may be employed but with the endless strand extending under and parallel to the support shaft 78 for the process. From this process, a filter element is created having successive layers of melt blown fibers 80a-80c and electrospun fibers 82a-82c as illustrated in FIG. 8A.

Multilayer Composite Filter Media

Figure 10:
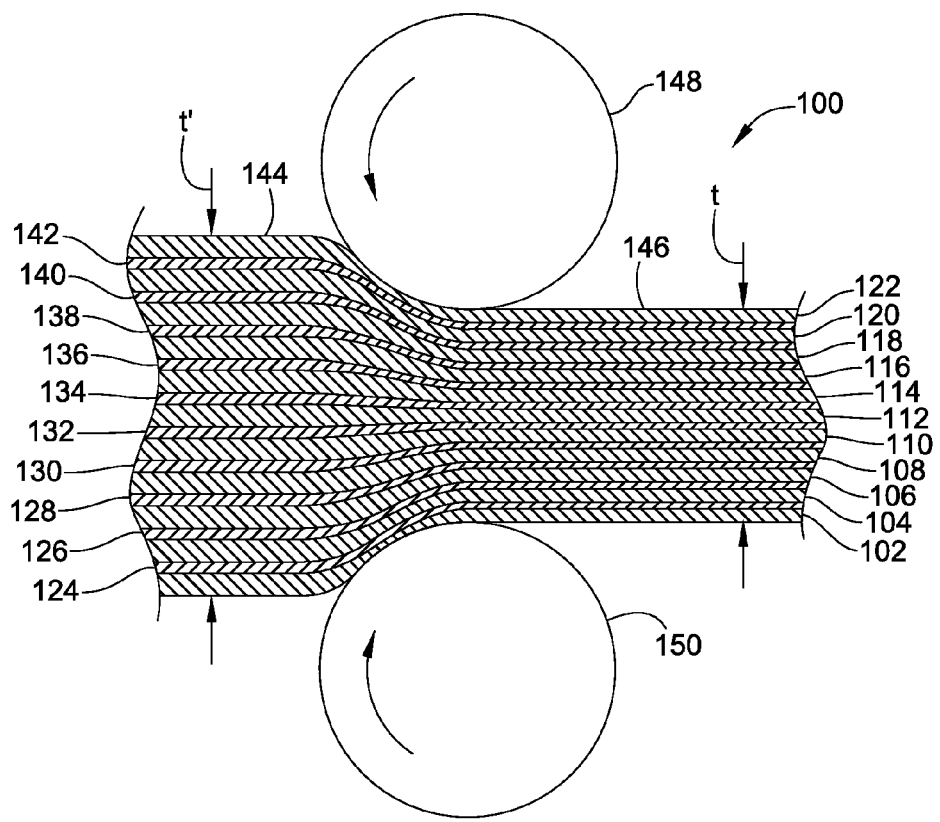
FIG. 10 is a schematic cross-sectional view of the filter media of FIG. 9 in a pre-compressed state being compressed to a compressed state by a set of rollers.
Figure 12A:
FIG. 12(A) is a Scanning Electron Microscopic image showing bi-component fibers and the fine fibers of a composite media produced using the system of FIG. 11 taken at a magnification level ×300.
Figure 12B:
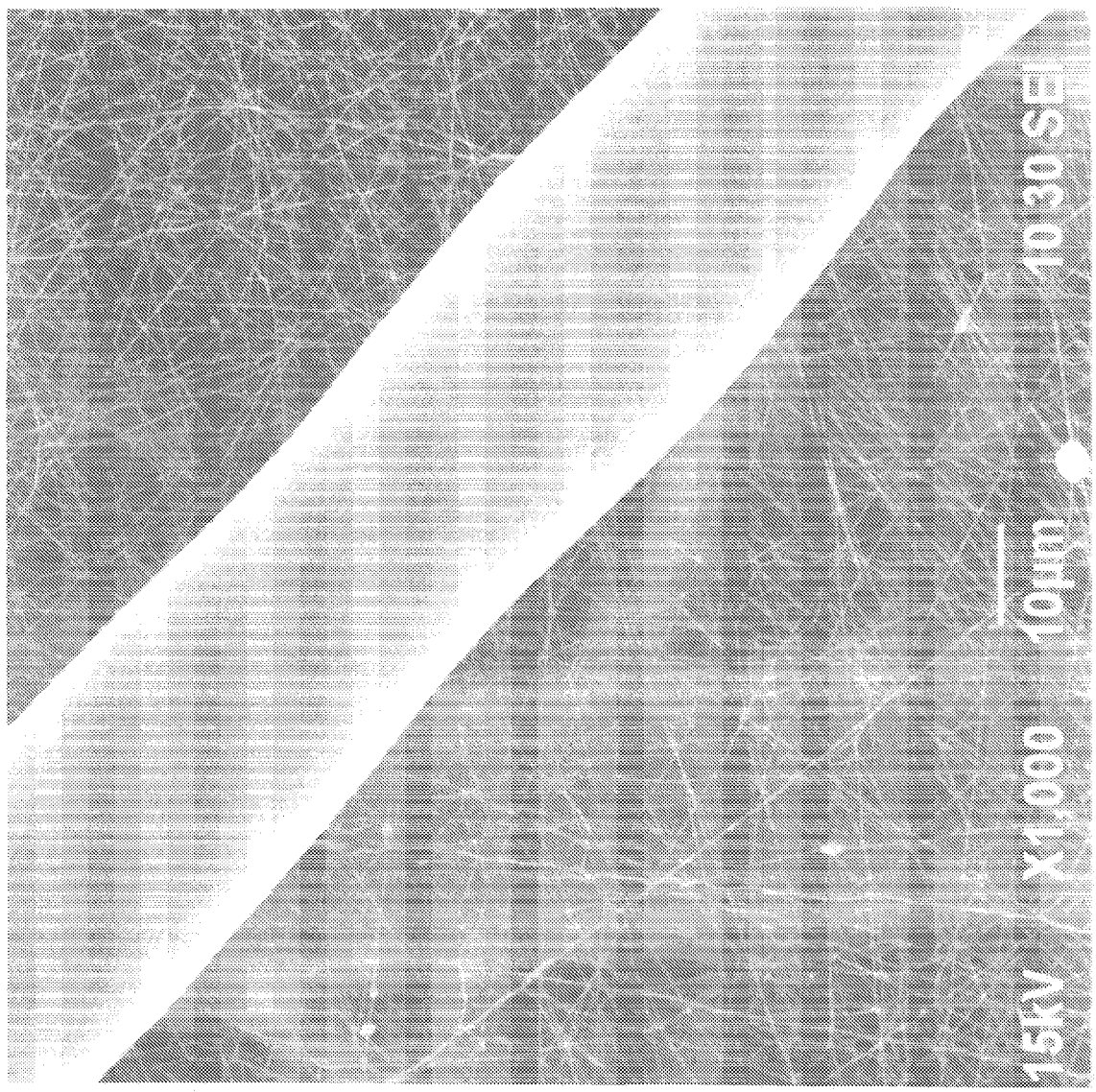
FIG. 12(B) is a Scanning Electron Microscopic image showing bi-component fibers and the fine fibers of a composite media produced using the system of FIG. 11 taken at a magnification level ×1,000.
Figure 12C:
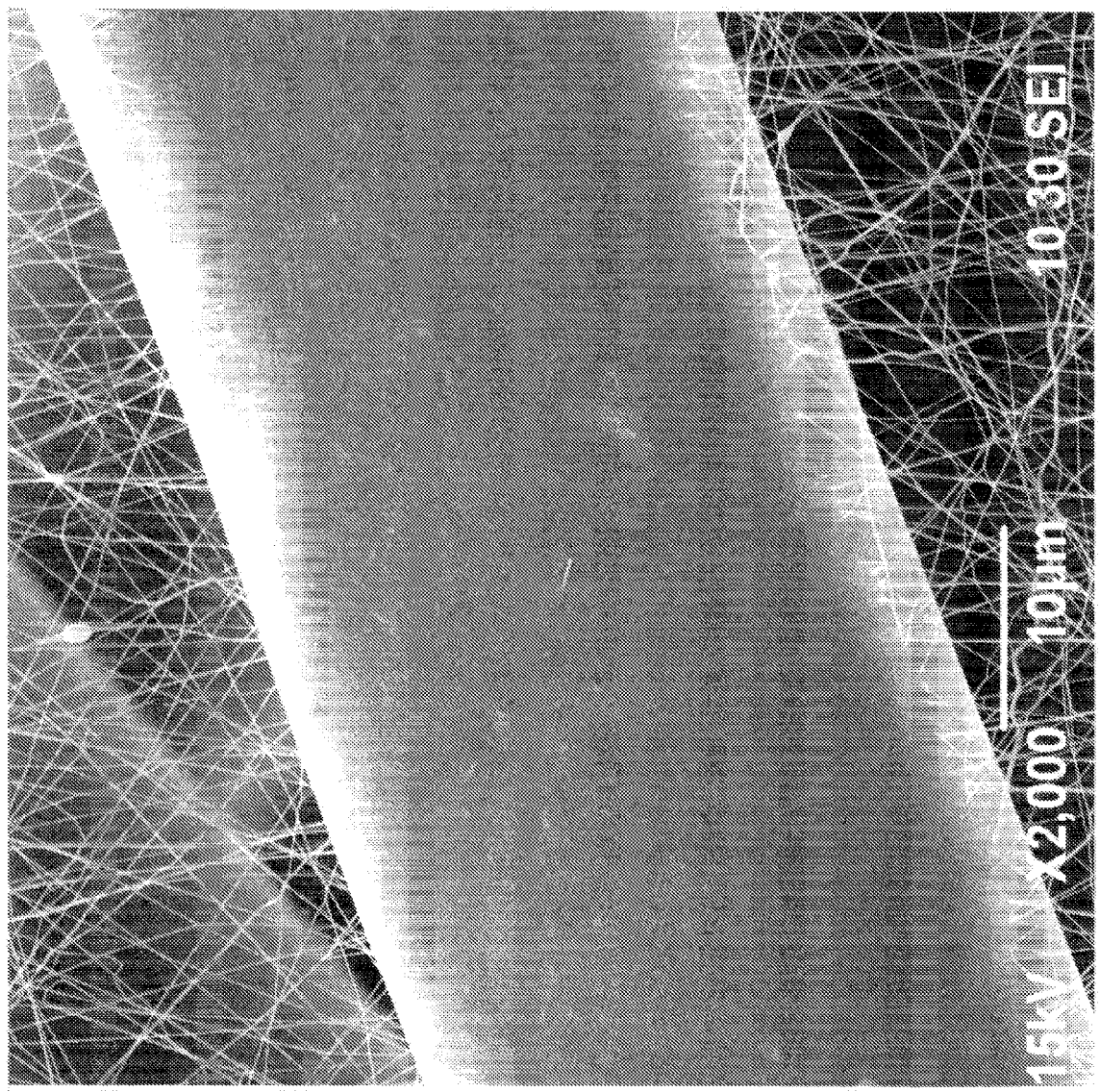
FIG. 12(C) is a Scanning Electron Microscopic image showing bonding between bi-component fibers and the fine fibers of a composite media produced using the system of FIG. 11 taken at a magnification level ×2,000.
Figure 12D:
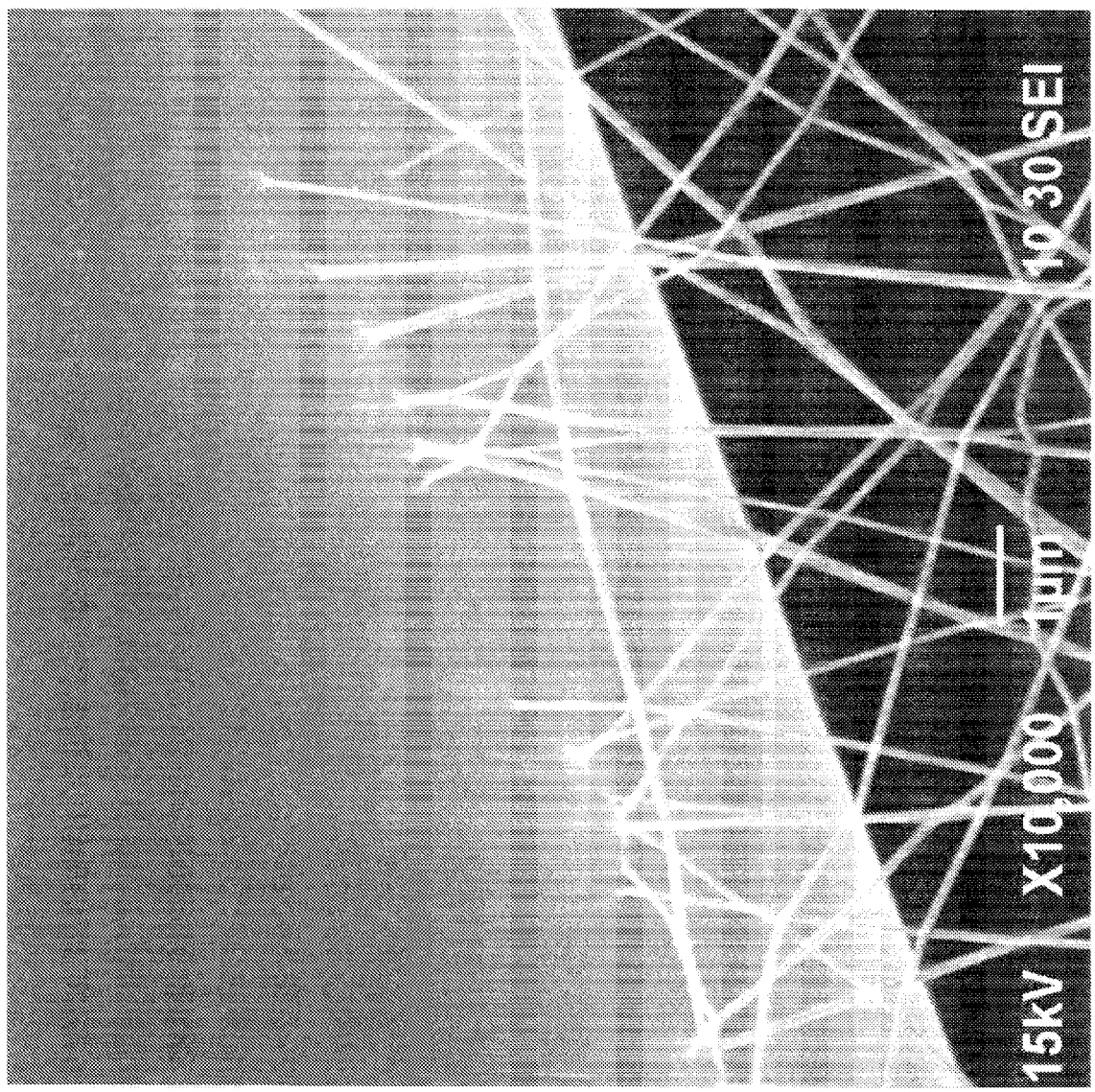
FIG. 12(D) is a Scanning Electron Microscopic image showing bonding between bi-component fibers and the fine fibers of a composite media produced using the system of FIG. 11 at a magnification level ×10,000.

Turning now to FIGS. 9-10, the multilayer filter sheet 100 employing multiple layers of fine fibers as used in many of the previous embodiments is illustrated along with alternative ways to make such a multi-layer sheet. It should be appreciated, that embodiments that use strips of the sheet 100 may have fewer (or more) layers of fine fibers deposited thereon. In some embodiments some strips (such as for FIG. 1), may have a single layer of fine fiber, while in others and more preferably, multiple fine fiber layers are deposited and contained within a strip. In either case, it may be referred to as a "composite media". In some embodiments, a plurality of scrim layers and a plurality of fine fiber layers of fine fibers are laminated together a single filter media sheet, with selected fine fiber layers being spaced apart and separated within the first filter media sheet by the scrim. Preferably in wrapping situations, the fine fibers will be protected and sandwiched between a layers of substrate of carrier fibers.

Prior to turning to the details of the multilayer filter media 100, some lexicography will be developed to assist in understanding the present invention. As used herein, the term "substrate" is meant to be broad in nature and meant to include any structure upon which fine fibers are carried or deposited. "Substrate" may include conventional formed filter medias such as scrims and the like that may be unwound from media rolls. Such filter medias have a fiber entanglement that typically bonded or secured together mechanically, chemically, adhesively and/or otherwise and thereby have strength such that they cannot be easily torn manually (e.g. a 1 square foot sheet typically holds up to application of tension of 5 lbs force) and have filtrations properties. "Substrate" may also include looser fiber entanglements that may not be bonded together or secured together (e.g. a 1 square foot sheet may fall apart upon application of tension of 5 lbs force). A "scrim" used as herein refers to woven or non-woven fiber entanglement, wherein the fibers are bonded and compressed into a planar formed media.

There are a few ways that nanofiber coverage can be characterized. A first way to characterize nanofiber coverage is basis weight. However, basis weight is dependent in part upon the specific gravity of the material of the nanofiber, as well as the selected size (e.g. also interchangeably referred to as fiber diameter and/or thickness) of the nanofiber. Another useful measure for characterizing nanofiber coverage is calculated lineal distance of nanofiber coverage that can be expressed in terms of kilometer per square meter (km/m2), which is useful as this measure of coverage eliminate variability due to diameter of the fine fiber and variability due to specific gravity differences among different materials that may be employed.

In many exemplary embodiments discussed herein, fine fibers having an average fiber diameter of 0.08 micron (80 nanometer) were employed. However, it will be appreciated that a double sized fiber (e.g. a 160 nanometer sized fine fiber) based on a simple area calculation ($\Pi*R2$) will have 4 times the weight; and a quadruple sized fiber will thus have 16 times the weight. An overapplication of fine fibers can lead to a plastic film that is not very pervious or porous, thus not suitable for a filter media. Using smaller fine fibers is desirable as a higher linear coverage level can be obtained. Considering that larger diameters of fine fibers will have a tendency to occupy greater void space, generally or as a rule of thumb, it is desirable that the application rate of fine fibers on a kilometer basis be lower as the fine fiber diameter increases. However, coverage on a basis weight may nevertheless increase as fine fiber diameter increases, due to the quadrupling of mass for doubling of diameter. As a rule of thumb, basis weight may increase 2-2.5 times for a doubling in fiber diameter (about 4-6 times for a quadrupling of fiber diameter); and for purposes of ease a doubling will be employed. Thus, if a 0.15 g/m$^2$ is employed for an 80 nm average diameter, then for a 160 nm fiber, a coverage of 0.30 g/m$^2$ would be used, and a 320 nm fiber, a coverage of 0.6 g/m$^2$. Embodiments herein are useable for a range of fine fibers less than 1 micron, typically less than 500 nm, and more preferably smaller fibers under 150 nm. However, coverage adjustments can be made according to principles above to embodiments herein.

Herein, the terms "first", "second" or third" in reference to a filter media composite or layers is not meant to refer to a specific location. "First layer" is not intended to mean the very first layer, nor meant to be indicative of upstream or downstream location relative to another layer ("upstream" or "downstream") can be used for that purpose. Instead, such terms as "first" and "second" are used for antecedent basis purposes.

FIG. 9 is a schematic cross-sectional view of a filter media 100 according to an embodiment of the present invention. It is schematic in the sense that in reality the fine fiber layer has virtually no thickness, but for illustration and understanding, thickness is illustrated in FIG. 9 and other schematic illustrations. In preferred embodiments, the filter media 100 includes at least two different fibers, for example, electrospun nanofibers and a substrate of coarser fibers carrying the nanofibers. As such, the filter media 100 is also referred to as a composite filter media, a composite media, or other like terms in this application. Although, the filter media 100 is particularly well suited for liquid particulate filtration applications with examples/embodiments having a significant particulate filtration impact now to liquid applications, the filter media 100 may be used in other fluid filtration applications.

In the embodiment shown in FIG. 9, the filter media 100 comprises 10 layers of substrate 102, 104, 106, 108, 110, 112, 114, 116, 118, 120, each of which carrying fine fibers 124, 126, 128, 130, 132, 134, 136, 138, 140, 142, and a media 122 on top of the fine fibers 142. The substrate, 102, 104, 106, 108, 110, 112, 114, 116, 118, 120 and the media 122 are formed of fibers having an average fiber diameter typically larger than that of the fine fibers. The substrate layers 102, 104, 106, 108, 110, 112, 114, 116, 118, 120, the fine fibers 124, 126, 128, 130, 132, 134, 136, 138, 140, 142, and the media 122 are laminated and tightly compressed together to increase fiber surface area per volume. Although this embodiment is shown with the media layer 122, this media layer is optional, and thus, the filter media 100 according to other embodiments may not include this media layer 122.

The filter media of FIG. 9 may be formed using the process shown in FIG. 10. FIG. 10 illustrates the filter media 100 in a pre-compressed state 144 and a compressed state 146. As shown, the filter media 100 in the pre-compressed state 144 has an initial thickness t' (also referred herein as an original thickness.) The filter media 100 in the pre-compressed state 144 is compressed into the compressed state 146 using a set of rollers 148, 150, wherein the initial thickness t' is reduced to a final thickness t.

In some embodiments, the filter media 100 in the pre-compressed state 144 is heated before compressing. In certain preferred embodiments, fibers of the substrate relax and reorient to increase an average distance between the fibers during heating (such as a scrim that has been at least partially compressed during the scrim production process.)

As such, the substrate layers expand and loft, wherein the thickness of each of the substrate layer increases. Further, as the fibers proximate the surface of the substrate relax and reorient, the fine fibers which are carried by these fibers move and reorient with the fibers. Thus, fine fibers are extended, pushed and pulled with the larger fibers. It is believed this may created a 3-dimensional matrix for fine fibers as opposed to being merely flat or planar (such 3-dimensional matrix of fine fibers can still be considered to be and may be referred herein as a "layer" even if integrated into surface of substrate.)

In such embodiments, the initial thickness t' of the pre-compressed state 144 can increase by at least 1.5 times, 2 times, 3 times or even more via heating. In such embodiments, the final thickness t of the filter media 100 after subsequent compression of the lofted filter media 100 can be either less than, or equal to, or greater than the initial thickness t', depending on the amount of expansion during heating and the amount of reduction during compression. In other embodiments, the filter media 100 in the pre-compressed state 144 can be heated and compressed simultaneously via a set of heated calendering rollers. In such embodiments, there may not be any expansion or a very slight increase in the initial thickness t' prior to the thickness reduction to the final thickness t. In yet different embodiments, the compressed filter media 100 having the final thickness t can be heated post compression, wherein the thickness t may be increased. In some embodiments, the filter media 100 can be heated more than once. For example, the filter media 100 can be compressed by a set of rollers arranged in an oven, such that the filter media 100 is heated immediately before being compressed, while being compressed, and immediately after being compressed. In any event, it has been realized that processing of the media after deposition of the fine fibers to rearrange fine fibers into more of a 3-dimensional matrix is advantageous. Expansion and/or compression are examples of such processing. Such processing can afford a greater porosity and may be used for better flow and/or to facilitate heavier coverage of fine fiber deposition.

In one embodiment, the final thickness t can be between about 50% and 300% of the initial thickness t', preferably between about 70% and 200% of the initial thickness t', and more preferably between 80% and 150% of the initial thickness t'. As the filter media 100 in the pre-compressed state 144 is pressed down to the final compressed state 144, the fine fibers 124, 126, 128, 130, 132, 134, 136, 138, 140, 142 become more integrated with the coarse fibers of the adjacent substrate layers 102, 104, 106, 108, 110, 112, 114, 116, 118, 120 and form 3 dimensional fine fiber matrix within the filter media 100. Although, the filter media 100 in this embodiment includes 10 layers of substrate carrying fine fibers, other embodiments can include more or less substrate layers carrying fine fibers. For example, a filter media can include a single substrate layer carrying a sufficiently heavy coverage of fine fibers (e.g. at least about 0.3 g/m².)

The substrate layers 102, 104, 106, 108, 110, 112, 114, 116, 118, 120 can be formed of any suitable porous material. Each of the substrate layer can be formed of a same type of porous material or different types of porous material. In one embodiment, each layer of the substrate 102, 104, 106, 108, 110, 112, 114, 116, 118, 120 comprises a formed filter media. The formed filter media comprises fibers that are bonded together. For example, the fibers of the formed filter media may be bonded together by solvent bonding, thermal bonding, and/or pressure bonding. The formed filter media can carry fine fibers and provide a structural support. The formed filter media is also referred to as a substrate filter media, a filter media substrate, a substrate, a filter media, or other like terms in the present application.

Alternatively, the substrate may comprise one or more webs of fibers which are loosely tangled together in a highly fluffed thick state and may not be bonded together as in the case of a formed filter media. Thus, the web of coarse fibers can easily be pulled apart with very little manual effort and has little structural integrity such that it is not considered a formed filter media in the conventional sense. The fibers of the web of fibers typically have a larger average fiber diameter than an average fiber diameter of the fine fibers. As such, the web of fibers is also referred to as a web of coarse fibers or other like terms in this application. A composite filter media including fine fibers integrated with such web of coarse fibers is described in Integrated Nanofiber Filter Media, US Patent Application Publication No. 2009/0266759, which is assigned to the assignee of the present application, the entire disclosures of which are incorporated herein by reference thereto.

Preferably, the substrate is formed of a multi-component filter media. As used herein, the term "multi-component filter media", "multi-component media", "multi-component fiber media" and other similar terms can be used interchangeably to refer to filter medias including at least two different materials. For example, a multi-component filter media can comprise fibers formed of a first material and fibers formed of a second material, wherein the first material and the second material are different materials. Alternatively, a multi-component filter media can be formed of fibers including at least two different materials, such as fibers including a core formed of the first material and a sheath formed of the second material, as described in detail below. A multi-component filter media including two different materials is refer to herein as "bi-component filter media", "bi-component media", and like terms.

In one preferred embodiment, each of the substrate layers 102, 104, 106, 108, 110, 112, 114, 116, 118, 120 comprises a scrim formed of bi-component fibers including two different materials having different melting points. A composite filter media comprising fine fibers and a substrate formed of such multi-component fibers are described in Multi-Component Filter Media with Nanofiber Attachment, PCT Patent Application No. PCT/US09/50392, which is assigned to the assignee of the present application, the entire disclosure of which are incorporated herein by reference thereto.

In this embodiment, one component of the bi-component fibers of the scrim has a lower melting point than the other component. The low melt component can be any suitable polymer such as polypropylene, polyethylene, or polyester. The other component may be a polymer having a higher melting point than the low melt component, or other suitable fiber materials such as glass and/or cellulose. The bi-component fibers are bonded together and/or compressed together to form a scrim or a substrate filter media having a certain thickness.

Figure 23A:
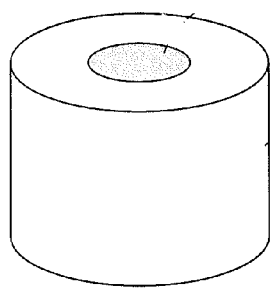
Figure 23B:
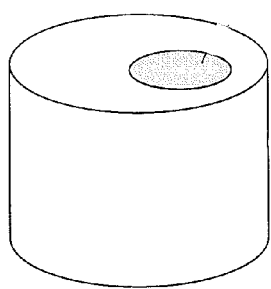
Figure 23C:
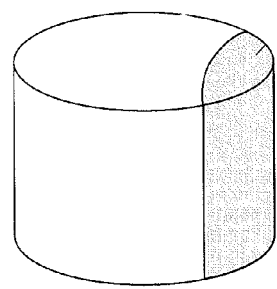
Figure 23D:
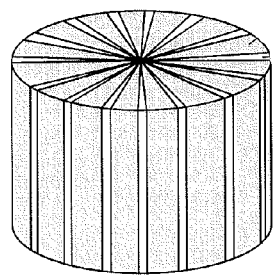
Figure 23E:
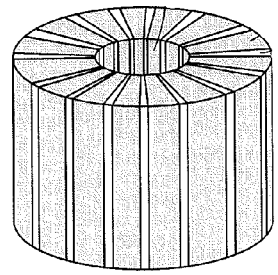
Figure 23F:
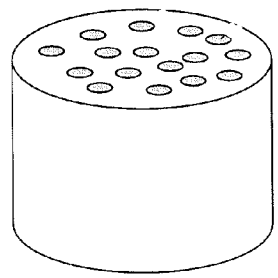

The bi-component fibers of the scrim used as the substrate 102, 104, 106, 108, 110, 112, 114, 116, 118, 120 can include a high melt polymer component and a low melt polymer component. For example the bi-component may comprise a high-melt polyester and a low-melt polyester, in which one has a higher melting temperature than the other. FIGS. 23(A)-(H) schematically illustrate bi-component fibers according to various embodiments. For example, FIG. 23(A) shows a concentric sheath/core type bi-component, wherein a core is formed of a high melt polymeric component and a sheath is formed of a low melt polymeric component.

The high melt polymer component is formed of a polymer having a higher melting temperature than the low melt polymer component. Suitable high melt polymers include, but are not limited to, polyester and polyamide. Suitable low melt polymers include polypropylene, polyethylene, co-polyester, or any other suitable polymers having a lower melting temperature than the selected high melt polymer. For example, bi-component fibers may be formed of a polyester core and a polypropylene sheath. In this embodiment, the bi-component fibers are formed of two different types of polyesters, one having a higher melting point than the other.

Now referring back to FIG. 9, the fibers of the substrates are formed to have a larger average fiber diameter than that of the fine fibers. In one embodiment, the fibers of the substrates have an average fiber diameter that is at least 4 times as that of the fine fibers. In another embodiment, the fibers of the substrates can have an average fiber diameter of greater than about 0.6 micron, preferably greater than about 3 micron, and more preferably, greater than 5 micron. In one embodiment, an average diameter of the bi-component fibers of the substrate are between about 1 micron and about 40 micron, and more typically between about 10-40 microns.

The coarse fibers are compressed and/or heated, for example via a set of calendering rollers and/or an oven, to form the substrate 102, 104, 106, 108, 110, 112, 114, 116, 118, 120, wherein any of the substrate layers has a thickness between about 0.05 and 1.0 mm, preferably between about 0.1 and 0.5 mm. Such substrate can provide a structural support necessary for the fine fibers. Bi-component scrims of various thicknesses suitable for use as any of the substrate layers are commercially available through various suppliers, such as HDK Industries, Inc. of Rogersville, Tenn., or other filter media suppliers. Thus, the substrate can be selected from such off the shelf bi-component medias.

In one embodiment, each layer of the substrate 102, 104, 106, 108, 110, 112, 114, 116, 118, 120 and the media 122 comprise a scrim formed of bi-component staple fibers having a high melt polyester core and a low melt polyester sheath. The bi-component staple fibers are compressed together to form the scrim, wherein the bi-component staple fibers are bonded together chemically, mechanically and/or thermally. For example, the bi-component staple fibers are heated to or near the melting temperature of the low melt polyester and compressed together, wherein the sheath formed of the low melt polyester melts or softens and acts as a bonding agent to bond fibers together.

The fine fibers 124, 126, 128, 130, 132, 134, 136, 138, 140, 142 can be deposited directly on the corresponding substrate 102, 104, 106, 108, 110, 112, 114, 116, 118, 120 as they are formed. Alternatively, the fine fibers may be separately prepared as a web of fine fibers, then laminated with the substrate. Although, the fine fibers may comprise fibers having various fiber diameters, preferably, the fine are nanofibers having very fine fiber diameter. Such fine fibers can be formed by electrospinning or other suitable processes. In one embodiment, the fine fibers are electrospun nanofibers having an average fiber diameter less than about 1 micron, preferably less than 0.5 micron, and more preferably between 0.01 and 0.3 microns. Examples herein have employed a smaller average diameter of 0.08 micron (80 nm). Such small diameter fine fibers can afford the ability to pack more fibers together in a given volume to provide an increased fiber surface area, which can increase filtration efficiency while decreasing pressure drop of a filter media.

The fine fibers may be formed by various suitable polymeric materials. To avoid destruction of the fine fibers during heating and/or compressing of the filter media 100, the fine fibers are typically formed of a material having a higher melt temperature than at least the low-melt component of the bi-component fibers of the substrate. In preferred embodiments, the fine fibers are formed of a polyamide. Other suitable polymers include, but not limited to, polyvinyl chloride (PVC), polyolefin, polyacetal, polyester, cellulous ether, polyalkylene sulfide, polyarylene oxide, polysulfone, modified polysulfone polymers and polyvinyl alcohol, polyamide, polystyrene, polyacrylonitrile, polyvinylidene chloride, polymethyl methacrylate, polyvinylidene fluoride. Solvents for making polymeric solution for electrostatic spinning may include acetic acid, formic acid, m-cresol, tri-fluoro ethanol, hexafluoro isopropanol chlorinated solvents, alcohols, water, ethanol, isopropanol, acetone, and N-methylpyrrolidone, and methanol.

In one embodiment, the fine fibers are formed of nylon-6 (polyamide-6, also referred to as "PA-6" herein) via electrospinning, wherein the electrospun fine fibers are deposited directly on the substrate. In this embodiment, the fine fibers 124 are generated electrostatically from a solution containing nylon-6 and deposited on a surface of the substrate 102. The fine fibers 126 can be similarly generated and deposited on the substrate layer 104, and so on. The substrate layers 102, 104, 106, 108, 110, 112, 114, 116, 118, 120 coated with the electrospun nanofibers 124, 126, 128, 130, 132, 134, 136, 138, 140, 142 are then laminated together with the media 122, such that each layer of the fine fibers is sandwiched between the adjacent substrate and/or the media 122 to create the filter media 100 in the pre-compressed state 144 as shown in FIG. 10. As discussed above, the filter media 100 in the pre-compressed state 144 is then compressed to form the filter media 100 in its final compressed state 146 as shown in FIGS. 1 and 2. In preferred embodiments, the filter media 100 is heated before, during, and/or after the compression. For example, the filter media 100 in the pre-compressed state 144 is heated prior to passing through the set of rollers 148, 150. Further, the set of rollers 148, 150 can be heated to further heat the filter media 100 during the compression.

The bonding between the fine fibers and adjacent coarser fibers of the substrates and/or media 122 may involve solvent bonding, pressure bonding, and/or thermal bonding. For example, as the fine fibers are electrostatically generated from a polymer solution containing a solvent, the solvent remaining on the surface of the fine fibers can effectuate a solvent bonding as the fiber fibers come in contact with the coarse fibers of the substrate. Further, the low melt component of the bi-component fibers of the substrate can be used to enhance bonding between the fine fibers and the adjacent coarse fibers of the substrate. In such embodiment, the filter media 100 is heated to or near the melting point of the low melt component and compressed, wherein the low melt component of the bi-component coarse fibers melts or softens, which allows the adjacent fine fibers to embed into the low melt component as they are compressed together, thereby enhancing the bonding between the coarse fibers and the fine fibers (via pressure bonding and thermal bonding.) In a preferred embodiment, the adhesion between the fine fibers and the substrate on which the fine fibers were deposited are greater than that of between the fine fibers and the other adjacent substrate. For example, the adhesion between the fine fibers 124 and the substrate 102 is greater than the adhesion between the fine fibers 124 and the substrate 104. As such, when a delamination is forced, the fine fibers 124 will delaminate from the substrate 104 and remain on the substrate 102. Thus, when forced, the filter media 100 of such embodiment can be separated into ten layers of substrates carrying fine fibers (102/124, 104/126, 106/128, 108/130, 110/132, 112/134, 114/136, 116/138, 118/140, 120/142) and the media 122.

In one embodiment, each of the substrate layers is formed of a bi-component fiber scrim having an average fiber diameter between about 1 and 40 microns and a basis weight between about 0.5 and 15 oz/yd$^2$. The bi-component fibers comprise a high-melt polyester core and a low melt polyester sheath. The fine are electrospun nanofibers formed of nylon-6. The fine fibers have an average fiber diameter between about 0.01 and 0.5 microns, wherein each layer of the fine fibers 124, 126, 128, 130, 132, 134, 136, 138, 140, 142 has a basis weight between about 0.03 g/m$^2$ and 0.5 g/m$^2$, providing total fine fiber basis coverage between 0.3 g/m$^2$ and 5 g/m$^2$. The fine fiber coverage of the filter media 100 for liquid particulate filtration applications is significantly greater that the fine fiber coverage of gas or air filtration medias. A target basis weight of fine fibers on each substrate layer is selected according to an average diameter of the fine fibers and a desired efficiency and capacity of the filter media. A desired efficiency and capacity of the filter media 100 can be obtained by adjusting fine fiber diameter, fine fiber coverage on each substrate, number of fine fiber layers, amount of lofting and compression.

Although, the fine fiber coverage can be characterized in terms of a basis weight, the basis weight depends upon a specific weight of a polymer(s) and a diameter of the fine fibers. Thus, it is most useful to characterize the fine fiber coverage in terms of linear coverage per area (km/m$^2$) as this takes out the variability associated with the specific weight and fine diameter. Thus, the linear coverage truly measures how much fiber is laid down as the quantity of fiber. In this regard, preferred fine fiber linear coverage ranges are greater than 5,000 km/m$^2$ for the heaviest coverage fine fibers, more preferably greater than 10,000 km/m$^2$, and most preferably between 20,000 km/m$^2$ and 60,000 km/m$^2$. The fine fiber coverages in various terms including the basis weight and linear coverage for fine fibers having an average fiber diameter of about 0.08 micron (80 nm) according to embodiments of the present invention are shown below in Table 1. The fine fibers of these embodiments are formed of PA-6 having a density of 1.084 g/cm$^3$ via a electrospinning process. As shown, Table 1 includes fine fiber mass coverage form 0.03-0.225 g/m$^2$.

While fine fiber coverage may vary based on fiber diameter, based on examples using 80 nm fibers and other calculations, typically embodiments that employ fine fibers having less than 500 nm average diameter will have similar coverage ranges for purpose of broad characterization and claiming purposes.

Method of Making Multilayer Composite Filter Media

FIG. 11 schematically illustrates a representative process of making a filter media according to a processing embodiment of the present invention. Although this embodiment includes process steps for making the filter media 100 of FIG. 9, the process can produce filter medias according to other embodiments of the present invention with minor modifications. A system 200 shown in FIG. 11 includes an upstream system 201 for making a composite media including a substrate and fine fibers deposited thereon, and a downstream system 203 for laminating, lofting and compressing multiple layers of composite media to make a multilayer composite filter media for liquid particulate filtration applications.

The upstream system 201 includes an unwinding station 202, an electrospinning station 204, an optional oven 206, an optional set of rollers 207 and a rewinding station 208. In this embodiment, a roll of scrim 210, which is used here as a substrate layer, is unwound from the unwinding station 202. The scrim 212 unwound from the roll of scrim 210 travels in a machine direction 214 toward the electrospinning station 204. In the electrospinning station 204, fine fibers 216 are formed and deposited on one surface of the scrim 212 to form a composite media 218 comprising the scrim carrying the fine fibers 216. The composite media 218 may be heated and compressed in the optional oven 206 and the optional set of rollers 207 before being wound into a roll of composite media 230 on the rewound station 208 for improved adhesion between the fine fibers and the substrate.

The scrim may be formed in an upstream process of the system 200 (either part of a continuous line process or interrupted line process) or may be purchased in a roll form from a supplier such as HDK or other suitable media supplier such as H&V or Ahlstrom or the like. The scrim can be formed of various suitable materials, such as bi-compo-

TABLE 1

| | Nanofiber Coverage | | | | | | |
|---|---|---|---|---|---|---|---|
| ID | 1 | 2 | 3 | 4 | 5 | 6 | 7 |
| NF coverage g/m$^2$ | 0.225 | 0.15 | 0.09 | 0.075 | 0.05 | 0.0375 | 0.03 |
| cm$^3$ PA6/m$^2$ | 0.208 | 0.138 | 0.083 | 0.069 | 0.046 | 0.035 | 0.028 |
| Linear cm of NF/m$^2$ | 4.129E+09 | 2.753E+09 | 1.652E+09 | 1.376E+09 | 9.176E+08 | 6.882E+08 | 5.506E+08 |
| Linear Meters of NF/m$^2$ | 4.129E+07 | 2.753E+07 | 1.652E+07 | 1.376E+07 | 9.176E+06 | 6.882E+06 | 5.506E+06 |
| Linear Miles of NF/m$^2$ | 25658.691 | 17105.794 | 10263.476 | 8552.897 | 5701.931 | 4276.448 | 3421.159 |
| 2d area of NF cm$^2$ | 33034.928 | 22023.285 | 13213.971 | 11011.643 | 7341.095 | 5505.821 | 4404.657 |
| 2d area of NF m$^2$ | 3.303 | 2.202 | 1.321 | 1.101 | 0.734 | 0.551 | 0.440 |
| surface area of NF m$^2$ | 10.378 | 6.919 | 4.151 | 3.459 | 2.306 | 1.730 | 1.384 | nent fibers of FIGS. 3-10 as discussed above. For example, the scrim can be formed of high melt polyester core/low melt polyester sheath bi-component staple fibers, which are compressed and/or heated to form the roll of scrim 210 having a desired thickness and solidity. Alternatively, the substrate layer may be other single component media that may be compressed and held in place via a solvent bond, heat bond or the like.

In the case of bi-component fibers, for example, the concentric sheath/core type bi-component fibers may be coextruded using a high melt polyester as the core and a low melt polyester as the sheath. Such bi-component fibers can then be used to form a scrim or a filter media. In one embodiment, the bi-component fibers are used as staple fibers to form a multi-component filter media or a scrim via conventional dry laying or air laying process. The staple fibers used in this process are relatively short and discontinuous but long enough to be handled by conventional equipment. Bales of the bi-component fibers can be fed through a chute feed and separated into individual fibers in a carding device, which are then air laid into a web of fibers (which itself for purposes of the present disclosure may be used as a substrate.) The web of fibers is then compressed using a set of calendering rollers to form the roll of scrim 210 (which can also be used as a substrate.) The web of the fibers may optionally be heated before entering the set of calendering rollers. Since the scrim 210 of this embodiment comprises bi-component fibers, including a high melt component and a low melt component, it is also referred to as a bi-component filter media. In some embodiments, the web of fibers are folded before being calendered to form a thicker bi-component filter media.

In a different embodiment, a web comprising high melt polymer fibers such as polyester fibers and a web comprising low melt polymer fibers such as polypropylene fibers can be formed, separated and laminated together to form the roll of bi-component filter media or scrim. In such embodiment, the fine fibers 216 are deposited on the low melt side of the scrim 212. In this embodiment, the low melt web is substantially thinner than the high melt web, such that the low melt component does not clog the surface of the high melt web when heated and melted.

In another embodiment, the bi-component fiber scrim can be formed via a melt blowing process. For example, molten polyester and molten polypropylene can be extruded and drawn with heated, high velocity air to form coarse fibers. The fibers can be collected as a web on a moving screen to form a bi-component scrim 210.

The multi-component fiber filter media or scrim may also be spun-bounded using at least two different polymeric materials. In a typical spun-bounding process, a molten polymeric material passes through a plurality of extrusion orifices to form a multifilamentary spinline. The multifilamentary spinline is drawn in order to increase its tenacity and passed through a quench zone wherein solidification occurs which is collected on a support such as a moving screen. The spun-bounding process is similar to the melt blowing process, but melt blown fibers are usually finer than spun-bounded fibers.

In yet another embodiment, the multi-component filter media is wet-laid. In a wet laying process, high melt fibers and low melt fibers are dispersed on a conveying belt, and the fibers are spread in a uniform web while still wet. Wet-laid operations typically use ¼" to ¾" long fibers, but sometimes longer if the fiber is stiff or thick. The above discussed fibers, according to various embodiments, are compressed to form a scrim 210 or a filter media having a desired thickness.

Referring back to FIG. 11, the scrim 212 enters the electrospinning station 204, wherein the fine fibers 216 are formed and deposited on one surface of the scrim 212. In the electrospinning station 204, the fine fibers 216 are electrospun from electrospinning cells 222 and deposited on the web of scrim 212. The electrospinning process of the system 200 can be substantially similar to the electrospinning process disclosed in Fine Fibers Under 100 Nanometers, And Methods, U.S. Patent Application Publication No. U.S. 2009/0199717, assigned to the assignee of the present application, the entire disclosure of which has been incorporated herein by reference thereto. Alternatively, nozzle banks or other electrospinning equipment can be utilized to form the fine fibers. Such alternative electrospinning devices or rerouting of chain electrodes of the cells 222 can permit the fibers to be deposited in any orientation desired (e.g. upwardly is shown although fibers can also be spun downwardly, horizontally or diagonally onto a conveyor carrying coarser fibers).

The electrospinning process produces synthetic fibers of small diameter, which are also known as nanofibers. The basic process of electrostatic spinning involves the introduction or electrostatic charge to a stream of polymer melt or solution in the presence of a strong electric field, such as a high voltage gradient. Introduction of electrostatic charge to polymeric fluid in the electrospinning cells 222 results in formation of a jet of charged fluid. The charged jet accelerates and thins in the electrostatic field, attracted toward a ground collector. In such process, viscoelastic forces of polymeric fluids stabilize the jet, forming small diameter filaments. An average diameter of fibers may be controlled by the design of eletrospinning cells 222 and formulation of polymeric solutions.

The polymeric solutions used to form the fine fibers can comprise various polymeric materials and solvents. Examples of polymeric materials include polyvinyl chloride (PVC), polyolefin, polyacetal, polyester, cellulous ether, polyalkylene sulfide, polyarylene oxide, polysulfone, modified polysulfone polymers and polyvinyl alcohol, polyamide, polystyrene, polyacrylonitrile, polyvinylidene chloride, polymethyl methacrylate, polyvinylidene fluoride. Solvents for making polymeric solution for electrostatic spinning may include acetic acid, formic acid, m-cresol, tri-fluoro ethanol, hexafluoro isopropanol chlorinated solvents, alcohols, water, ethanol, isopropanol, acetone, and N-methylpyrrolidone, and methanol. The solvent and the polymer can be matched for appropriated use based on sufficient solubility of the polymer in a given solvent and/or solvent mixture (both of which may be referred to as "solvent".) For example, formic acid may be chosen for nylon-6. Reference can be had to the aforementioned patents for further details on electrospinning of fine fibers.

In the electrospinning station 204, an electrostatic field is generated between electrodes in the electrospinning cells 222 and a vacuum collector conveyor 224, provided by a high voltage supply generating a high voltage differential. As shown in FIG. 11, there may be multiple electrospinning cells 222, wherein fine fibers 216 are formed. The fine fibers 216 formed at the electrodes of the electrospinning cells 222 are drawn toward the vacuum collector conveyor 224 by the force provided by the electrostatic field. The vacuum collector conveyor 224 also holds and transfers the scrim 212 in the machine direction 214. As configured, the scrim 212 is positioned between the electrospinning cells 222 and the vacuum collector conveyor 224, such that the fine fibers 216 are deposited on the scrim 212. In embodiments, wherein the scrim 212 is a multi-component filter media including a low melt component on one surface and a high melt component on the other surface, the multi-component scrim 212 is positioned between the electrospinning cells 222 and the vacuum collector conveyor 224, such that the low melt component surface of the multi-component scrim faces the electrospinning cells 222.

In one preferred embodiment, the electrospinning cells 222 contain a polymeric solution comprising polyamide-6 (PA-6) and a suitable solvent consisting of ⅔ acetic acid and ⅓ formic acid. In such a solvent, both acetic acid and formic acid act as a dissolving agent to dissolve PA-6, and acetic acid controls conductivity and surface tension of the polymeric solution. The electrospinning cells 222 generate fine fibers formed of PA-6, which are deposited onto a surface of the scrim 212. As the fine fibers 216 are deposited on the surface of the scrim 212, some fine fibers 216 entangle with coarse fibers of the scrim proximate the surface facing the electrospinning cells 222. When some fine fibers 216 entangle with some coarse fibers, solvent remaining in the fine fibers 216 from the electrospinning process can effectuate a solvent bonding between the fine fibers 216 and the coarse fibers of the scrim 212.

In other embodiments, the fine fibers can be formed by other suitable processes such as a melt blowing process. For example, the fine fibers having an average fiber diameter of about 0.6-0.7 micron can be formed via a melt blowing under an influence electrical fields. In such embodiments, the coarse fibers for a substrate are prepared to have an average fiber diameter at least 4 times larger than the fine fibers. For purposes of differentiation, melt blown fibers and electrospun nanofibers are thus meant to be more specific terms than fine fibers, which is intended to be generic.

The bonding between bi-component fibers of the scrim 212 and the fine fibers 216 may be enhanced via thermal bonding and pressure bonding by the optional oven 206 and the optional set of calendering rollers 207. As the composite media 218 is heated in the oven 206, the low melt polymer component of the bi-component fibers softens or melts and allowing the fine fibers 216 to embed into the low melt polymer component. Thus, during the heat treatment, the composite filter media 218 is heated to at least above the glass transition temperature of the low melt component, and more preferably to or near the melting temperature of the low melt component. For example, the composite media 218 is heated to or near the melt point of low melt polyester, such that the outer low melt polyester layer of the bi-component fibers melts and bonds with the fine fibers 216 formed of PA-6. In such embodiments, PA-6 fine fibers 216 and the high melt polyester core of the bi-component fibers do not melt, since PA-6 and the high melt polyester have a significantly higher melting temperature than that of the low melt polyester. The low melt polyester, which has the lowest melting temperature, melts or softens, and adjacent PA-6 fine fibers 216 are embedded in the softened or melted low melt polyester, thereby bonding the fine fibers 216 and the scrim 212 together. Thus, the low melt polyester acts as a bonding agent between the bi-component fiber scrim 212 and the fine fibers 216. The bonding between the fine fibers 216 and the scrim 212 can further be enhanced through pressure bonding via the set of rollers 207. As the composite media passes through the rollers 207, the fine fibers 216 and the scrim 212 are compressed together, wherein the fine fibers are further embedded into the fibers of the scrim 212. Further, the compression reduces voids in the composite media to form a composite media 220 with an increased solidity.

FIGS. 12(A)-12(D) are Scanning Electron Microscopic (SEM) images of the bi-component fibers of the scrim 212 and the fine fibers 216 proximate the surface of the scrim 212 taken at various magnification levels. As shown in the SEM images taken at magnification levels ×300 and ×1000 of FIGS. 12(A) and 12(B), the fine fibers 216 deposited on the web of scrim 212 form a spider web like fiber structure between the coarser bi-component fibers that are located proximate the surface of the scrim 212. The SEM images taken at higher magnifications (FIG. 12(C) at ×2,000 and FIG. 12(D) at ×10,000) show the bonding between the fine fibers 216 and the bi-component fibers. As shown clearly in FIG. 12(D), the fine fibers 216 are embedded on the low melt polyester surface of the bi-component fibers.

The roll of composite media 230 including the bi-component scrim 212 and the fine fibers 216 is laminated with other composite medias 232, 234, 236, 238, 240, 242, 244, 246, 248, and a media 250 in the downstream system 203. Each of the composite media rolls 230, 232, 234, 236, 238, 240, 242, 244, 246, 248, and a roll of the media 250 are unwound from unwind stations 252, 254, 256, 258, 260, 262, 264, 266, 268, 270, 272, and laminated together by a set of rollers 274. The set of rollers may be a calendering rollers to apply a significant pressure to laminate and significantly reduce a thickness of the layers of composite medias. Alternatively, the set of rollers 274 may apply a small pressure to laminate and reduce the thickness of the laminated layers just enough to fit through an oven 276. In such embodiment, the laminated layers 280 is heated in the oven 276 and compressed via a set of calendering rollers 282, wherein the laminated layers 280 is compressed together into a compressed state having a desired thickness and solidity.

In this embodiment, each roll of the composite media 232, 234, 236, 238, 240, 242, 244, 246, 248 is prepared similarly as the roll of the composite media 230. Therefore, each of the roll of the composite media 232, 234, 236, 238, 240, 242, 244, 246, 248 includes a substrate formed of a bi-component fiber scrim 284, 286, 288, 290, 292, 294, 296, 298, 300, and electrospun nanofibers 302, 304, 306, 308, 310, 312, 314, 316, 318, carried by the bi-component fiber scrim 284, 286, 288, 290, 292, 294, 296, 298, 300.

In one embodiment, each of the substrates 212, 284, 286, 288, 290, 292, 294, 296, 298, 300 and the media 250 are formed of a same bi-component fiber scrim having a thickness between about 0.05 mm and 1.0 mm. Each layer of the fine fibers 216, 302, 304, 306, 308, 310, 312, 314, 316, 318, is formed by electrospinning PA-6 polymer solution to produce a fine fiber coverage between about 0.03 g/m$^2$ and 0.5 g/m$^2$. In other embodiments, the substrates may be formed of different types of filter media or scrim, and each of the fine fibers layer may have different fine fiber coverage.

The composite media 280 is heated in the oven 276 to or near a melting temperature of the low melt polyester component of the bi-component fiber scrim. During heating the substrates can relax and expand in thicknesses. Thus, the lofted composite media 281 can have a thickness that is at least 1.5 times, 2 times, 3 times or even greater than the thickness of the composite media 280 before being heated in the oven 276. The lofted composite media 281 is then compressed via the set of calendering rollers 282 into the compressed state 320. The composite media is compressed, such that the thickness of the composite media 280 is reduced between about 50% and 300%, preferably between about 70% and 200%, and more preferably between about 80% and 150% of the original thickness of the composite media 280 prior to heating ((total thickness of 10 scrim layers carrying 10 fine fiber layers+thickness of media−thickness of the composite media in the compressed state 320)/(total thickness of 10 scrim layers carrying 10 fine fiber layers+thickness of media).) The thickness reduction can depend on the amount of lofting during heating. Thus, when the lofting from heating is large, the final thickness of the composite media after compression may be greater than the initial thickness of the composite media before heating. The composite media in the compressed state 320 is then wound into a roll of filter media 324.

Figure 15:
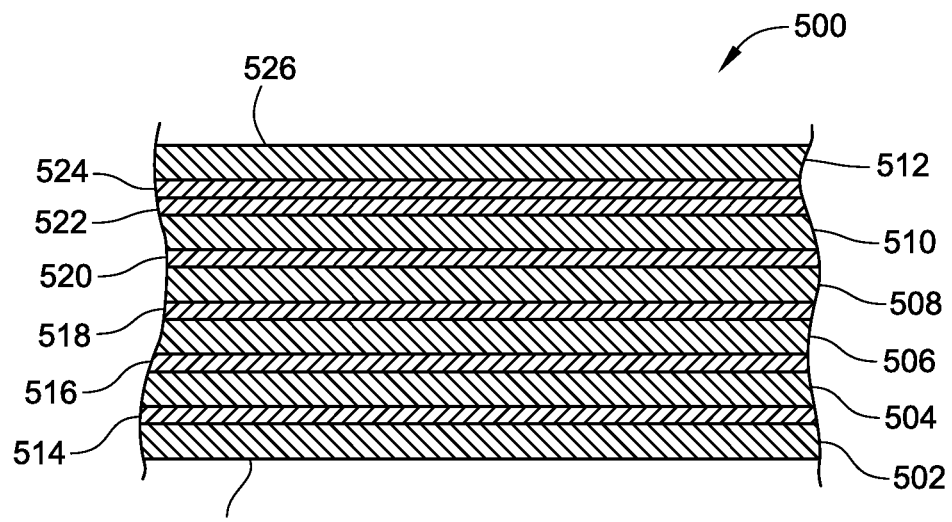
FIG. 15 is a schematic cross-sectional view of a filter media including tightly compressed multiple scrim layers and fine fibers according to an embodiment of the present invention.

In this embodiment, the rolls of the composite media 230, 232, 234, 236, 238, 240, 242, 244, 246, 248, and the media 250 are laminated together, such that each of the fine fiber layers 216, 302, 304, 306, 308, 310, 312, 314, 316, 318 is sandwiched between adjacent substrate layer and/or media. However, in other embodiments, the composite media layers may be laminated such that some of the fine fiber layers face each other to form fine fiber to fine fiber or substrate to substrate bonding within the final composite media 320. For example, the system 200 can be used to make the filter media 500 of FIG. 15. In this embodiment, each of the first five unwind stations 252, 254, 256, 258, 260 unwinds a roll of composite media such that the nanofibers are facing upward as shown in FIG. 11. However, the unwind station 262 unwinds a composite media such that the nanofibers are facing downward. As such, the fine fibers on the first four substrate layers 514, 516, 518, 520 are sandwiched between the substrates 502, 504, 506, 508, 510 as shown in FIG. 15. However, the fine fibers 522 on the substrate 510 and the fine fibers 524 of the substrate 512 face each other forming the fine fiber-fiber fiber.

Figure 13:
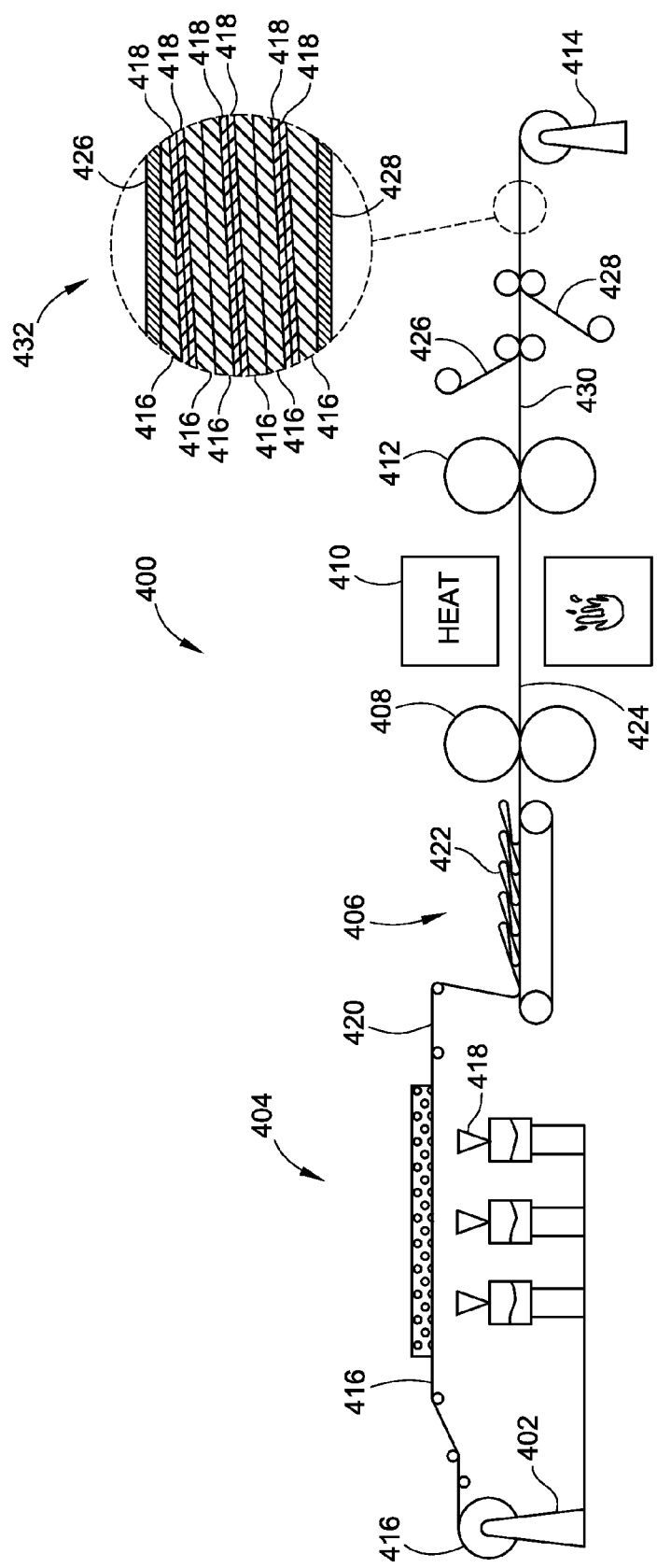
FIG. 13 is a schematic illustration of a system for making a filter media according to a different embodiment of the present invention.

FIG. 13 schematically illustrates a system and a process of making a filter media according to a different embodiment of the present invention. A system 400 generally includes an unwinding station 402, an electrospinning station 404, a folding station 406, a set of rollers 408, an oven 410, and a set of calendering rollers 412 and a rewinding station 414.

In this embodiment a roll of substrate 416 is unwound from the unwinding station 402 and transferred to the electrospinning station 404, wherein fine fibers are formed and deposited on a surface of the substrate 416. The electrospinning station 404 and the process are similar to the electrospinning station 204 and the process described above. In this embodiment, the substrate 416 is a scrim formed of bi-component fibers including a high melt polyester core and a low melt polyester sheath. The fine fibers 418 are formed of PA-6.

The composite media 420 comprising the substrate 416 and fine fibers 418 is folded in the folding station 406. The composite media 420 can be folded to 2-20 folds thick depending on desired characteristics of the final media. As shown, the folding creates fine fiber to fine fiber laminated surfaces and substrate to substrate laminated surfaces. The folding station 406 in this embodiment is shown as folding the composite media 420 in a line direction, such that the folds are pointing toward the set of the rollers 408. However, in other embodiments, the composite media 402 may be folded such that the folds are pointing toward the electrospinning station 404, or folded in cross-line directions. The folded composite media 422 is then compressed to a thickness appropriate to pass through an oven 410. As the composite media 424 is heated, the low melt polyester sheath melts or softens to effectuate thermal bonding between layers. After exiting the oven 410, the composite media 424 passes through the set of calendering rollers 412. The calendering rollers 412 are spaced apart from each other according to a desired final thickness of the media. The composite media 424 is pressed down into a compressed state having a desired thickness as it passes through the set of calendering rollers 412.

Further, media layers 426, 428 are laminated on each surface of the media 430 and wound into a roll in the rewinding station 414. A expanded cross sectional view of a filter media 432 including the media 430, the media layers 426, 428 is shown in FIG. 13. As shown, the media 430 includes multiple layers of substrate 416 and multiple layers of fine fibers 418 in a slanted orientation from the folding process. The media layers 426, 428 can be formed of any suitable media, but in this embodiment, the media layers 426, 428 are formed of the same bi-component fiber scrim used for the substrate 416.

Figure 14:
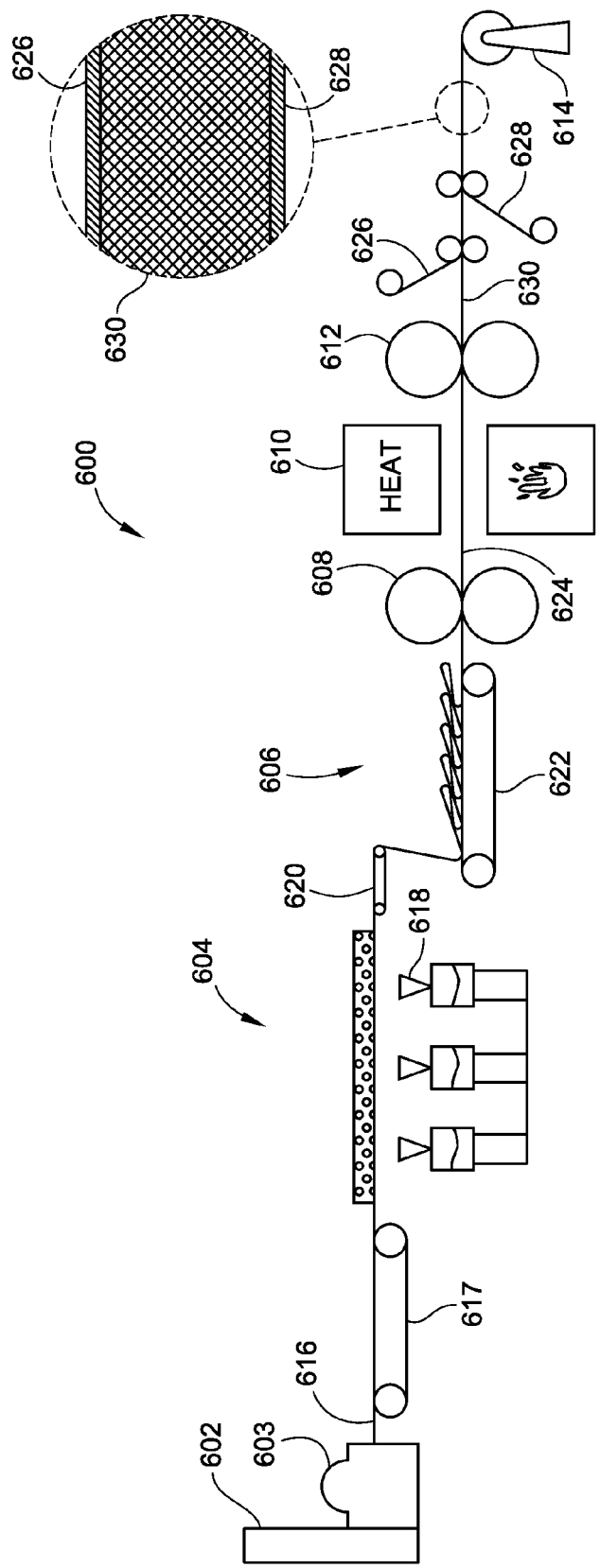
FIG. 14 is a schematic illustration of a system for making a filter media according to yet another embodiment of the present invention.

FIG. 14 shows yet a different embodiment of a system and a process of making a media. A system 600 is similar to the system 400 but the fine fibers in this embodiment are not deposited on a substrate. Rather, the fine fibers are formed and deposited onto a web of loosely entangled coarse fibers. The system 600 generally includes a chute 602, a carding device 603, an electrospinning station 604, a folding station 606, a set of rollers 608, an oven 610, and a set of calendering rollers 612 and a rewinding station 614.

In the system 600, the web of coarse fibers 616 is formed from staple fibers using a dry laying or air laying process. The staple fibers of this embodiment are bi-component fibers comprising a high melt polyester core and a low-melt polyester sheath. The bi-component staple fibers are relatively short and discontinuous, but long enough to be handled by conventional equipment. Bales of staple fibers are fed through the chute feed 602. In the carding device 603, the bi-component staple fibers are separated into individual fibers and air laid to form the web of coarse fiber 616. At this point, the web of coarse fiber 616 can be loosely tangled together in a highly fluffed thick state and may not be bonded together. The web of coarse fiber 616 can be easily pulled apart with very little manual effort and has little structural integrity at this point such that it is not considered a filter media or substrate in the conventional sense.

The web of coarse fiber 616 is transferred via a conveyor belt 617 toward the electrospinning station 604, wherein the fine fibers 618 are formed and deposited on a surface of the web of coarse fiber 616. As the fine fibers 618 are deposited on the web of coarse fiber 616, the fibers 618 are integrated with the coarse fibers of the web of coarse fiber 616 much more than in the previous embodiment with the substrate 416, as the web of coarse fiber 616 are much more porous and less dense to allow deeper integration of the fine fibers 616.

The web of coarse fiber 616 integrated with the fine fibers 618 are then folded into 10-30 folds in the folding station 606 and compressed via the set of rollers 608, which is heated in the oven 610 and compressed again via the set of calendering rollers 612 as it was with the system 400. The media 630 is then laminated with a media layer 626 and a porous layer 628 to from a filter media 632. The coarse bi-component fibers and the fine fibers of the media 630 of this embodiment are much more integrated. Thus, a cross sectional view of the media 630 does not show multiple layers, but rather appears more like a single integrated media 630. The media 630 has a sufficient fine fiber coverage and structural integrity to capture particulate matters from a liquid stream, such as a hydrocarbon fuel stream.

Multilayer Filter Media Examples and Test Results

FIG. 15 is a schematic cross-sectional view of a filter media 500 according to a different embodiment of the present invention. The filter media 500 is similarly constructed as the filter media 100, but includes six layers of substrate 502, 504, 506, 508, 510, 512, each of which carrying fine fibers 514, 516, 518, 520, 522, 524, instead of ten layers of substrate carrying fine fibers. Further, the most upstream composite media layer comprising the substrate layer 512 and fine fibers 524 is reversed such that the fine fibers 524 face the fine fibers 522 forming a fine fiber-fine fiber interface. As shown, the substrate 512 provides an upstream surface 526 of the filter media 500, thus fine fibers are not exposed and protected.

The test samples of the filter media 500 were prepared in a laboratory. Test samples of all embodiments described herein are prepared to have a sample area of 0.1 ft². A bi-component fiber scrim comprising a high melt polyester core and a low melt polyester sheath having a basis weight of 35.0 GSY was used for the each of the substrate layers 502, 504, 506, 508, 510, 512. The fine fibers were formed via an electrospinning process from a polymeric solution comprising PA-6 and deposited on each of the substrate layers. On the substrate 512, about 0.05 g/m² of the PA-6 nanofibers 524 having an average fiber diameter of 0.08 micron were formed and deposited. This level of fine fiber basis weight provides a linear fine fiber coverage of about 9176 km/m² (5,702 miles/m².) On the substrate 510, about 0.15 g/m² of the PA-6 nanofibers 522 having an average fiber diameter of 0.08 micron were formed and deposited. This level of fine fiber basis weight provides a linear fine fiber coverage of about 27,530 km/m² (17,106 miles/m².) On each of the substrate layers 502, 504, 506, 508, about 0.225 g/m² of the PA-6 nanofibers 514, 516, 518, 520 having an average fiber diameter of 0.08 micron were formed and deposited. This level of fine fiber basis weight provides a linear fine fiber coverage of about 41,290 km/m² (25,659 miles/m²) on each substrate. Thus, the filter media 500 includes a total fine fiber basis weight of about 1.1 g/m², which provides about 201,866 km/m² (125,444 miles/m²) of linear fiber coverage.

The six substrate layers carrying the fine fibers were arranged as shown in FIG. 15 such that the substrate layer 512 forms the upstream surface 526 and the substrate layer 502 forms the downstream surface 528. The six composite media layers were heated and compressed via a calendering roller as described in the previous embodiments to form the composite filter media 500.

Test samples of the filter media 500 were prepared and tested for efficiency and dust holding capacity according to the ISO 16889 international standard for multi-pass method for evaluating filtration performance. All tests were performed using a hydraulic fluid Mil-H-5606 having a viscosity at the test temperature of 15 mm2/s loaded with ISOMTD test dust.

Figure 16:
FIG. 16 is efficiency test results of first multilayer filter media test samples.

In the first test, the test fluid having a base upstream contaminant concentration of 5.00 mg/L was used at a flow rate of 0.26 GPM. FIG. 16 shows particle counts per mL and filtration ratio at 10%, 20%, 30%, 40%, 50%, 60%, 70%, 80%, 90%, and 100% time intervals during the 6-hour test period. When the test results were converted to a fluid cleanliness rating according to ISO 4406:99 cleanliness code (R4/R6/R14), the cleanliness rating at 10% time interval is 7/5/0, at 100% is 13/11/7, and average is 6/4/0.

Figure 17:
FIG. 17 is efficiency test results of second multilayer filter media test samples.

In the second test, the test fluid having a base upstream contaminant concentration of 15.00 mg/L was used at a flow rate of 0.26 GPM. FIG. 17 shows particle counts per mL and filtration ratio test results. The cleanliness rating at 10% time interval is 7/6/0, at 100% is 19/18/14, and average is 12/11/7.

Test samples of the filter media 500 for the third test were prepared in a laboratory similarly as the test samples for the first test and the second test. However, the fine fiber basis weight of each substrate layer was changed. On each of the substrates 510 and 512, about 0.05 g/m² of the PA-6 nanofibers 522, 524 having an average fiber diameter of 0.08 micron were formed and deposited. This level of fine fiber basis weight provides a linear fine fiber coverage of about 9176 km/m² (5,702 miles/m²) on the each substrate. On the substrate 508, about 0.075 g/m² of the PA-6 nanofibers 520 having an average fiber diameter of 0.08 micron were formed and deposited. This level of fine fiber basis weight provides a linear fine fiber coverage of about 13,760 km/m² (8,553 miles/m².) On the substrate 506, about 0.09 g/m² of the PA-6 nanofibers 518 having an average fiber diameter of 0.08 micron were formed and deposited. This level of fine fiber basis weight provides a linear fine fiber coverage of about 16,520 km/m² (10,263 miles/m².) On the substrate 504, about 0.15 g/m² of the PA-6 nanofibers 516 having an average fiber diameter of 0.08 micron were formed and deposited. This level of fine fiber basis weight provides a linear fine fiber coverage of about 27,530 km/m² (17,106 miles/m².) On the substrate 502, about 0.225 g/m² of the PA-6 nanofibers 514 having an average fiber diameter of 0.08 micron were formed and deposited. This level of fine fiber basis weight provides a linear fine fiber coverage of about 41,290 km/m² (25,659 miles/m².) Thus, the filter media 500 includes a total fine fiber basis weight of about 0.64 g/m², which provides about 117,452 km/m² (72,985 miles/m²) of linear fiber coverage.

Figure 18:
FIG. 18 is efficiency test results of third multilayer filter media test samples.

In the third test, the test fluid having a base upstream contaminant concentration of 15.00 mg/L was used at a flow rate of 0.26 GPM. FIG. 18 shows particle counts per mL and filtration ratio test results. The cleanliness rating at 10% time interval is 11/9/4, at 100% is 17/16/11, and average is 16/15/10.

Figure 19:
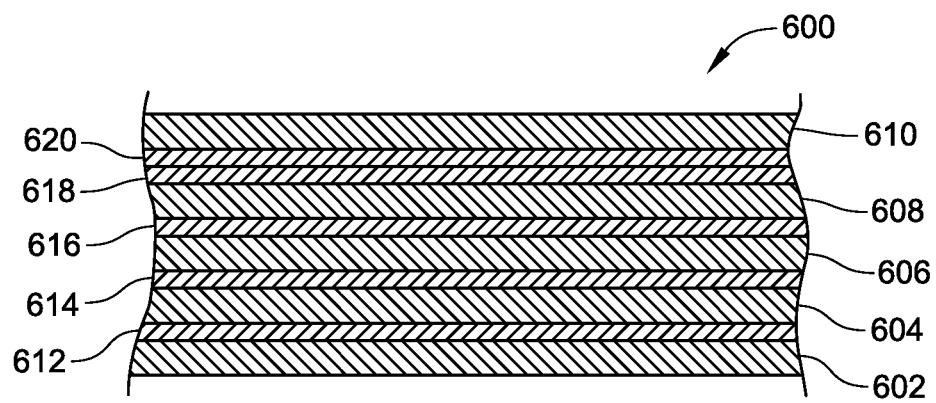
FIG. 19 is a schematic cross-sectional view of a filter media according to a different embodiment of the present invention.

FIG. 19 is a schematic cross-sectional view of a filter media 600 according to a different embodiment of the present invention. The filter media 600 is similarly constructed as the filter media 500 of FIG. 15, however the filter media 600 include five substrate layers 602, 604, 606, 608, 610 and five fine fiber layers 612, 614, 616, 618, 620. Test samples of the filter media 600 for the fourth test were prepared in a laboratory similarly as the previous test samples. For these test samples, about 0.15 g/m² of the PA-6 nanofibers 612, 614, 616, 618, 620 having an average fiber diameter of 0.08 micron were formed and deposited on each of the substrate layers 602, 604, 606, 608, 610. This level of fine fiber basis weight provides a linear fine fiber coverage of about 27,530 km/m² (17,106 miles/m²) on each substrate. Thus, the filter media 600 includes a total fine fiber basis weight of about 0.75 g/m², which provides about 137,650 km/m² (85,530 miles/m²) of linear fiber coverage.

Figure 20:
FIG. 20 is efficiency test results of fourth multilayer filter media test samples.

In the fourth test, the test fluid having a base upstream contaminant concentration of 15.00 mg/L was used at a flow rate of 0.26 GPM. FIG. 20 shows particle counts per mL and filtration ratio test results. The cleanliness rating at 10% time interval is 10/8/0, at 100% is 16/13/11, and average is 14/12/8.

Figure 21:
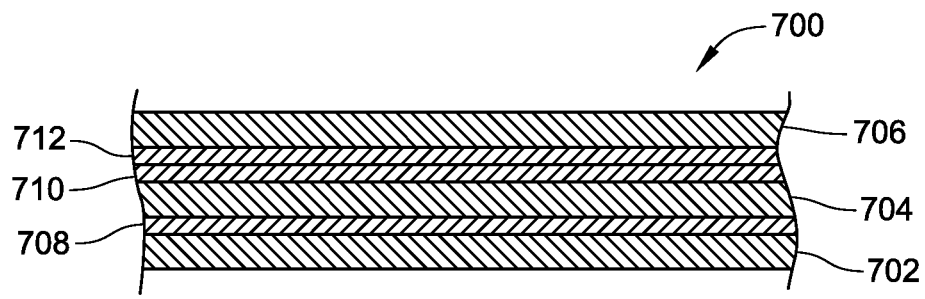
FIG. 21 is a schematic cross sectional view of a filter media according to yet another embodiment of the present invention.

FIG. 21 is a schematic cross-sectional view of a filter media 700 according to yet another embodiment of the present invention. The filter media 700 is similarly constructed as the filter media 500 of FIG. 15, however the filter media 700 include three substrate layers 702, 704, 706 and three fine fiber layers 708, 710, 712. Test samples of the filter media 700 for the fifth test were prepared in a laboratory similarly as the previous test samples. For these test samples, about 0.075 g/m² of the PA-6 nanofibers 712 having an average fiber diameter of 0.08 micron were formed and deposited on the substrate 706. This level of fine fiber basis weight provides a linear fine fiber coverage of about 13,760 km/m² (8,553 miles/m².) On the substrate 704, about 0.09 g/m² of the PA-6 nanofibers 710 having an average fiber diameter of 0.08 micron were formed and deposited. This level of fine fiber basis weight provides a linear fine fiber coverage of about 16,520 km/m² (10,263 miles/m².). On the substrate 702, about 0.15 g/m² of the PA-6 nanofibers 708 having an average fiber diameter of 0.08 micron were formed and deposited. This level of fine fiber basis weight provides a linear fine fiber coverage of about 27,530 km/m² (17,106 miles/m².) Thus, the filter media 700 includes a total fine fiber basis weight of about 0.315 g/m², which provides about 57,810 km/m² (35,922 miles/m²) of linear fiber coverage.

Figure 22:
FIG. 22 is efficiency test results of fifth multilayer filter media test samples.

In the fifth test, the test fluid having a base upstream contaminant concentration of 5.00 mg/L was used at a flow rate of 0.26 GPM. FIG. 22 shows particle counts per mL and filtration ratio test results. The cleanliness rating at 10% time interval is 11/10/5, at 100% is 11/9/4, and average is 9/8/0.

Examples and Test Results of Tubular Depth Filters

Tubular depth filters, such as those shown in FIGS. 1-1(A), including fine fiber multilayer filter media sheets, such as those shown in FIGS. 15, 19, 21, were prepared and tested for efficiency and dust holding according to the ISO 16889 international standard for multi-pass method for evaluating filtration performance. All tests were performed using a hydraulic fluid Mil-H-5606 having a viscosity at the test temperature of 15 mm²/s loaded with ISOMTD test dust. The tubular depth filters including the fine fiber multilayer filter media sheets according to embodiments of the present invention had superior efficiency test results than the standard tubular depth filter (benchmark).

The standard tubular depth filter was prepared similarly as the method described and shown in FIGS. 3 and 6 using a 4-station winding machine. Station 2 fed an interlay of microfiberglass sheet on a polyester sheet to form the standard tubular depth filter. The test fluid having a base upstream contaminant concentration of 5.00 mg/L was used at a flow rate of 2.4 GPM. FIG. 24 shows particle counts per mL and filtration ratio test results. The cleanliness rating at 10% time interval is 15/14/9, at 100% is 16/14/10, and average is 16/15/9.

A tubular depth filter media including fine fiber multilayer medias was prepared using the 4-station winding machine similarly as the standard tubular depth media. In this embodiment, a fine fiber multilayer filter media of FIG. 19 was used as a replacement for station 2 instead of the microfiberglass sheet and a fine fiber multilayer filter media of FIG. 21 was used as the interleaf for station 3 instead of the PEM sheet.

For the station 2 fine fiber replacement media, about 0.225 g/m² of the PA-6 nanofibers 612, 614 having an average fiber diameter of 0.08 micron were formed and deposited on each of the substrate layers 602, 604. This level of fine fiber basis weight provides a linear fine fiber coverage of about 41,290 km/m² on each substrate. On substrate 606, about 0.015 g/m² of PA-6 nanofibers 616 having an average fiber diameter of 0.08 micron were formed and deposited. This level of fine fiber basis weight provides a linear fine fiber coverage of about 27,530 km/m². On each of substrate layers 608, 610, about 0.075 g/m² of the PA-6 nanofibers 618, 620 having an average fiber diameter of 0.08 micron were formed and deposited. This level of fine fiber basis weight provides a linear fine fiber coverage of about 13,760 km/m² on each substrate. Thus, the filter media 600 includes a total fine fiber basis weight of about 0.75 g/m², which provides about 137,630 km/m² of linear fiber coverage.

For the station 3 fine fiber replacement media, about 0.09 g/m² of the PA-6 nanofibers 708 having an average fiber diameter of 0.08 micron were formed and deposited on the substrate layer 702. This level of fine fiber basis weight provides a linear fine fiber coverage of about 16,520 km/m². On substrate 704, about 0.075 g/m² of PA-6 nanofibers 710 having an average fiber diameter of 0.08 micron were formed and deposited. This level of fine fiber basis weight provides a linear fine fiber coverage of about 13,760 km/m². On substrate 706, about 0.05 g/m² of the PA-6 nanofibers 712 having an average fiber diameter of 0.08 micron were formed and deposited. This level of fine fiber basis weight provides a linear fine fiber coverage of about 9,176 km/m². Thus, the filter media 700 includes a total fine fiber basis weight of about 0.215 g/m², which provides about 39,456 km/m² of linear fiber coverage.

First test samples of the tubular depth filter including the fine fiber multilayer interleafs of this embodiment were tested using the test fluid having a base upstream contaminant concentration of 5.00 mg/L was used at a flow rate of 3.0 GPM. FIG. 25 shows particle counts per mL and filtration ratio test results. The cleanliness rating at 10% time interval is 10/7/0, at 100% is 16/15/7, and average is 14/12/4.

Second test samples of the tubular depth filter including the fine fiber multilayer interleafs of this embodiment were tested using the test fluid having a base upstream contaminant concentration of 5.00 mg/L was used at a flow rate of 1.0 GPM. FIG. 26 shows particle counts per mL and filtration ratio test results. The cleanliness rating at 10% time interval is 8/6/0, at 100% is 16/14/5, and average is 13/11/0.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element, comprising:
    a non-pleated tubular ring of a depth media having a media thickness of at least about ¼ centimeter; the depth media comprising a first filter media sheet comprising at least one substrate layer of carrier fibers and at least one layer of fine fibers deposited thereon;
    the fine fibers being polymeric material;
    the carrier fibers having an average fiber diameter of greater than about 600 nanometer; and
    the fine fibers having an average fiber diameter of less than 800 nanometers carried by the carrier fibers;
    wherein the fine fibers have a size that is at least 4 times as small as the carrier fibers;
    wherein the first filter media sheet being wound at least partially about itself to create multiple layers of the first filter media sheet throughout the depth of the depth media; and
    wherein multiple layers of fine fibers are disposed in the media thickness, wherein the depth media has a coverage of fine fibers carried throughout the depth of at least 0.1 gram/m$^2$, and at least about 10,000 km/m$^2$.

2. The filter element of claim 1, wherein the first filter media sheet comprises a composite media of a plurality of substrate layers and a plurality of fine fiber layers laminated together in the first filter media sheet, selected fine fiber layers being spaced apart and separated within the first filter media sheet by the plurality of substrate layers.

3. The filter element of claim 1, wherein the first filter media is free of glass fibers and has a filtration efficiency substantially comparable to or better than micro-glass filtration media for a preselected filtration application, the filtration efficiency being an average fluid cleanliness rating according to ISO 4406:99 (R4/R6/R14) that is at least 16/15/10 or better.

4. The filter element of claim 1, further comprising a second filter media sheet comprising a filter media comprising fibers with an average fiber diameter of greater than 1 micron, the second filter media sheet being wound at least partially about itself to create multiple layers of the second filter media sheet throughout the depth of the depth media.

5. The filter element of claim 4, wherein the first filter media sheet is arranged downstream and radially inward of the second filter media sheet.

6. The filter element of claim 5, wherein the filter element comprises a third filter media sheet, wherein the third filter media sheet comprises at least one substrate and at least one layer of the fine fibers deposited thereon, the sheet being wound at least partially about itself to create multiple layers of the third filter media sheet throughout the depth of the depth media, wherein the third filter media sheet is arranged downstream and radially inward of the second filter media sheet.

7. The filter element of claim 1, wherein the first filter media sheet includes an upstream face and a downstream face, wherein the filter media sheet has a heavier concentration of fine fibers proximate the downstream face as compared to the upstream face.

8. The filter element of claim 7, wherein the first filter media sheet comprises multiple depositions of fine fibers throughout the depth of the first filter media sheet from the upstream face to the downstream face, the depositions being heavier proximate the downstream face to create a increasing gradient of the fine fibers from the upstream face to the downstream face.

9. The filter element of claim 1, wherein the first filter media sheet is a partial width strip that extends substantially shorter that is at least ½ as short than a full axial length of the filter element, the partial width strip is helically wound around a central axis defined by the filter element with the partial width strip partially overlapping itself between 1-8 times, whereby a cross sectional width of the strip is aligned diagonally relative to the central axis.

10. The filter element of claim 1, wherein the first filter media sheet is a full length strip that extends approximately a full axial length of the filter element, the full length strip is spirally wound around a central axis defined by the filter element.

11. The filter element of claim 1, wherein the depth media comprises alternating layers of melt blown fibers and fine fibers deposited upon the melt blown fibers, wherein the melt blown fibers serve as the carrier fibers.

12. The filter element of claim 1, wherein the fine fibers have an average fiber diameter of less than 500 nanometer.

13. The filter element of claim 12, wherein the depth media has a coverage of fine fibers carried throughout the depth of at least 0.5 grams/m$^2$, and at least about 50,000 km/m$^2$.

14. The filter element of claim 12, wherein the depth media has a coverage of fine fibers carried throughout the depth of at least 1.0 grams/m$^2$, and at least about 100,000 km/m$^2$.

15. The filer element of claim 1, wherein the filter element is a liquid filter, the non-pleated depth media being configured to filter a liquid; the liquid filter including an average fluid cleanliness code (R4/R6/R14) according to ISO 4406: 99, that is at least 16/15/10 or better.

16. The filter element of claim 1, wherein the fine fibers have an average fiber diameter of less than 250 nanometer.

17. The filter element of claim 1, wherein the fine fibers have an average fiber diameter of less than 100 nanometer.

18. A filter element, comprising:
    a non-pleated tubular ring of a depth media having a media thickness of at least about ¼ centimeter; the depth media comprising a first filter media sheet comprising at least one substrate layer of carrier fibers and at least one layer of fine fibers deposited thereon;
    the carrier fibers having an average fiber diameter of at least about 3 micron; and
    the fine fibers having an average fiber diameter of less than 800 nanometers carried by the carrier fibers, the fine fibers being polymeric material and being contained in a formed filter media comprising at least two substrate layers and at least two fine fiber layers; and
    wherein the first filter media sheet being wound at least partially about itself to create multiple layers of the first filter media sheet throughout the depth of the depth media.

19. The filter element of claim 18, wherein the first filter media sheet comprises a composite media of a plurality of substrate layers and a plurality of fine fiber layers laminated together in the first filter media sheet, selected fine fiber layers being spaced apart and separated within the first filter media sheet by the plurality of substrate layers.

20. The filter element of claim 18, wherein the filter media sheet has a coverage level of fine fibers having an average fiber diameter of less than 500 nanometers of at least about 5,000 km/m².

21. The filter element of claim 18, wherein the first filter media is free of glass fibers and has a filtration efficiency substantially comparable to or better than micro-glass filtration media for a preselected filtration application, the filtration efficiency being an average fluid cleanliness rating according to ISO 4406:99 (R4/R6/R14) that is at least 16/15/10 or better.

22. The filter element of claim 18, further comprising a second filter media sheet comprising a filter media comprising fibers with an average fiber diameter of greater than 1 micron, the second filter media sheet being wound at least partially about itself to create multiple layers of the second filter media sheet throughout the depth of the depth media.

23. The filter element of claim 22, wherein the first filter media sheet is arranged downstream and radially inward of the second filter media sheet.

24. The filter element of claim 23, wherein the filter element comprises a third filter media sheet, wherein the third filter media sheet comprises at least one substrate and at least one layer of the fine fibers deposited thereon, the sheet being wound at least partially about itself to create multiple layers of the third filter media sheet throughout the depth of the depth media, wherein the third filter media sheet is arranged downstream and radially inward of the second filter media sheet.

25. The filter element of claim 18, wherein the first filter media sheet includes an upstream face and a downstream face, wherein the filter media sheet has a heavier concentration of fine fibers proximate the downstream face as compared to the upstream face.

26. The filter element of claim 25, wherein the first filter media sheet comprises multiple depositions of fine fibers throughout the depth of the first filter media sheet from the upstream face to the downstream face, the depositions being heavier proximate the downstream face to create a increasing gradient of the fine fibers from the upstream face to the downstream face.

27. The filter element of claim 18, wherein the first filter media sheet is a partial width strip that extends substantially shorter that is at least ½ as short than a full axial length of the filter element, the partial width strip is helically wound around a central axis defined by the filter element with the partial width strip partially overlapping itself between 1-8 times, whereby a cross sectional width of the strip is aligned diagonally relative to the central axis.

28. The filter element of claim 18, wherein the first filter media sheet is a full length strip that extends approximately a full axial length of the filter element, the full length strip is spirally wound around a central axis defined by the filter element.

29. The filter element of claim 18, wherein the depth media comprises alternating layers of melt blown fibers and fine fibers deposited upon the melt blown fibers, wherein the melt blown fibers serve as the carrier fibers.

30. The filter element of claim 18, wherein the fine fibers have an average fiber diameter of less than 500 nanometer.

31. The filter element of claim 30, wherein the depth media has a coverage of fine fibers carried throughout the depth of at least 0.1 gram/m², and at least about 10,000 km/m².

32. The filter element of claim 30, wherein the depth media has a coverage of fine fibers carried throughout the depth of at least 0.5 grams/m², and at least about 50,000 km/m².

33. The filter element of claim 30, wherein the depth media has a coverage of fine fibers carried throughout the depth of at least 1.0 grams/m², and at least about 100,000 km/m².

34. The filer element of claim 18, wherein the filter element is a liquid filter, the non-pleated depth media being configured to filter a liquid, the liquid filter including an average fluid cleanliness code (R4/R6/R14) according to ISO 4406:99, that is at least 16/15/10 or better.

35. The filter element of claim 18, wherein the fine fibers have an average thickness of less than 250 nanometer.

36. The filter element of claim 18, wherein the fine fibers have an average thickness of less than 100 nanometer.

37. A method of making the filter element according to claim 1, comprising
electro-spinning the fine fibers to the average size of less than 800 nanometer from a solution comprising a polymer and a solvent under the effect of a voltage differential;
depositing the fine fibers on a substrate of the carrier fibers, the carrier fibers having an average size of at least 3 micron; and
winding the substrate of carrier fibers and the fine fibers into a depth media having a thickness of at least ½ centimeter.

38. The method of claim 37, further comprising laminating successive layers of substrate and fine fibers into a filter media sheet having multiple layers of fine fibers and substrate; and thereafter performing said winding by winding the filter media sheet into a non-pleated tubular ring of a depth media having a media thickness of at least about ¼ centimeter.

39. The method of claim 38, further comprising: employing a multi-component substrate having a higher melt component and a lower melt component, further comprising rearranging the fine fibers deposited upon the substrate applying heat to relax the multi-component substrate.

40. The method of claim 37, further comprising sandwiching at least one fine fiber layer between upstream and downstream protective layers of substrate to protect the fine fibers during winding, wherein the winding is subsequent to the depositing.

41. The filter element of claim 1, wherein the filter element is free of glass fiber layers.

42. The filter element of claim 18, wherein the filter element is free of glass fiber layers.

43. The filter element of claim 1, wherein at least two filter media wraps including a first filter media wrap comprising a laminate of fine fibers and substrate, and a second filter media wrap not including fine fibers, the second filter media wrap being wrapped about the first filter media wrap.

44. The filter element of claim 18, wherein at least two filter media wraps including a first filter media wrap comprising a laminate of fine fibers and substrate, and a second filter media wrap not including fine fibers, the second filter media wrap being wrapped about the first filter media wrap.

45. The filter element of claim 43, wherein the course fibers includes a low melt component having a melt temperature less than the polymeric material, the low melt component binding first media wrap together to maintain a wrapped state.

46. The filter element of claim 44, wherein the course fibers includes a low melt component having a melt temperature less than the polymeric material, the low melt component binding first media wrap together to maintain a wrapped state.

* * * * *

UNITED STATES PATENT AND TRADEMARK OFFICE
CERTIFICATE OF CORRECTION

PATENT NO.         : 9,731,966 B2
APPLICATION NO.    : 13/033238
DATED              : August 15, 2017
INVENTOR(S)        : Thomas B. Green et al.

It is certified that error appears in the above-identified patent and that said Letters Patent is hereby corrected as shown below:

In the Claims

In Claim 15, Line 38, the word "filer" should be deleted and replaced with the word --filter--

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*